(12) United States Patent
Lee et al.

(10) Patent No.: US 10,982,370 B2
(45) Date of Patent: Apr. 20, 2021

(54) WASHING MACHINE

(71) Applicant: LG ELECTRONICS INC., Seoul (KR)

(72) Inventors: Junghoon Lee, Seoul (KR); Myunghun Im, Seoul (KR); Kyungchul Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 16/083,039

(22) PCT Filed: Mar. 8, 2017

(86) PCT No.: PCT/KR2017/002528
§ 371 (c)(1),
(2) Date: Sep. 7, 2018

(87) PCT Pub. No.: WO2017/155309
PCT Pub. Date: Sep. 14, 2017

(65) Prior Publication Data
US 2019/0112748 A1 Apr. 18, 2019

(30) Foreign Application Priority Data

Mar. 8, 2016 (KR) .......................... 10-2016-0027848
Mar. 28, 2016 (KR) ......................... 10-2016-0037024

(51) Int. Cl.
*D06F 35/00* (2006.01)
*D06F 37/04* (2006.01)
(Continued)

(52) U.S. Cl.
CPC ........ *D06F 35/002* (2013.01); *B01F 3/04503* (2013.01); *D06F 37/04* (2013.01);
(Continued)

(58) Field of Classification Search
CPC ........ D06F 35/002; D06F 37/04; D06F 37/22; D06F 39/02; D06F 39/08; D06F 39/083; D06F 39/085; D06F 39/088
See application file for complete search history.

(56) References Cited

U.S. PATENT DOCUMENTS 4,763,494 A * 8/1988 der Kinderen ........ D06F 39/022
68/17 R
5,768,730 A * 6/1998 Matsumoto ............. D06F 33/00
8/159
(Continued)

FOREIGN PATENT DOCUMENTS

JP 2547543 10/1996
JP 2015100596 6/2015
(Continued)

*Primary Examiner* — Joseph L. Perrin
(74) *Attorney, Agent, or Firm* — Finnegan, Henderson, Farabow, Garrett & Dunner, LLP

(57) ABSTRACT

Disclosed is a washing machine including: a tub provided inside a cabinet and storing washing water; a drum rotatably provided inside the tub and accommodating an object to be washed; a circulation pump for circulating, inside the drum, the washing water discharged from the drum; an air pump for compressing air; an air mixer for mixing the washing water supplied by the circulation pump, and the air compressed by the air pump; and a plurality of nozzles for spraying, toward the object to be washed, a mixed fluid in which the washing water and the compressed air are mixed by the air mixer.

8 Claims, 38 Drawing Sheets

(51) Int. Cl.
    *D06F 37/22*       (2006.01)
    *D06F 39/08*       (2006.01)
    *F04B 45/047*     (2006.01)
    *B01F 3/04*        (2006.01)
    *D06F 39/02*       (2006.01)

(52) U.S. Cl.
    CPC .............. *D06F 37/22* (2013.01); *D06F 39/08* (2013.01); *D06F 39/083* (2013.01); *D06F 39/085* (2013.01); *D06F 39/088* (2013.01); *F04B 45/047* (2013.01); *B01F 2003/04872* (2013.01); *B01F 2215/008* (2013.01); *D06F 39/02* (2013.01); *Y02B 40/00* (2013.01)

(56) References Cited

U.S. PATENT DOCUMENTS

| | | | |
|---|---|---|---|
| 6,662,600 B1* | 12/2003 | Field | D06F 39/02 134/102.1 |
| 2003/0230122 A1* | 12/2003 | Lee | D06F 35/002 68/58 |
| 2007/0258835 A1* | 11/2007 | Ichiyanagi | F04B 53/1065 417/413.1 |
| 2011/0277334 A1* | 11/2011 | Lee | D06F 58/206 34/73 |
| 2011/0289794 A1* | 12/2011 | Noh | F26B 23/005 34/443 |
| 2012/0070323 A1* | 3/2012 | Felber | F04B 45/047 417/413.1 |
| 2014/0033449 A1* | 2/2014 | Im | D06F 37/266 8/137 |
| 2015/0176170 A1* | 6/2015 | Bae | D06F 17/12 68/183 |
| 2015/0273408 A1* | 10/2015 | Tachibana | B01F 15/00538 366/162.4 |
| 2017/0362763 A1* | 12/2017 | Favaro | D06F 34/28 |

FOREIGN PATENT DOCUMENTS

| | | |
|---|---|---|
| KR | 1020110098485 A | 1/2011 |
| KR | 101568209 | 11/2015 |
| KR | 1020160020094 A | 2/2016 |

\* cited by examiner

① —— WATER
② ---- AIRp
③ —·— WATER + AIRp

WASHING MACHINE

CROSS-REFERENCE TO RELATED APPLICATION

This application is the National Stage filing under 35 U.S.C. 371 of International Application No. PCT/KR2017/002528, filed on Mar. 8, 2017, which claims the benefit of earlier filing date and right of priority to Korean Application Nos. 10-2016-0027848 and 10-2016-0037024, filed on Mar. 8, 2016 and Mar. 28, 2016, respectively, the contents of all of which are hereby incorporated by reference herein in their entirety.

TECHNICAL FIELD

The present invention relates to a washing machine for circulating washing water to improve washing performance.

BACKGROUND ART

Generally, a washing machine is a home appliance in which an object to be washed (clothes, laundry, etc.) and washing water are introduced into a drum and the drum is mechanically driven to remove contaminants of the laundry by mechanical energy such as frictional force or impact energy between the washing water and the laundry and a chemical action between a detergent and the laundry.

Such washing machines may be roughly classified into a pulsator type using a water flow by rotation of a pulsator and a drum type using impact force due to a vertical drop of the laundry to be washed in response to rotation of a drum.

In a drum type washing machine according to the related art, as a drum fast rotates instantly in a forward/reverse direction, a detergent is dissolved by friction between the drum and water.

In recent years, various devices are additionally equipped to increase washing efficiency of the washing machine. For example, a washing water circulation and spray apparatus is additionally equipped.

The related art washing water circulation and spray apparatus includes a circulation pump for circulating washing water discharged from a tub back into the tub.

The washing water discharged from a bottom of the tub is pumped upward by the circulation pump along a circulating hose to be resupplied into the tub. The washing water is then sprayed onto the laundry introduced into the drum such that the laundry can be soaked.

However, the circulation pump used in the related art washing machine has the following problems.

First, since a low-pressure pump having low discharge pressure is used to lower a pump unit cost, a spraying (or injection) force of the washing machine which is circulated back to the drum by the circulation pump is weak.

Second, in order to further improve the washing efficiency, it is preferable that the washing water circulated to the drum 3 is sprayed in an atomized state. However, when the spraying force is weak, sufficient atomization cannot be achieved.

Third, when a large amount of objects to be washed occupy most of an internal space volume of the tub and the drum, for example, ⅔ or more, and a spraying direction of the washing water is limited to only one direction, it takes long time for the objects to be washed (referred to as 'clothes') to be soaked by the circulated water and there is a limit in wetting the clothes uniformly.

Fourth, when a less amount of washing water is circulated, concentration of the detergent dissolved in the washing water is low. Therefore, the amount of washing water needs to be increased in order to increase the washing efficiency.

DETAILED DESCRIPTION OF THE DISCLOSURE

Therefore, a first object of the present invention is to provide a washing machine capable of strongly maintaining spraying power of circulating washing water even when using a low-pressure pump.

A second object of the present invention is to provide a washing machine capable of increasing washing efficiency by getting clothes wet more easily in a manner of spraying washing water, which is circulated into a drum by a strong spraying force, in an atomized state.

A third object of the present invention is to provide a washing machine capable of shortening a time required for getting clothes wet with washing water by spraying the washing water supplied to laundry in various directions.

A fourth object of the present invention is to provide a washing machine capable of spraying washing water containing a high concentration of detergent onto laundry while reducing an amount of washing water used.

In order to maintain a strong spraying force of washing water, which is the first object of the present invention, a flow rate or velocity and pressure of the washing water can be increased by additionally mixing compressed air with circulated washing water.

In order to spray washing water in an atomized state, which is the second object of the present invention, a fluid can flow through an air mixer from a larger diameter to a small diameter to cause a sudden change of a flow velocity by a water hammer phenomenon. The sudden change can be converted into pressure energy so as to atomize the washing water.

The third object of the present invention can be achieved by shortening a time for getting clothes (objects to be washed) wet in a manner of spraying a mixed fluid containing compressed air and washing water through a plurality of nozzles in various directions and at various angles.

The fourth object of the present invention can be achieved by allowing clothes to get wet with washing water containing a high concentration of detergent even by using a less amount of washing water, in a manner of spraying the washing water in an atomized state.

A washing machine according to one embodiment of the present invention may include a tub provided inside a cabinet to store washing water, a drum rotatably installed in the tub and accommodating an object to be washed therein, a circulation pump circulating the washing water discharged from the drum back into the drum, an air pump to compress air, an air mixer to mix the washing the water supplied by the circulation pump with the air compressed by the air pump, and a plurality of nozzles to inject a mixed fluid that the washing water and the compressed air are mixed by the air mixer toward the object to be washed.

According to an embodiment of the present invention, the washing machine may further include a circulation flow path connecting the circulation pump, the air mixer and the tub therethrough, to guide the mixed fluid into the drum, the mixed fluid containing the washing water circulated by the circulation pump or the washing water mixed by the air mixer and the compressed air, and an air flow path connecting the air pump and the air mixer therethrough to guide the compressed air compressed by the air pump into the air mixer.

According to an embodiment of the present invention, the air mixer may include a housing having a mixing space for mixing the washing water and the compressed air, a plurality of water inlets formed on the housing to introduce the washing water into the mixing space therethrough, an air inlet formed on the housing to introduce the compressed air from the air pump into the mixing space, and a plurality of outlets formed on the housing to discharge the mixed fluid therethrough.

According to an embodiment of the present invention, the air inlet may be formed on one side of the housing in a direction intersecting with a plurality of water inlets, and the plurality of outlets may be spaced apart from each other on another side of the housing facing the one side of the housing in a direction intersecting with the plurality of water inlets.

According to an embodiment of the present invention, the plurality of outlets may have a relatively small flow area of the mixed fluid compared with that of the housing.

According to an embodiment of the present invention, the air mixer may include a flow path changing portion provided with a plurality of communication holes communicating with at least one of the plurality of outlets, and rotatably disposed in the housing to change a flow path such that the mixed fluid is injected selectively or simultaneously to the plurality of nozzles through the communication holes communicating with the at least one outlet.

According to an embodiment of the present invention, the flow path changing portion may be driven so as to be movable up and down by pressure of the water generated in the circulation pump and pressure of the compressed air generated in the air pump. The flow path changing portion may include a rotating plate having the plurality of communication holes spaced apart from one another along a circumferential direction, a first protrusion protruding upward from a rim of the rotating plate to face an inner circumferential surface of the housing, and having two adjacent inclined surfaces having different tilts and lengths alternately arranged along the circumferential direction, and a second protrusion protruding downward from the rim of the rotating plate, and having two adjacent inclined surfaces having different tilts and lengths alternately arranged along the circumferential direction to have a different phase difference from the inclined surfaces of the first protrusion. The air mixer may include a first rotation guide formed on an upper portion of the housing and having two inclined surfaces which have different tilts and lengths and are formed alternately along the circumferential direction, so that the first rotation guide is engaged with the first protrusion while facing each other, and a second rotation guide disposed on a lower portion of the housing and having two inclined surfaces which have different tilts and lengths and are formed alternately along the circumferential direction, so that the second rotation guide is engaged with the second protrusion while facing each other According to another embodiment of the present invention, the flow path changing portion may be driven by a rotational force generated from a flow path changing motor, and the flow path changing portion and the flow path changing motor may be connected by a rotating shaft.

According to another embodiment of the present invention, the air mixer may include a mixing chamber disposed to be spaced apart from an inner surface of the housing and having the mixing space therein, and a bypass flow path formed between the inner surface of the housing and an outer surface of the mixing chamber so that at least some of the washing water bypass the mixing space and pass through the housing.

According to another embodiment of the present invention, the plurality of water inlets may be formed through a surface intersecting with one side of the housing in a direction intersecting with a moving direction of the mixed fluid, and the plurality of outlets may be formed through another side of the housing facing the one side of the housing in the same direction as the moving direction of the mixed fluid. The air inlet may extend through the another side of the housing and the mixing chamber to protrude into the mixing space.

According to another embodiment of the present invention, the mixing chamber may include a plurality of water inlet holes formed through a surface facing the one side of the housing, and a plurality of outlet holes formed through a surface facing the another side of the housing.

According to another embodiment of the present invention, the mixing chamber may be spaced apart from the inner surface of the housing in a first direction facing the water inlets and a second direction intersecting with the first direction, and the bypass flow path may surround the mixing chamber.

According to another embodiment of the present invention, the mixing chamber may be spaced apart from the one side and the another side of the housing in the moving direction of the mixed fluid, and the bypass flow path may be branched from the one side of the housing by the mixing chamber and joined at the another side of the housing.

According to an embodiment of the present invention, the air mixer may be installed above the circulation pump or at a center below the tub.

According to an embodiment of the present invention, the plurality of nozzles may be spaced apart from one another along a circumferential direction on a gasket provided on a laundry inlet port, and the circulation flow path may include a plurality of distribution flow paths connecting the plurality of outlets of the air mixer to the plurality of nozzles, respectively.

According to an embodiment of the present invention, the air pump may include a casing having an intake port and an exhaust port, an electromagnet part disposed inside the casing and magnetized by receiving a current, an operation part having a permanent magnet generating an electromagnetic force by interaction with the electromagnet part, and a compression part selectively performing compression and suction of air in response to the operation of the operation part.

According to an embodiment of the present invention, the electromagnet part may include a coil winding portion to which power is applied, and a core portion provided with a plurality of protrusions inserted into the coil winding portion and magnetized to an N pole and an S pole or to the S pole and the N pole by a magnetic field formed through the coil.

According to an embodiment of the present invention, the compression part may include a compression part main body having an air compression chamber at one side thereof with a first partition wall interposed therebetween, and an air discharge chamber and an air suction chamber at another side divided by a second partition wall, a suction port extending from one side to another side of the compression part main body to communicate with the air suction chamber, a diaphragm mounted on one side of the compression part main body to cover the air compression chamber to suck external air or compress internal air filled inside while reciprocating by power transferred from the operation part, a support portion coupled to one side of the compression part main body to support an outer circumferential portion of the diaphragm, and a discharge port formed on another side of the compression part main body to communicate with the air discharge chamber.

According to an embodiment of the present invention, the operation part may include a magnet mounting portion to which the permanent magnet is mounted in a manner that the permanent magnet faces a coil between the N pole and the S pole or between the S pole and the N pole, and a moving portion connecting the magnet mounting portion to the diaphragm and moving to push the diaphragm into the air compression chamber or pull out the diaphragm from the air compression chamber by the electromagnetic force.

According to one embodiment of the present invention, the air pump may further include a connection shaft connecting the moving portion and the diaphragm, and a first pressing plate and a second pressing plate coupled to end portions of the connection shaft with the diaphragm interposed therebetween to press the diaphragm in a compressing direction or expanding direction of the air compression chamber.

According to an embodiment of the present invention, the compression part may further include air suction holes formed through the first partition wall to communicate the air suction chamber with the air compression chamber, a first check valve to selectively open and close the air suction holes by a suction force of the diaphragm, air discharge holes formed through the first partition wall to communicate the air compression chamber with the air discharge chamber, and a second check valve to selectively open and close the air discharge holes by a compressive force of the diaphragm.

According to an embodiment of the present invention, the compression part may further include an external circumferential inserting portion protruding toward the support portion from an outer circumferential portion of the diaphragm along the circumferential direction to connect the diaphragm to the support portion, an external circumferential accommodating portion formed inside the support portion to face the external circumferential inserting portion such that the external circumferential inserting portion is inserted therein, rotation-preventing protrusions protruding from an outer circumferential surface of the external circumferential inserting portion, and rotation-preventing grooves formed on the external circumferential accommodating portion such that the rotation-preventing protrusions are inserted therein.

According to an embodiment of the present invention, an N pole and an S pole of the permanent magnet may be arranged in a direction intersecting with an arrangement direction of an N pole and an S pole of a core portion.

According to an embodiment of the present invention, the magnet mounting portion may include a plurality of permanent magnets spaced in series to face the core portion, and two adjacent permanent magnets of the plurality of permanent magnets may be arranged to have opposite polarity directions.

According to an embodiment of the present invention, the compression part may include first and second compression units arranged to be connected to both ends of the operation part, to alternately perform suction and compression of air with respect to each other.

According to another embodiment of the present invention, the electromagnet part may include a first electromagnet portion and a second electromagnet portion spaced apart from each other at opposite sides of the operation part in a direction facing the permanent magnets.

According to another embodiment of the present invention, the compression part may be disposed on an opposite side to the electromagnet part with respect to the operation part, and receive power by being connected to the operation part through a connecting rod extending from the operation part in a direction facing the permanent magnets.

According to another embodiment of the present invention, the compression part may include a bidirectional connecting portion extending from an end of the connecting rod in a moving direction of the permanent magnet, and first and second compression units disposed to be connected to both ends of the bidirectional connecting portion and configured to alternately perform suction and compression of air relative to each other.

According to an embodiment of the present invention, the casing may include a base part having the intake port and the exhaust port, a bracket installed on a top of the base part to support the first and second compression units, and an upper cover accommodating therein the electromagnet part, the operation part, and the first and second compression units, and covering the top of the base part.

According to an embodiment of the present invention, the air pump may include an exhaust flow path portion formed on the top of the base part to connect the discharge port and the exhaust port of the first and second compression units and having a plurality of exhaust connection portions at an opposite side to the exhaust port in a flowing direction of the compressed air, and a plurality of connection hoses connecting the plurality of exhaust connection portions to the plurality of outlets, respectively.

According to an embodiment of the present invention, the air pump may include a plurality of vibration-preventing mounts disposed between the bracket and the base part to support a lower portion of the bracket.

According to an embodiment of the present invention, the suction port may be connected to the tub.

According to another aspect of the present invention, there is provided a washing machine including a tub disposed inside a cabinet, a circulation pump to circulate washing water discharged from the tub back into the tub, and an aeration module to mix the washing water supplied from the circulation pump with compressed air and transfer a mixed fluid of the compressed air and the washing water into the tub.

According to another embodiment of the present invention, the aeration module may include a housing having an external air inlet, a water inlet and an outlet, an air mixer unit provided at one side in the housing, to mix the washing water introduced through the water inlet with the compressed air and discharge a mixed fluid of the washing water and the compressed air to the outside through the outlet, and an air pump unit provided at another side in the housing, to compress external air introduced through the external air inlet and transfer the compressed air to the air mixer unit.

According to another embodiment of the present invention, the air pump unit may include an electromagnet part, an operation part disposed to face the electromagnet part, having a permanent magnet, and reciprocating by an electromagnetic force generated by interaction with the electromagnet part, and a compression part to compress external air in cooperation with the operation part.

According to another embodiment of the present invention, the electromagnet part may include a coil winding portion having a coil wound to generate a magnetic field by receiving an applied current, and a core portion having a plurality of protrusions, at least one protrusion being inserted into the coil winding portion, and magnetized by the magnetic field.

According to another embodiment of the present invention, the operation part may include a magnet mounting portion to which the permanent magnet is mounted to face the electromagnet part, and a moving portion provided on the magnet mounting portion and moving toward or away from the compression part.

According to another embodiment of the present invention, the compression part may include a first compression unit disposed at one side of the operation part in a moving direction of the operation part, and a second compression unit disposed at another side of the operation part to face the first compression part. The first compression unit and the second compression unit may alternately repeat compression and suction of air.

According to another embodiment of the present invention, the compression part may include a compression part main body having a suction port and a discharge port and having a compression chamber therein; and a diaphragm provided in the compression chamber to compress air filled in the compression chamber or suck air into the compression chamber by power transferred from the operation part.

According to another embodiment of the present invention, the compression part main body may include a suction chamber separated from the compression chamber by a first partition wall to store external air introduced through the suction port, a plurality of suction holes formed through one side of the first partition wall to communicate with the suction chamber, a first check valve to open and close the plurality of suction holes by a pressure difference between the suction chamber and the compression chamber and restrict the flow of the external air to a direction toward the compression chamber, a discharge chamber separated from the compression chamber by the first partition wall, separated from the suction chamber by a second partition wall to store compressed air to be discharged through the discharge port, a plurality of discharge holes formed through another side of the first partition wall to communicate with the discharge chamber, and a second check valve to open and close the plurality of discharge holes by a pressure difference between the discharge chamber and the compression chamber and restrict the flow of the compression air to a direction toward the discharge chamber.

According to another embodiment of the present invention, the air mixer unit may include a boundary wall partitioning an inside of the housing to form an inner space in the housing, separate from a space for accommodating the air pump unit, and a mixing chamber provided with a water inlet hole, a water outlet hole and an air inlet, and mixing the washing water introduced through the water inlet and the water inlet holes with the compressed air introduced through the air inlet.

According to another embodiment of the present invention, the mixing chamber may be provided with a mixing space for mixing the washing water and the compressed air, separate from the inner space of the boundary wall, and the air mixer unit may further include a bypass flow path formed between the boundary wall and the mixing chamber so that some of the washing water introduced through the water inlet bypass the mixing chamber.

According to another embodiment of the present invention, the mixing chamber may be disposed in a manner that a rear surface is spaced apart from the boundary wall in a water-introducing direction in which the washing water is introduced through the water inlet, and both side surfaces are spaced apart from the boundary wall in a direction intersecting with the water-introducing direction.

According to another embodiment of the present invention, the water inlet hole may be provided in plurality on a lower portion of the mixing chamber and the water outlet hole may be provided in plurality on an upper portion of the mixing chamber. The air inlet may penetrate through a top surface of the mixing chamber and extend to a lower portion of the mixing space.

According to another embodiment of the present invention, the water inlet may communicate with the water inlet holes and may be formed through a lower portion of the housing in a direction intersecting with a water-introducing direction of the washing water introduced through the water inlet holes. The outlet may communicate with the water outlet holes and may be formed through an upper portion of the housing in the same direction as a discharge direction of the mixed fluid discharged through the water outlet holes.

According to another embodiment of the present invention, the housing may include a lower main body having the external air inlet and the water inlet, and an upper cover having the outlet and covering an upper portion of the lower main body.

According to another embodiment of the present invention, the upper cover may include an exhaust flow path portion.

The exhaust flow path portion may have one side communicating with the air pump unit and another side communicating with the air mixer unit, so that the compressed air is introduced into the air mixer unit.

According to another embodiment of the present invention, the exhaust flow path portion may include a first flow path formed in a first direction crossing both side surfaces of the upper cover facing each other, and a second flow path extending from the first flow path in a second direction intersecting with the first direction. Two branches of compressed air sent out from the air pump unit may flow intro both end portions of the first flow path and be joined in the second flow path so as to be transferred to the air inlet of the air mixer unit at both side end portions in the lower main body facing each other.

According to another embodiment of the present invention, the washing machine may further include a plurality of nozzles to inject the mixed fluid discharged from the aeration module into the tub, and distribution flow paths to guide the mixed fluid discharged from the aeration module into the plurality of nozzles, respectively.

Effect of the Disclosure

According to the present invention having the aforementioned configuration, the following effects can be obtained.

First, before washing water circulated by a circulation pump is sprayed into a drum, the washing water can be mixed with compressed air in an air mixer, which may increase a flow velocity in a circulation flow path and thus increase a spraying force of the washing water.

Second, a mixed fluid that compressed air and washing water are mixed in an air mixer can flow from a large diameter to a small diameter, and accordingly an impact force can be applied to the water by a water hammer effect, thereby increasing a spraying force of the water.

Third, since washing power can be atomized by mixing with compressed air and a water hammer effect, washing efficiency can increase through such atomization of washing water mixed with a high concentration of detergent.

Fourth, circulated washing water can be sprayed in various directions, which may result in shortening a time required to wet clothes.

Fifth, a high concentration of detergent can be uniformly sprayed on clothes together with washing water even with a small amount of water.

Sixth, a spraying duration of washing water can be increased even with a small amount of water used.

Seventh, since an air pump unit and an air mixer unit are integrally provided inside a single housing, a structure can be simplified and the number of components can be reduced.

Eighth, there is only one aeration module, which may facilitate connection and disconnection of the aeration module to and from a circulation flow path and a plurality of nozzles.

Ninth, since an air pump and an air mixer are installed in a single housing, a performance test of an aeration device can be executed even using only an aeration module, separate from a washing machine.

Tenth, when an air pump and an air mixer are installed inside a cabinet, an installation space can be efficiently utilized.

Eleventh, since an air pump is mounted inside a single housing, it is easy to reduce vibration generated in the air pump.

Twelfth, vibration can be minimized by applying a diaphragm type air pump using an electromagnet.

Thirteenth, by providing a separate bypass flow path inside an air mixer, water pressure of washing water flowing into a mixing chamber can be decreased even with the same air pump capacity, so that an amount of air injected can be increased relative to the washing water. Accordingly, a water hammer effect by mixing of air and water can increase, thereby effectively increasing spraying power.

BEST MODE FOR CARRYING OUT THE DISCLOSURE

Hereinafter, a washing machine according to the present invention will be described in detail with reference to the accompanying drawings. In this specification, the same or equivalent components may be provided with the same or similar reference numbers even in different embodiments, and description thereof will not be repeated. A singular representation may include a plural representation unless it represents a definitely different meaning from the context.

Figure 1:
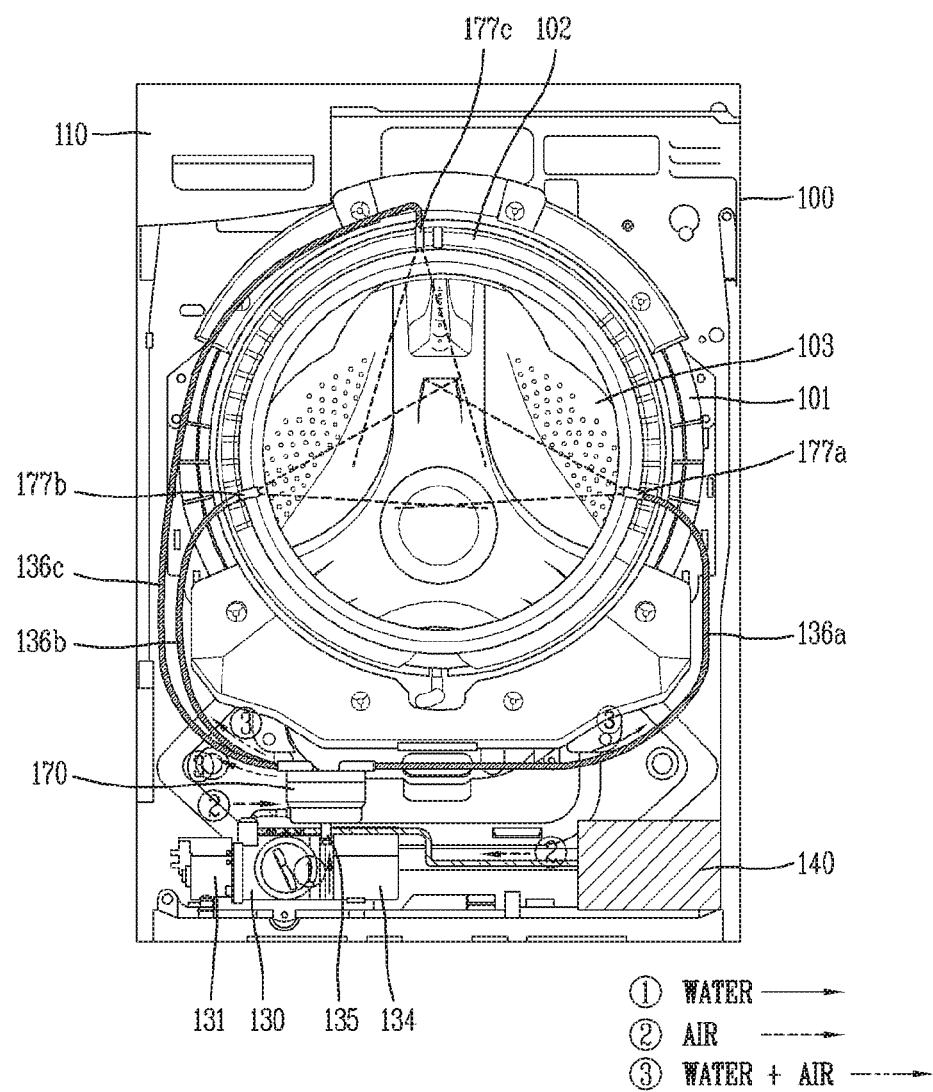
FIG. 1 is a front view illustrating a main configuration of a washing machine according to the present invention.
Figure 2:
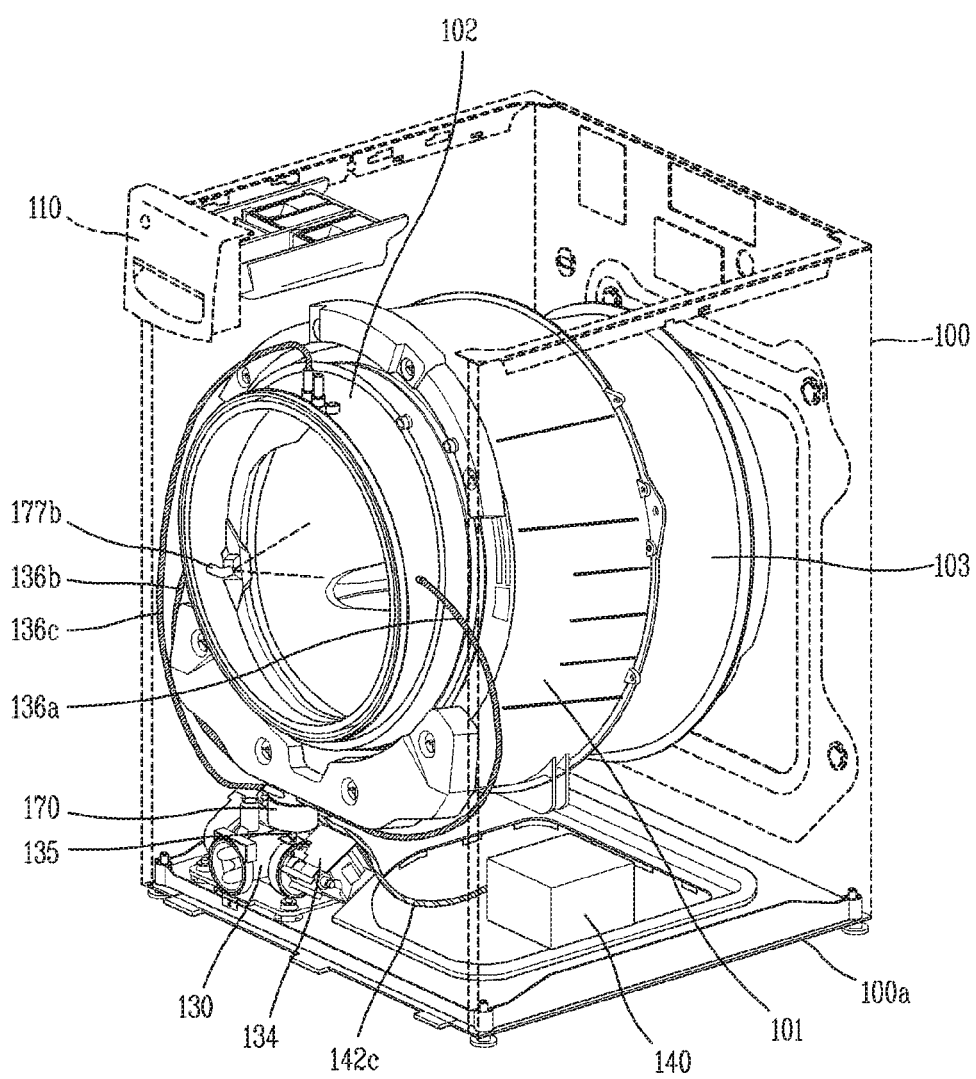
FIG. 2 is a perspective view of the washing machine FIG. 1.
Figure 3:
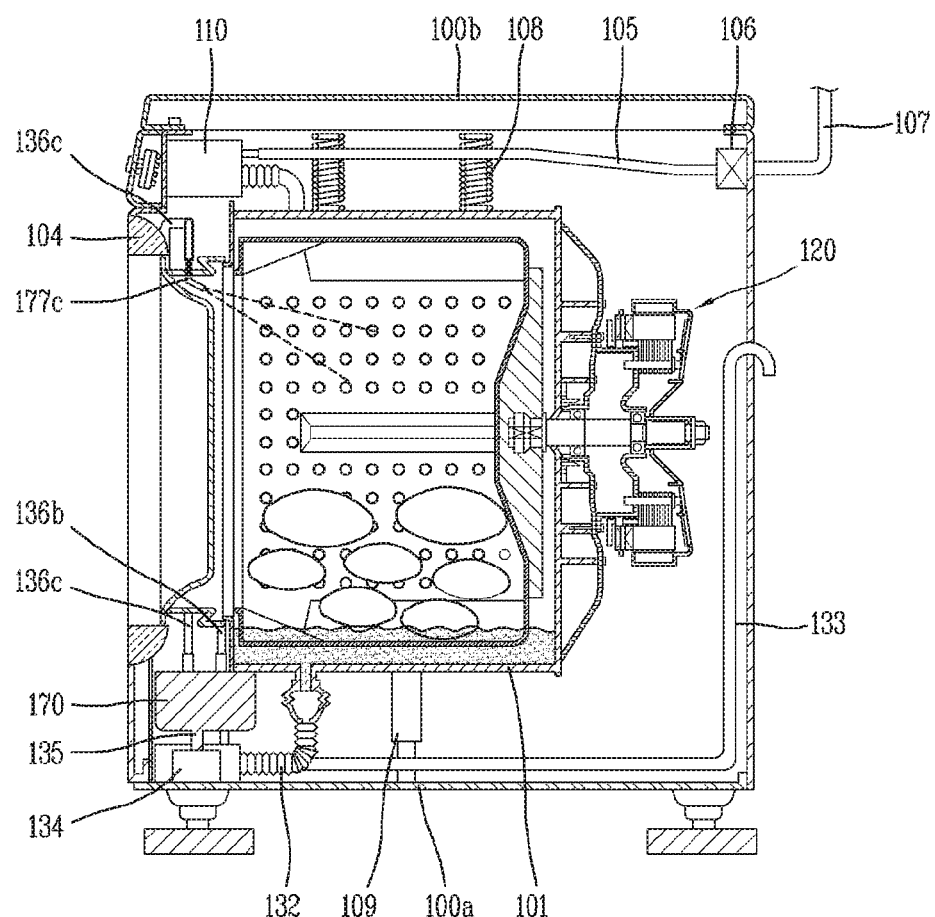
FIG. 3 is a lateral view of the washing machine FIG. 2.

FIG. 1 is a front view illustrating a main configuration of a washing machine according to the present invention, FIG. 2 is a perspective view of the washing machine FIG. 1, and FIG. 3 is a lateral view of the washing machine FIG. 2.

Referring to FIG. 1, the washing machine includes a cabinet 100, a tub 101, a drum 103, and an aeration device. The cabinet 100 forms an external shape and frame of the washing machine.

An inlet port through which an object to be washed (referred to as 'cloths' or 'laundry') is formed through a front surface of the cabinet 100, and a door 104 for opening and closing the inlet port is rotatably disposed on the front surface of the cabinet 100.

The tub 101 is provided with a storage space for storing washing water therein, and an opening formed at a front portion thereof to communicate with the inlet port of the cabinet 100. The tub 101 is provided with a gasket 102 at the front thereof so as to connect the opening to the inlet port of the cabinet 100. The tub 101 may be formed in a cylindrical shape.

A drain port is formed through a bottom surface of the tub 101, and a bellows type drain pipe 132 is connected to the drain port so that washing water is drained from the tub 101 through the drain port. Vibration and impact transferred to the tub 101 may be buffered by springs 10 connecting a top cover 100b of the cabinet 100 and a top of the tub 101 and a damper 109 connecting a base cover 100a of the cabinet 100 and a bottom of the tub 101. Such buffering device of the tub 101 is not limited to this.

A water supply device includes a water supply pipe 105 disposed between the top cover 100b forming a top surface of the cabinet 100 and the top of the tub 101 and connected to an external hose 107, and a water supply valve 106 for opening and closing a flow path of the water supply pipe 105. Water may be supplied from outside through a water supply hose.

A detergent input unit 110 is provided in an upper portion of a front cover 100c forming a front surface of the cabinet 100. The detergent input unit 110 is formed in a drawer-like shape to be drawable in and out. The detergent input unit 110 is provided with a storage portion for storing detergent. The detergent input unit 110 is connected to the water supply pipe 105 such that externally-supplied water can be introduced into the storage portion to be mixed with the detergent. The detergent input unit 110 communicates with the tub 101 such that the detergent can be supplied into the tub 101 together with supplied water to get the clothes wet.

The drum 103 is provided therein with an accommodating space for accommodating the clothes, and rotatably installed in the tub 101. The drum 103 has a plurality of through holes, through which washing water of the tub 101 can be introduced into the drum 103. A plurality of lifters is provided inside the drum 103. The lifters lift the clothes upward in a circumferential direction during the rotation of the drum 103 and then fall the upwardly-lifted clothes, so as to provide an effect similar to beating the clothes with a laundry bat to enhance washing performance.

A driving unit 120 for driving the drum 103 is mounted on a rear surface of the tub 101. The driving unit 120 which is a motor may include a stator and a rotor which generate an electromagnetic force by electrical interaction therebetween, and a rotating shaft coupled with the rotor to rotate together with the rotor. As the rotating shaft may have one side inserted through the rear surface of the tub 101 to be connected to a rear surface of the drum 103, and another side connected to the rotor such that a driving force of the motor is transferred to the drum to rotate the drum 103.

A pump unit is provided on the base cover 100a forming the bottom surface of the cabinet 100. The pump unit includes a pump casing 130, a drain pump 131, and a circulation pump 134.

A rear portion of the pump casing 130 is connected to the drain pipe 132. A filter is installed in the pump casing 130 to remove foreign substances from the drained washing water. A first connection flow path may be formed inside the pump casing 130 to communicate with the drain pump 131 so that the washing water drained through the drain pipe 132 flows into the drain pump 131 through the first connection flow path. The drain pump 131 may discharge the drained washing water through a drain hose connected to the outside.

A second connection flow path may be formed inside the pump casing 130 to communicate with the circulation pump 134 so that the washing water discharged from the drum 103 is introduced into the circulation pump 134 through the second connection flow path. The circulation pump 134 may circulate the washing water discharged from the drum 103 back into the drum 103 through a circulation flow path 136. The circulation pump 134 may include therein a circulation pump 134 chamber communicating with the second connection flow path, an impeller rotatably installed in the circulation pump chamber, and a pump motor for driving the impeller. A circulation hose connection pipe 135 protrudes upward from one side (upper portion) of the pump casing 130. The circulation hose may be coupled to the circulation hose connection pipe 135 such that the washing water can flow to an air mixer 170 along the circulation hose.

The circulation flow path 136 may be a circulation hose for circulating the washing water therealong, and may be configured as a circulation hose for connecting the circulation pump 134 and the tub 101.

In the present invention, an aeration device is provided to increase a spraying force of washing water.

The aeration device may include an air pump 140 and an air mixer 170. The aeration device may increase the spraying force of the washing water in a manner of introducing and mixing compressed air into washing water, which flows along the circulation flow path 136, moving the air-mixed washing water back to the circulation flow path 136 (a plurality of distribution flow paths 136a, 136b, and 136c), and spraying the mixed fluid, in which the compressed air and the washing water are mixed with each other, into the drum 103 through a plurality of nozzles 177.

Figure 4A:
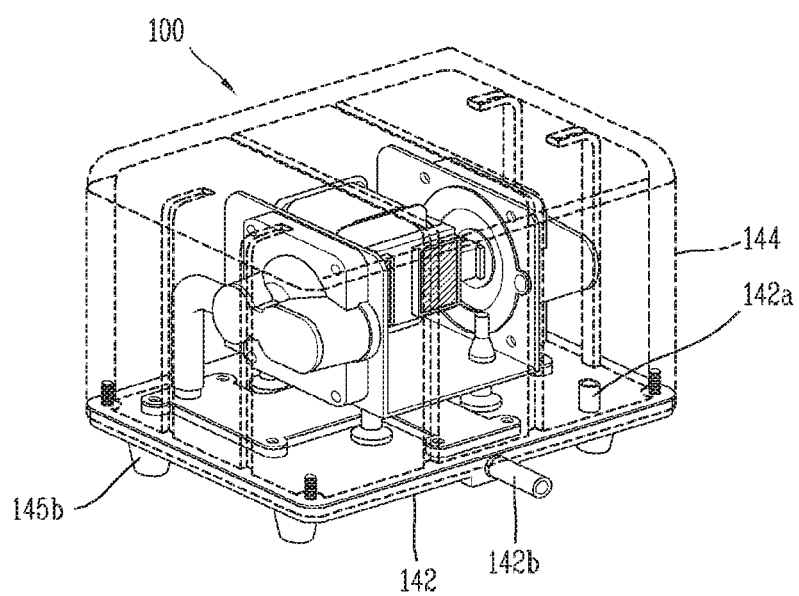
FIG. 4A is a perspective view illustrating an air pump of FIG. 1.
Figure 4B:
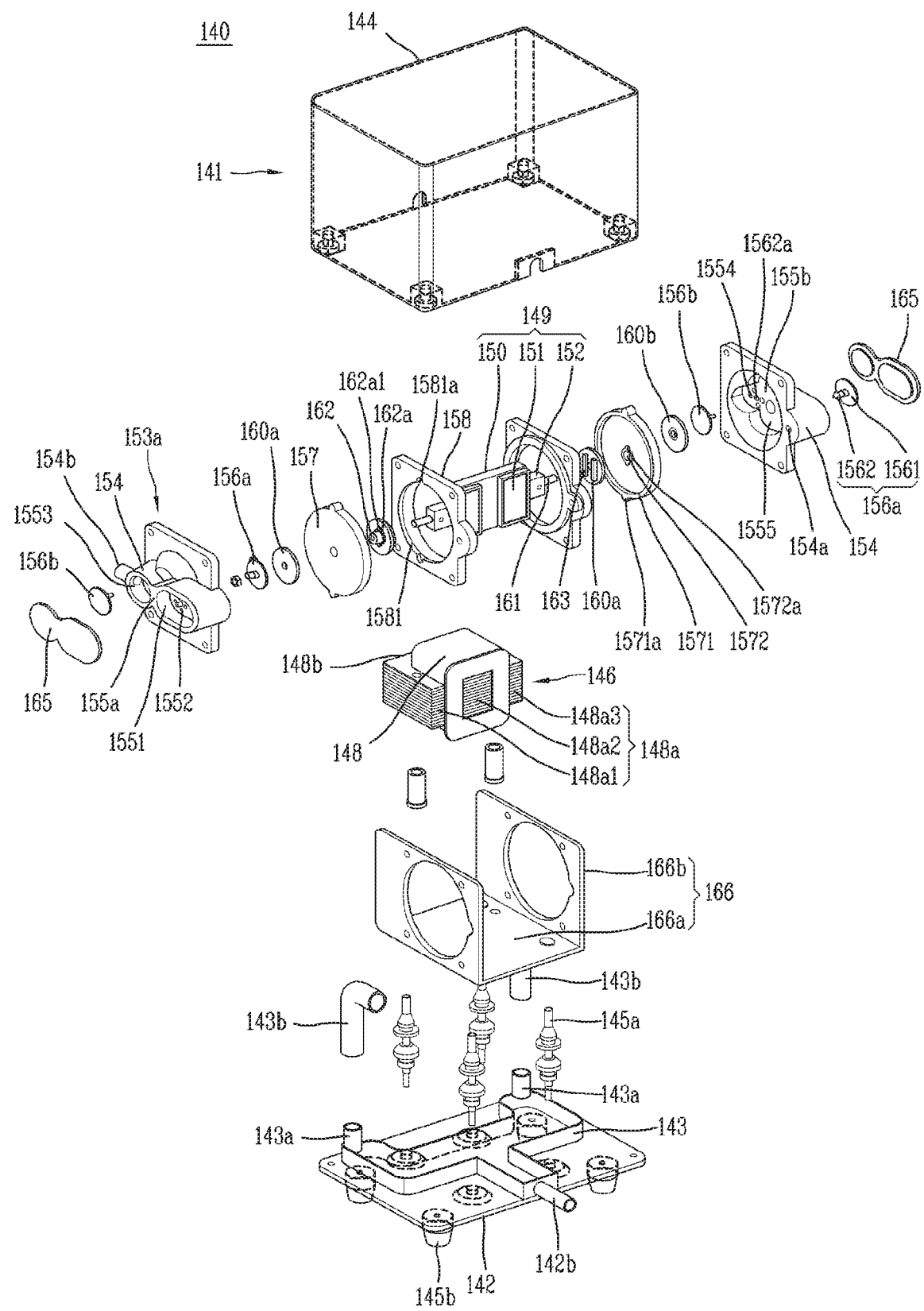
FIG. 4B is an exploded perspective view of FIG. 4A.

FIG. 4A is a perspective view illustrating the air pump 140 of FIG. 1, and FIG. 4B is an exploded perspective view of FIG. 4A.

The air pump 140 serves to compress air. The air pump 140 may compress air that has flowed into the cabinet 100 from outside of the cabinet 100. The air may be introduced through a separate air inlet pipe or may be introduced from the outside through a suction port 154a formed through the cabinet 100.

The air pump 140 may be realized as a diaphragm type using an electromagnet.

The air pump 140 may include a casing 141, that is, a base part 142 and an upper cover 144, which form an outer appearance and an outer shape. Inner components may be mounted on the base part 142. A vibration-preventing member 145b made of a rubber material may be installed on a lower portion of the base part 142 to reduce vibrations transmitted from the outside to the air pump 140 and to reduce vibrations transmitted from the air pump 140 to the outside such as the cabinet 100.

The upper cover 144 may be formed in a box shape and cover an upper portion of the base part 142. The upper cover 144 may be provided therein with an accommodation space to accommodate the inner components mounted on the base part 142. The inner components include an electromagnet part 146, an operation part 149 and a compression part 153. Lower portions of four corners of the upper cover 144 may be coupled to four corners of the base part 142 by coupling elements such as bolts.

An intake port 142a protrudes from an upper surface of the base part 142 to the accommodation space of the upper cover 144. The intake port 142a may communicate with the outside of the casing 141 such that external air can be introduced.

An exhaust port 142b may protrude from one side surface of the base part 142 such that compressed air generated in the air pump 140 can be discharged therethrough. Also, an exhaust flow path portion 143 may be formed in the base part 142 to guide air compressed in the compression art 153 to the exhaust port 142b.

The exhaust flow path portion 143 is provided with an exhaust flow path through which the compressed air flows, and two exhaust connection portions 148b, 143a protruding upward from an opposite side of the exhaust port 142b in a direction facing the exhaust port 142b or an exhausting direction (flowing direction) of the compressed air. The exhaust connection portions 148b and 143a are connected to communicate with a connection hose 143b (or a connection pipe) connected to a discharge port 154b of the compression part 153. The compressed air discharged from the discharge port 154b of the compression part 153 flows to the exhaust port 142b along the exhaust flow path through the exhaust connection portions 148b, 143a via the connection hose 143b. The compressed air flowed to the exhaust port 142b is then delivered to the air mixer 170 through an air hose which forms an air flow path 142c. One end of the air hose is connected to communicate with the exhaust port 142b and another end of the air hose is connected to communicate with the air mixer 170 so that the compressed air is delivered to an air inlet 173 of the air mixer 170.

Figure 5A:
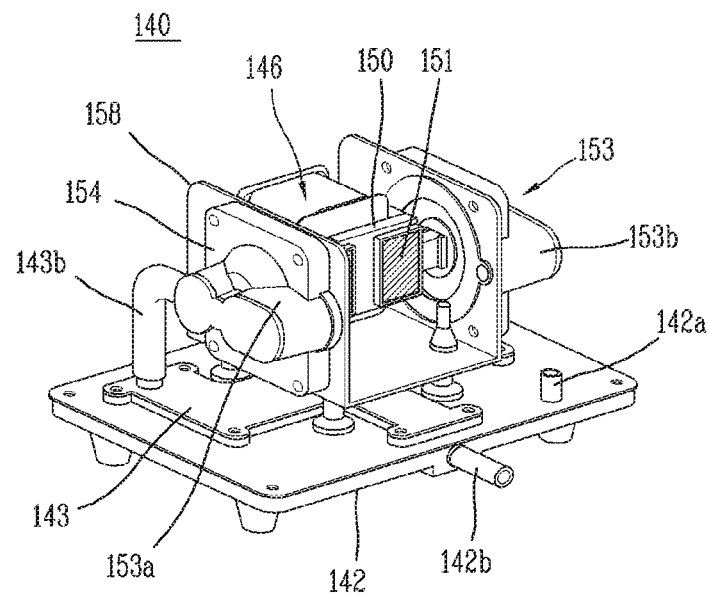
FIG. 5A is a perspective view illustrating inner components of a casing in FIG. 4A.
Figure 5B:
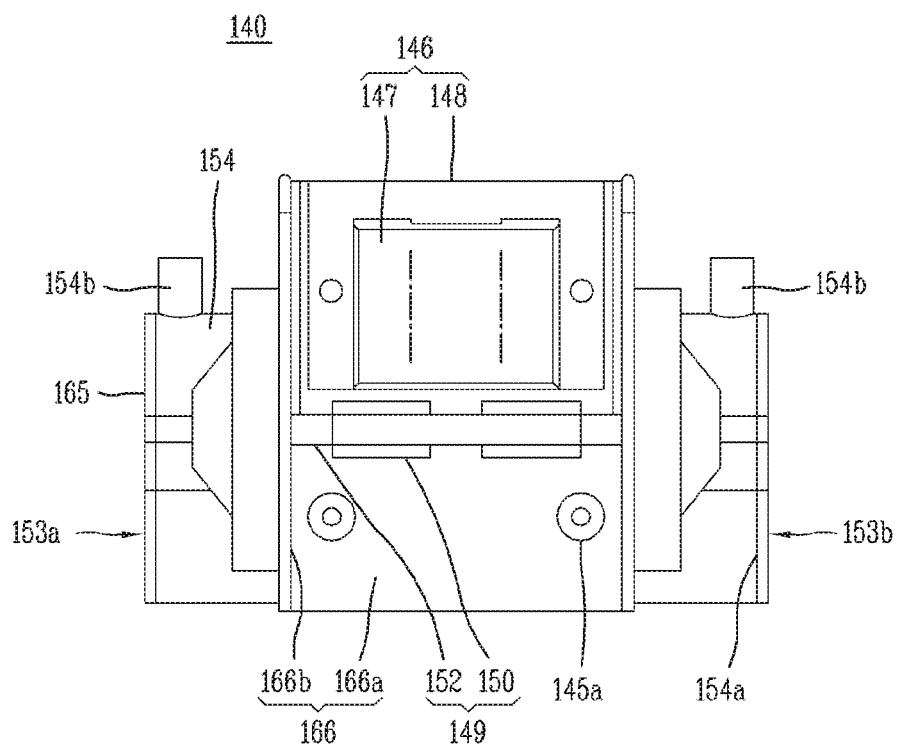
FIG. 5B is a planar view of FIG. 5A.
Figure 6A:
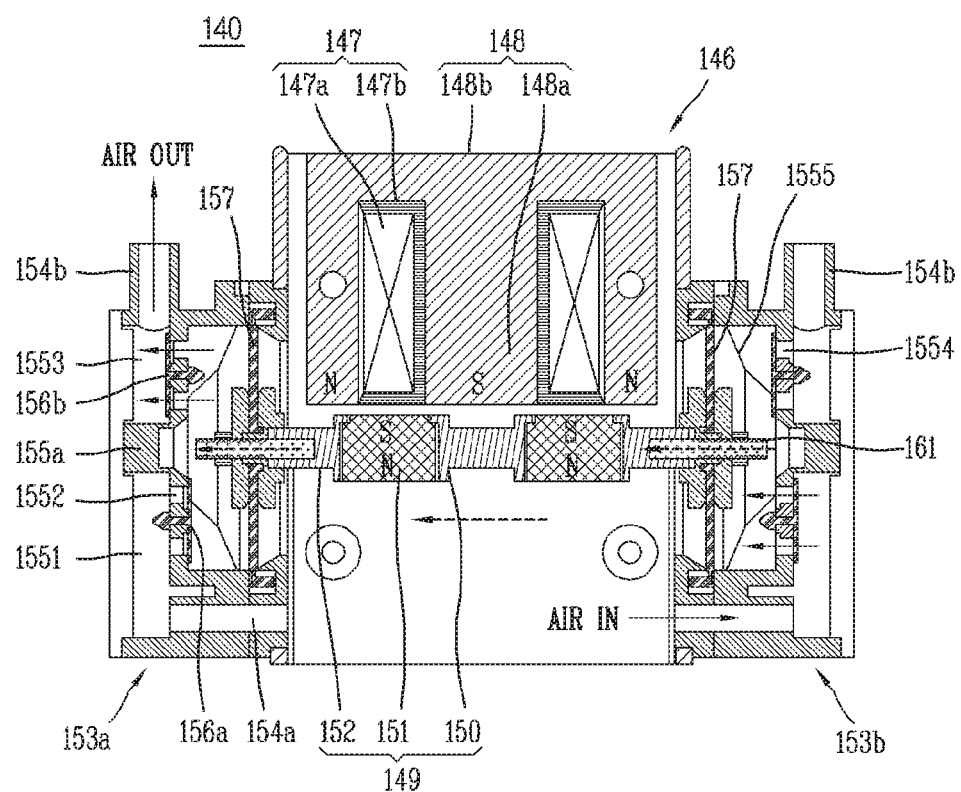
FIG. 6A is a cross-sectional view illustrating a compression action of a first compression unit when an operation part is moved to the left in FIG. 5B.
Figure 6B:
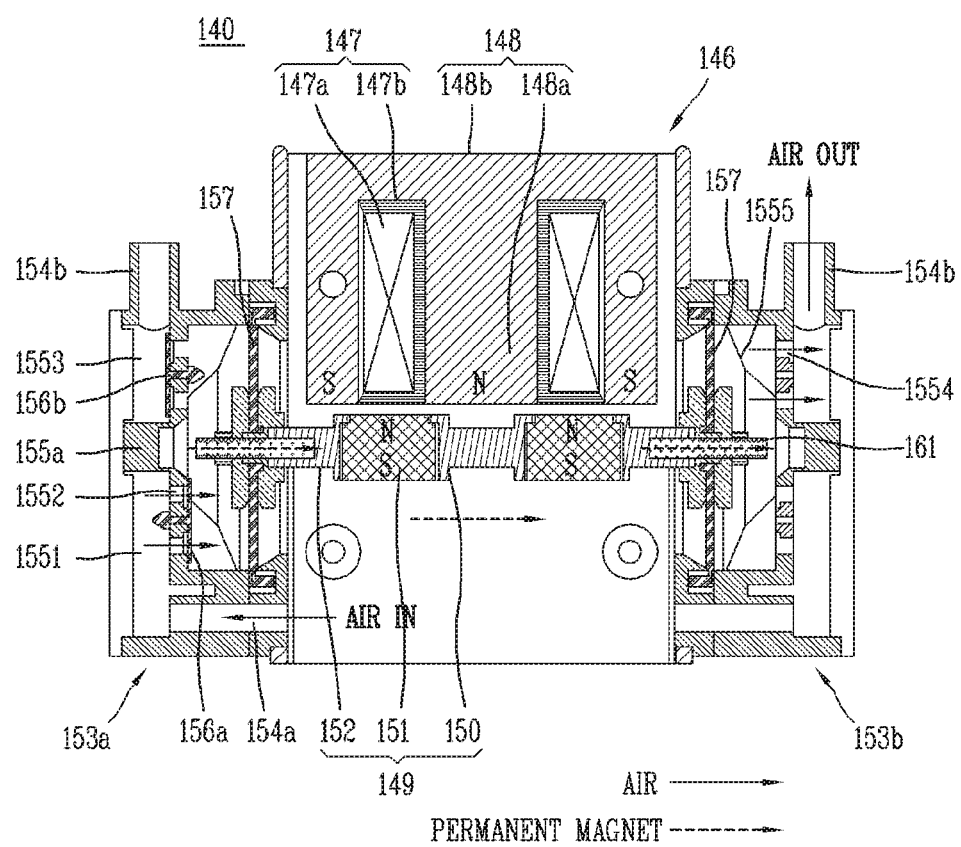
FIG. 6B is a cross-sectional view illustrating a compression action of a second compression unit when the operation part is moved to the right in FIG. 5B.

FIG. 5A is a perspective view illustrating the inner components of the casing 141 in FIG. 4A, FIG. 5B is a planar view of FIG. 5A, FIG. 6A is a perspective view illustrating a compression action of a first compression unit 153a when an operation part 149 moves to the left in FIG. 5B, and FIG. 6B is a cross-sectional view illustrating a compression action of a second compression unit 153b when the operation part 149 moves to the right in FIG. 5B.

The air pump 140 includes an electromagnet part 146 for generating an electromagnetic force for compressing air, an operation part 149 linearly reciprocating by interaction with the electromagnet part 146, and a compression part 153 for compressing the air in response to an operation of the operation part 149.

The electromagnet part 146 is magnetized when an electric current is applied and has a property to return to its original state when the electric current is interrupted. The electromagnet part 146 generates an electromagnetic force, namely, attractive force and repulsive force by interaction with the operation part 149 having a permanent magnet 151.

The electromagnet part 146 is provided with a coil winding portion 147 forming a magnetic field when a current is applied, and a core portion 148 magnetized through the coil winding portion 147.

The coil winding portion 147 may be provided with a coil 147a to which a current is applied and a bobbin 147b on which the coil 147a is wound. When power (current) is applied to the coil 147a, a magnetic field is formed around the coil 147a.

The core portion 148 is provided with a plurality of protrusions 148a, and a connecting portion 148b connecting the plurality of protrusions 148a. Each of the plurality of protrusions 148a has one side connected to the connecting portion 148b and another side protruding in parallel to each other in a direction away from the connecting portion 148b. The plurality of protrusions 148a may be spaced apart from each other, and may be inserted into a hollow portion of the bobbin 147b. For example, the coil winding portion 147 is engaged with the core portion 148 so that one protrusion 148a of the plurality of protrusions 148a is inserted into the bobbin 147b.

When an AC current (AC power source) is applied to the coil 147a, a magnetic field is formed around the coil 147a. Three protrusions 148a1, 148a2 and 148a3 of the core portion 148 can be magnetized to an N pole, an S pole and the N pole or the S pole, the N pole and the S pole, respectively, by the magnetic field.

The operation part 149 is disposed to face the electromagnet part 146 so as to interact with the electromagnet part 146 and linearly reciprocates with respect to the electromagnet part 146 in an intersecting direction with the direction facing the electromagnet part 146. The operation part 149 substantially generates power.

The operation part 149 includes a magnet mounting portion 150 on which the permanent magnet 151 is mounted, and a moving portion 152 connecting the magnet mounting portion 150 to diaphragms 157 of the compression part 153 to transfer power to the air compression part 153.

The magnet mounting portion 150 is disposed to face the core portion 148. The permanent magnet 151 is preferably provided by at least two in number for efficient power transfer. The magnet mounting portion 150 includes two magnet receiving holes in which the two permanent magnets 151 can be inserted. The two permanent magnets 151 may be press-fitted into the magnet receiving holes, respectively, and disposed in a direction of facing the coil 147a, which is wound between the plurality of protrusions 148a of the core portion 148, through the magnet receiving holes.

The plurality of permanent magnets 151 may be disposed so as to have polarities of the S and N poles in the direction of facing the core portion 148. For example, the permanent magnet 151 facing the core portion 148 may be disposed such that one surface has the S pole and another surface opposite to the one surface has the N pole.

Two permanent magnets 151 adjacent to each other among the plurality of permanent magnets 151 may be arranged to have opposite polarities.

If one surface of one of the two permanent magnets facing the core portion 148 has the S pole and an opposite surface of the one surface has the N pole, one surface of the other permanent magnet 151 has the N pole and an opposite surface of the one surface has the S pole.

The two permanent magnets 151 may face the two adjacent protrusions 148a in a diagonal direction and may be subject to attraction and repulsion with each other due to electrical interaction with the two magnetized protrusions 148a.

The magnet mounting portion 150 and the moving portion 152 may linearly reciprocate by the attraction and repulsion in an intersecting direction with the direction facing the core portion 148.

For example, when a current is applied to the coil 147a, the three protrusions 148a of the core portion 148, i.e., a first protrusion 148a1 located at one end, a second protrusion 148a2 located at the middle, and a third protrusion 148a3 located at an opposite end are magnetized to N, S and N poles, respectively, and the two permanent magnets 151 facing the coil 147a between the protrusions 148a, that is, a left first permanent magnet 151 and a right second permanent magnet 151 may have the S and N poles, respectively. According to the polarities, the attractive force is applied between the first protrusion 148a1 of the N pole and the first permanent magnet 151 of the S pole, and the repulsive force is applied between the second protrusion 148a2 of the S pole and the first permanent magnet 151b of the S pole. On the other hand, the attractive force is applied between the second protrusion 148a2 of the S pole and the second permanent magnet 151 of the N pole, and the repulsive force is applied between the third protrusion 148a3 of the N pole and the second permanent magnet 151 of the N pole. According to such interaction, the magnet mounting portion 150 moves to the left (one direction of the direction facing the core portion 148 and the intersecting direction with the facing direction) with respect to the core portion 148.

Since the AC current is applied to the coil 147a, the polarities of the three protrusions 148a of the core portion 148 may be changed. According to this, the magnet mounting portion 150 may move to the right (another one of the direction facing the core portion 148 and the intersecting direction with the facing direction).

The moving portion 152 may extend from one side and another side of the magnet mounting portion 150 in a moving direction of the magnet mounting portion 150 and may be connected to the diaphragms 157 of the compression part 153 to transfer power.

The compression part 153 may be connected to both sides of the operation part 149 in the moving direction of the operation part 149, to compress air by receiving the power from the operation part 149. The compression part 153 may include a first compression unit 153a coupled to one side of the operation part 149 and a second compression unit 153b coupled to another side of the operation part 149 such that the two compression parts 153 can operate by the electromagnet part 146 and the operation part 149 which are one set of generating power by their interaction. Thereby, efficient power transmission is possible.

The first compression unit 153a and the second compression unit 153b may be spaced apart from each other so as to face each other in the moving direction of the operation part 149 and may be connected to each other by the operation part 149.

Since the first compression unit 153a and the second compression unit 153b have an organic coupling relation with respect to the operation part 149, the first compression unit 153a and the second compression unit 153b may perform opposite operations to each other from the single electromagnet part 146 and the single operation part 149. For example, when the first compression unit 153a performs an operation of compressing and exhausting air, the second compression unit 153b may perform an operation of sucking air. As a result, the first compression unit 153a and the second compression unit 153b perform compression, exhaust, and suction strokes alternately, thereby efficiently performing air compression.

Since the first compression unit 153a and the second compression unit 153b have the same basic configuration, the first and second compression units 153a and 153b will be collectively referred to as the compression part 153 by omitting the terms 'first' and 'second' in the following description.

The compression part 153 includes a compression part main body 154, a suction port 154a, a diaphragm 157, a support portion 158, and a discharge port 154b.

The compression part main body 154 may include a first partition wall 155a vertically extending therein. The compression part main body 154 may be divided by the first partition wall 155a into an air compression chamber 1555 formed at one side and an air suction chamber 1552 and an air discharge chamber 1553 formed at another side. Also, the compression part main body 154 may include a second partition wall 155b horizontally disposed at an opposite side of the air compression chamber 1555. The compression part main body 154 may be divided by the second partition wall 155b into the air suction chamber 1552 and the air discharge chamber 1553.

The air compression chamber 1555 is provided therein with a diaphragm 157 to compress air sucked into the air compression chamber 1555. The diaphragm 157 may be made of a flexible material, for example, a rubber or a metal plate, in the form of a circular plate. However, the present invention is not necessarily limited to these material and shape. The diaphragm 157 performs a function of applying pressure to a fluid and a sealing function with a thin film. The diaphragm 157 is configured to cover one side of the air compression chamber 1555 for the sealing function. Also, the diaphragm 157 may suck external air into the air compression chamber 1555 or compress sucked air as its center portion moves bidirectionally with its outer circumferential portion fixed by using elastic force.

The support portion 158 is disposed between the operation part 149 and the air suction chamber 1552 of the compression part main body 154 to elastically support the diaphragm 157. The support portion 158 is disposed to face the compression part main body 154, and is provided therein with a circular hole. Four corners of the support portion 158 may be coupled to one side surface of the compression part main body 154 by bolts or the like. An outer circumferential inserting portion 1571 protrudes from an outer circumferential portion of the diaphragm 157 along a circumferential direction in a thickness direction. The support portion 158 is provided with an outer circumferential accommodating portion 1581 formed in a circular shape along an outer circumference of the circular hole. The outer circumferential accommodating portion 1581 is formed to be concave with a predetermined width corresponding to a thickness of the outer circumferential inserting portion 1571. The outer circumferential inserting portion 1571 may be inserted into the outer circumferential accommodating portion 1581, so that an outer circumferential surface and an inner circumferential surface of the outer circumferential inserting portion 1571 can be covered with the outer circumferential accommodating portion 1571. With this support structure, the diaphragm 157 may be disposed between one edge portion of the compression part main body 154 and the outer circumferential accommodating portion 1581 of the support portion 158 and pressed by coupling between the compression part main body 154 and the support portion 158, thereby fixing the outer circumferential portion of the diaphragm. A plurality of rotation-preventing protrusions 1571a may radially protrude from the outer circumferential surface of the outer circumferential inserting portion 1571 and a plurality of rotation-preventing grooves 1581a may be recessed into an outer circumferential surface of the outer circumferential accommodating portion 1581 in a direction facing the rotation-preventing protrusions 1571a. Accordingly, the rotation-preventing protrusions 1571a may be inserted into the rotation-preventing grooves 1581a, so as to prevent the rotation of the diaphragm 157.

To transfer power to the diaphragm 157, a connection shaft 161 and first and second pressing plates 160a and 160b are provided between the diaphragms 157 and the moving portion 152.

One end of the connection shaft 161 may be coupled to one end of the moving portion 152 and another end of the connection shaft 161 may be coupled to the diaphragm 157. At this time, threads may be formed on an outer circumferential surface of the connection shaft 161 for coupling of the connection shaft 161, and coupling grooves may be formed on both end portions of the moving portion 152. The connection shaft 161 may be inserted into the coupling grooves so as to be coupled to the moving portion 152.

The first pressing plate 160a and the second pressing plate 160b are circular thin plates and may be made of a rigid material such as a metal to apply pressure to the diaphragms 157. A coupling hole is formed at a center portion of the diaphragm 157 and a through hole is formed at a center of each of the first pressing plate 160a and the second pressing plate 160b. The another end portion of the connection shaft 161 may be inserted through the coupling hole and the through hole. Each of the first pressing plate 160a and the second pressing plate 160b are inserted into the connection shaft 161 with the diaphragm 157 interposed therebetween so as to press both side surfaces of the diaphragm 157. To this end, a central protrusion 148a protrudes from a center portion of the diaphragm 157 toward the first pressing plate 160a, and a plurality of rotation-restricting protrusions 1572a is formed on the central protrusion 148a. A center coupling pipe 162 axially protrudes from a center portion of the first pressing plate 160a toward the diaphragm 157 and the second pressing plate 160b. A protrusion accommodation groove 162a is formed around the center coupling pipe 162. A plurality of rotation-restricting grooves 162a1 is formed on the protrusion accommodation groove 162a in a manner of facing the plurality of rotation-restricting protrusions 1572a. A center coupling groove is formed around the through hole of the second pressing plate 160b. The first pressing plate 160a may be disposed at the side of the diaphragm 157 and the second pressing plate 160b may be disposed at the inside of the diaphragm 157. The connection shaft 161 may be inserted from the outside to inside of the diaphragm 157 sequentially through the through hole of the first pressing plate 160a, the coupling hole of the diaphragm 157 and the through hole of the second pressing plate 160b, and then coupled with a nut. At this time, the center coupling pipe 162 of the first pressing plate 160a is inserted into the center coupling groove of the second pressing plate 160b through the coupling hole of the diaphragm 157, and the center protrusion 148a of the diaphragm 157 and the rotation-restricting protrusions 1572a may be inserted into the protrusion accommodation groove 162a and the rotation-restricting grooves 162a1 of the first pressing plate 160a, respectively. When the diaphragm 157 is pressed, the first and second pressing plates 160a and 160b can be restricted from rotating with respect to the diaphragm 157. Also, in order to prevent the rotation of the first pressing plate 160a with respect to the moving portion 152, a plurality of rotation-restricting ribs 163 protrudes from a surface of the first pressing plate 160a, which faces the moving portion 152, toward the moving portion 152. The plurality of rotation-restricting ribs 163 is disposed with being spaced by a thickness interval of an end portion of the moving portion 152. Accordingly, the rotation-restricting ribs 163 are locked in a thickness direction of the end portion of the moving portion 152 so as to restrict the rotation of the second pressing plate 160b.

The first partition wall 155a includes a plurality of air suction holes 1552 formed to communicate the air suction chamber 1552 with the air compression chamber 1555, and a first check valve 156a to open and close the plurality of air suction holes 1552. The first partition wall 155a also includes a plurality of air discharge holes 1554 formed to communicate the air discharge chamber 1553 with the air compression chamber 1555, and a second check valve 156ba to open and close the plurality of air discharge holes 1554.

The plurality of air suction holes 1552 and air discharge holes 1554 may be spaced apart from each other in the circumferential direction and a support hole 1562a may be formed at a center of each of the plurality of air suction holes 1552 and the plurality of air discharge holes 1554.

Since the first check valve 156a and the second check valve 156b have the same structure but differ only in arrangement, direction, and function, the structure of the check valve will be described in which the 'first and second' check valves are collectively referred to simply as a check valve. The check valve 156a includes a cover plate 1561 configured to cover the plurality of air suction holes 1552 or air discharge holes 1554, and a center support portion 1562 protruding from a center of the cover plate 1561 in a thickness direction or an axial direction. Since the cover plate 1561 is made of a material having elasticity, it can be curved by pressure of a fluid to open and close the air suction holes 1552 or the air discharge holes 1554. Since the center support portion 1562 has an end in a hook shape and is made of rubber or the like having elasticity, the center support portion 1562 may be press-fitted into the support hole 1562a. Therefore, the cover plate 1561 can be prevented from being separated from the air suction holes 1552 or the air discharge holes 1554 by virtue of the center support portion 1562.

Since air flows through the air suction holes 1552 and the air discharge holes 1554 are opposite to each other, the first check valve 156a and the second check valve 156b may be inserted and coupled in opposite directions. Thus, the first check valve 156a can restrict only the air flow from the air suction chamber 1552 to the air compression chamber 1555, and the second check valve 156b can restrict the air flow from the air compression chamber 1555 to the air discharge chamber 1553.

In order to suck air into the air suction chamber 1552, the suction port 154a is formed in the compression part main body 154 in an opposite direction from one side surface of the compression part main body 154 (a side surface close to a surface where the diaphragm 157 is located).

In order to discharge air from the air discharge chamber 1553, the discharge port 154b is formed in another side of the compression part main body 154 to communicate with the air discharge chamber 1553.

An end cover 165 may be coupled to the another side of the compression part main body 154 such that the air suction chamber 1552 and the air discharge chamber 1553 are hermetically sealed.

A bracket 166 is provided above the base part 142 to support the first compression unit 153a and the second compression unit 153b.

The bracket 166 may be a plate member in the shape of "⊐". The plate member in the shape of "⊐" may be arranged so that an opened portion faces upward and a closed portion faces downward. The bracket 166 may include a lower support plate 166a horizontally formed and spaced upward from the base part 142 and side support plates 166b extending upward from both ends of the support plate. Each of the side support plates 166b of the bracket 166 has a circular hole and the support portion 158 may be coupled to edge portions of the both side support plates 166b with coupling elements such as bolts.

Vibration-preventing mounts 145a may be provided beneath the bracket 166 to absorb vibrations generated in the electromagnet part 146, the operation part 149 and the compression part 153, so as to reduce vibrations transmitted to the base part 142.

Referring to FIG. 6A, the operating state of the air pump 140 will be described.

According to the electromagnet part 146, a current is applied to the coil 147a of the coil winding portion 147 to generate a magnetic field around the coil 147a, and the plurality of protrusions 148a of the core portion 148 is magnetized to the N, S, and N poles.

According to the operation part 149, the S pole of the first permanent magnet 151 of the magnet mounting portion 150 is attracted to the N pole of the first protrusion 148a1 and repulsive to the S pole of the second protrusion 148a2. Also, the N pole of the second permanent magnet 151 is attracted to the S pole of the second protrusion 148a2 and repulsive to the N pole of the third protrusion 148a3. Accordingly, the magnet mounting portion 150 and the moving part 152 move toward the first compression unit 153a arranged at the left of the operation part 149.

According to the compression part 153, an air compression stroke is performed in the first compression unit 153a and an air suction stroke is performed in the second compression unit 153b.

With regard to the suction stroke, when the moving portion 152 moves to the left, the center portion of the diaphragm 157 of the second compression unit 153b connected to the right side of the moving portion 152 moves in a direction of expanding the air compression chamber 155S. As the air compression chamber 155S is expanded and pressure is lowered, the first check valve 156a is opened by suction pressure of the air compression chamber 155S such that external air can be introduced into the air suction chamber 155Z through the suction port 154a and then introduced into the air compression chamber 155S through the air suction holes 155Z.

With respect to the compression stroke, when the moving portion 152 moves to the left, the center portion of the diaphragm 157 of the first compression unit 153a connected to the left side of the moving portion 152 moves in a direction of compressing the air compression chamber 155S such that air filled in the air compression chamber 155S can be compressed. The second check valve 156b is then opened by pressure of the compressed air such that the compressed air can be discharged through the air discharge holes 155A and then discharged to the outside through the discharge port 154b. The discharged compressed air flows along the connection hose 143b into the exhaust flow path portion 143 via the exhaust connection portions 148b and 143a, and moves to the exhaust port 142b along the exhaust flow path portion 143 to be delivered to the air mixer 170 through the exhaust port 142b.

FIG. 6B illustrates an example in which the polarities magnetized in the plurality of protrusions 148a in the electromagnet part 146 are changed to opposite polarities to those of the electromagnet part 146 in FIG. 6A as an AC current and voltage periodically changed in direction according to time is applied to the coil 147a. According to this, since the operation part 149 moves to the right according to the interaction between the electromagnet part 146 and the operation part 149, the suction stroke is performed in the first compression unit 153a and the compression stroke is performed in the second compression unit 153b.

As illustrated in FIGS. 6A and 6B, the first compression unit 153a and the second compression unit 153b may generate the compressed air by alternately performing the compression and exhaust strokes and the suction stroke.

Figure 7:
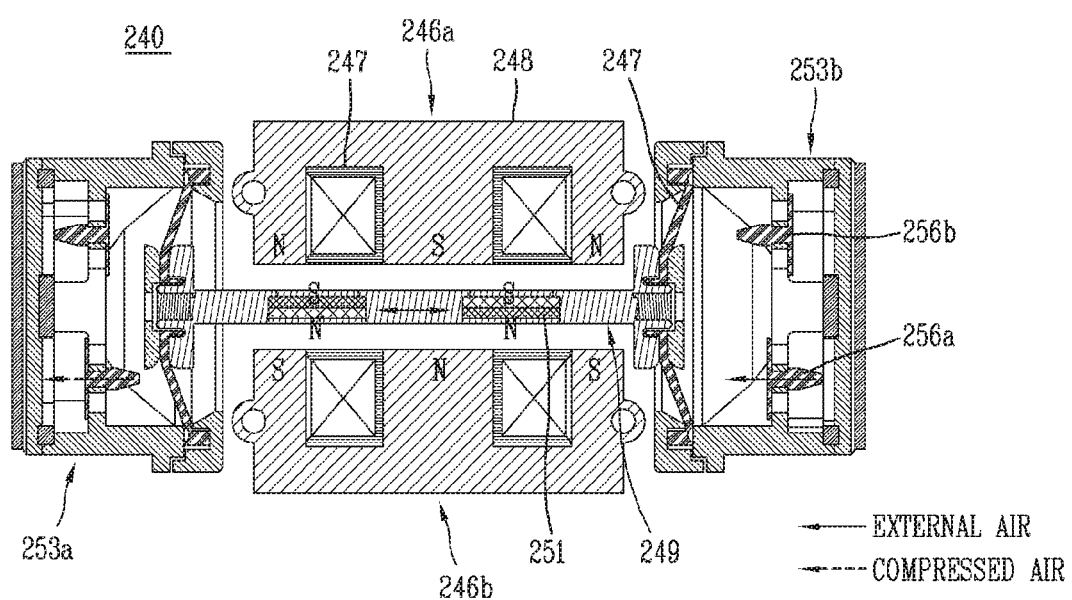
FIG. 7 is a cross-sectional view illustrating a state in which one more electromagnet part is added according to the present invention.

FIG. 7 is a cross-sectional view illustrating a state in which one more electromagnet part 246 is provided according to the present invention.

Referring to FIG. 7, an electromagnet part 246 may include a first electromagnet portion 246a and a second electromagnet portion 246b which are disposed at opposite sides with respect to an operation part 249 with being spaced apart from each other in a direction facing a permanent magnet 251. The first electromagnet portion 246a and the second electromagnet portion 246b may have polarities opposite to each other in the direction facing the permanent magnet 251. The permanent magnet 251 of the operation part 249 receives a magnetic force in forward and backward directions with respect to the first electromagnet portion 246a and the second electromagnet portion 246b. Accordingly, even if power with magnitude of a current lower than that applied to one electromagnet part 146 is applied to the first and second electromagnet portions 246a and 246b, power of the same magnitude can be transmitted.

Figure 8A:
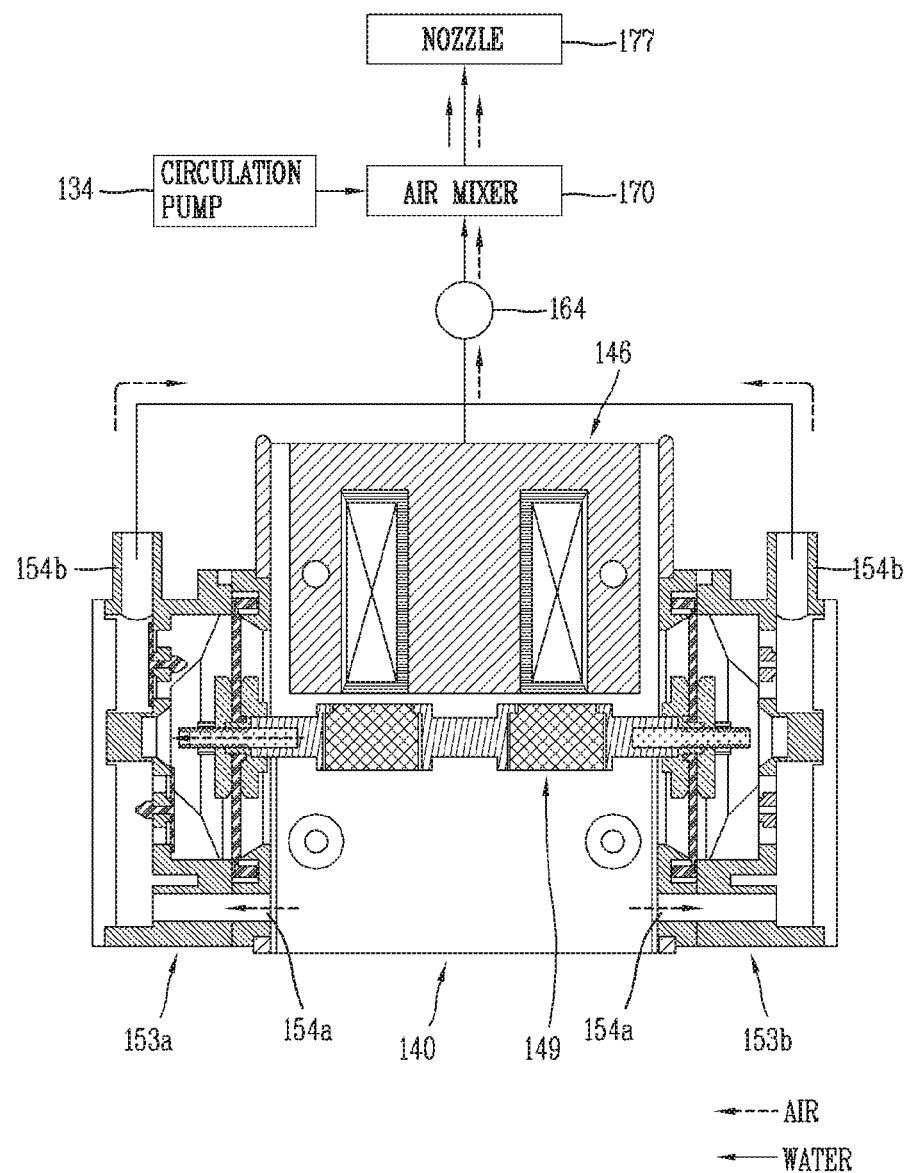
FIG. 8A is a schematic view illustrating a flow of a mixed fluid in which compressed air and washing water are mixed during a normal operation of an aeration device according to the present invention.
Figure 8B:
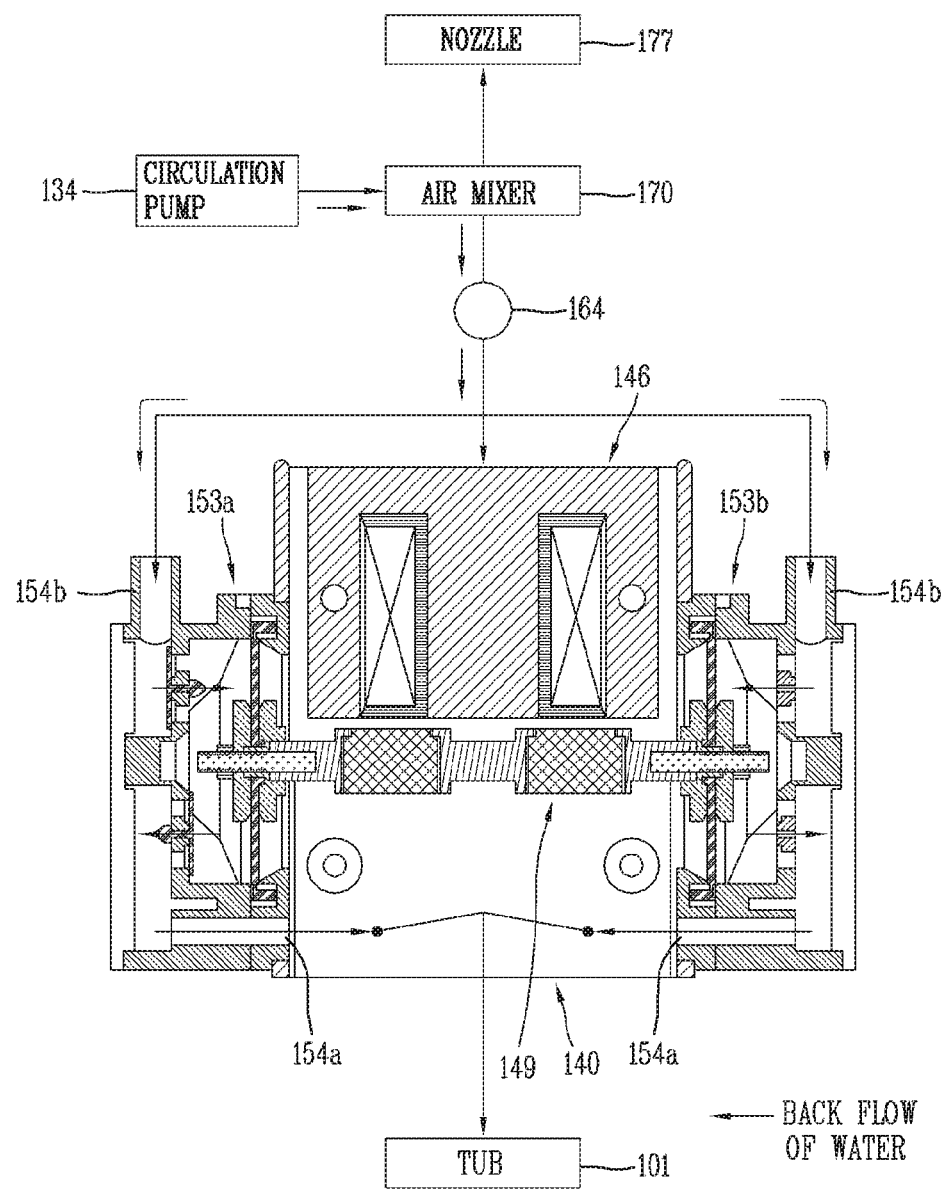
FIG. 8B is a schematic view illustrating a reverse flow of wash water in a failure state of a check valve in FIG. 8A.

FIG. 8A is a schematic view illustrating a flow of a mixed fluid in which compressed air and washing water are mixed during a normal operation of an aeration device according to the present invention, and FIG. 8B is a schematic view illustrating a backward flow of washing water in a check valve failure in FIG. 8A.

In FIG. 8A, a check valve 164 is provided in an air flow path 142c connecting the air mixer 170 and the air pump 140. The check valve 164 is provided for limiting a flow of air in one direction. That is, the check valve 164 conveys air compressed by the air pump 140 to the air mixer 170, but limits a reverse flow in an opposite direction.

However, as illustrated in FIG. 8B, if a failure occurs in the check valve 164, washing water transferred to the air mixer 170 by the circulation pump 134 may flow backward from the air mixer 170 to the air pump 140.

In the present invention, as the suction port 154a of the air pump 140 is connected to the tub 101, the washing water flowing backward to the air pump 140 can circulate to the tub 101 via the suction port 154a, thereby preventing spilling of water.

Figure 9A:
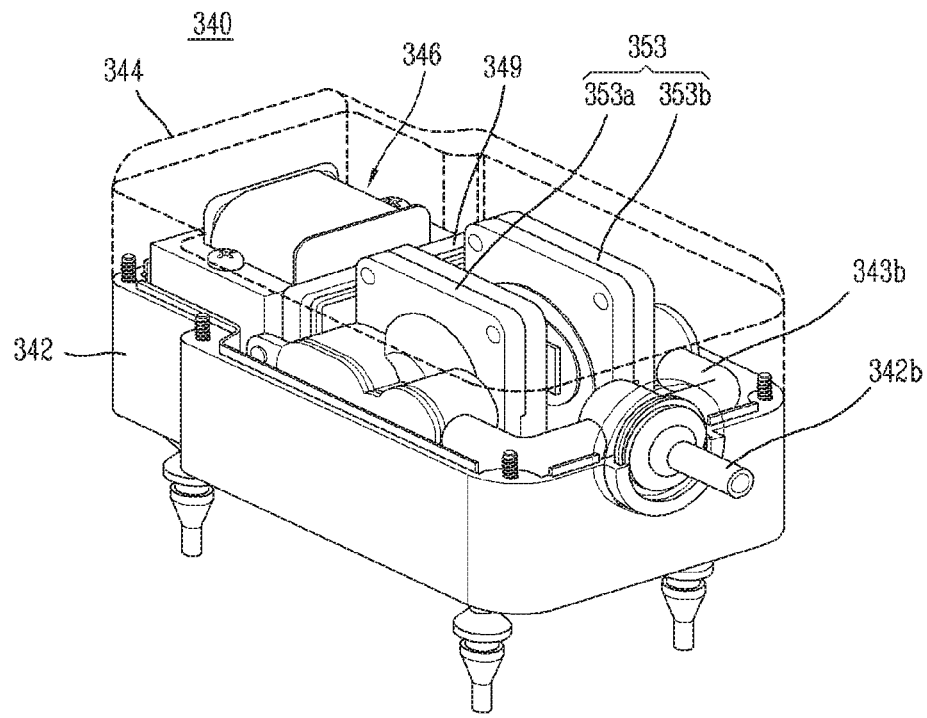
FIG. 9A is a perspective view illustrating another embodiment of an air pump according to the present invention.
Figure 9B:
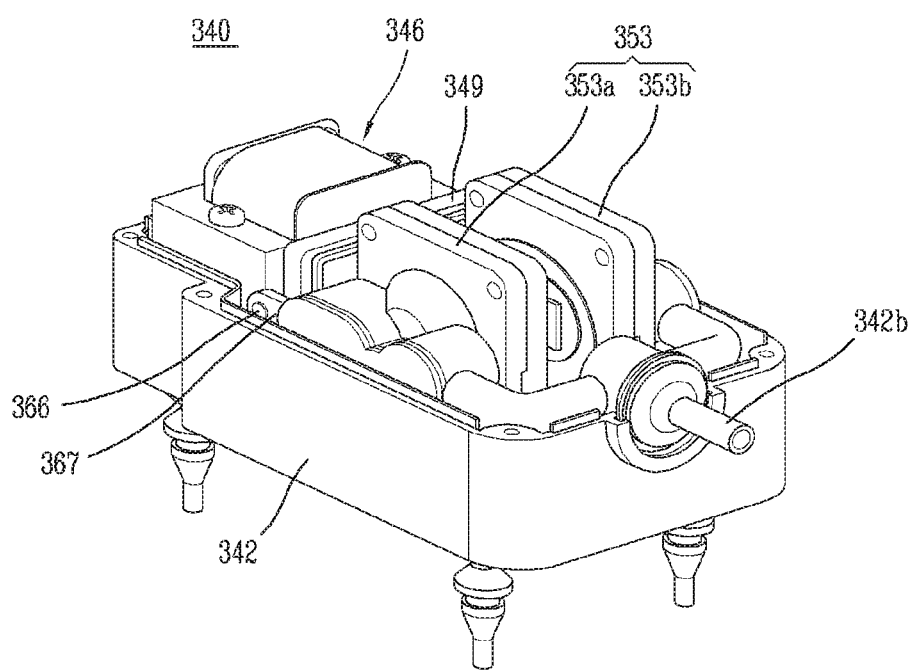
FIG. 9B is a planar view of FIG. 9A.
Figure 9C:
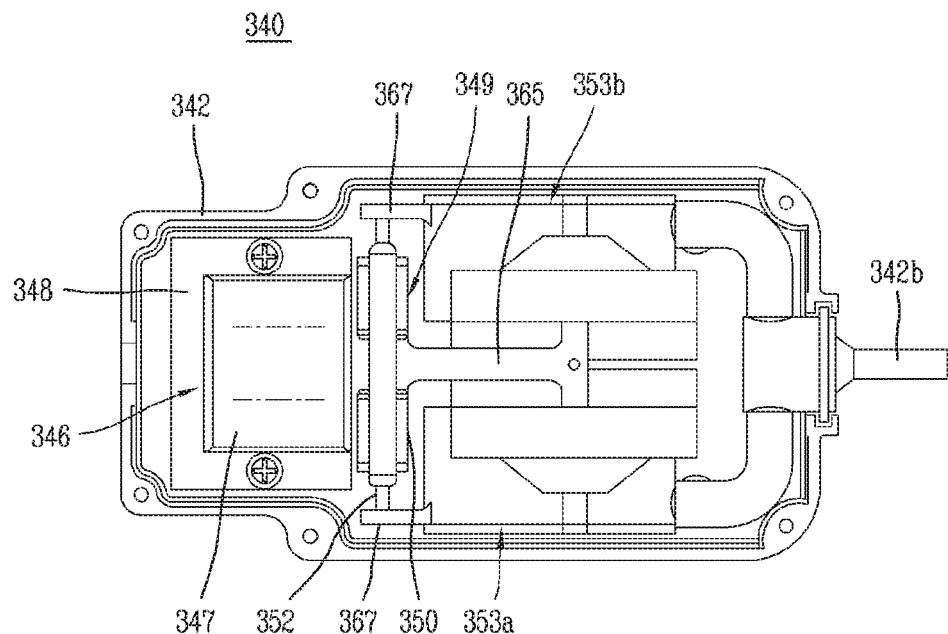
FIG. 9C is a perspective view illustrating a removed state of an upper cover in FIG. 9A.

FIG. 9A is a perspective view illustrating another embodiment of an air pump 340 according to the present invention, FIG. 9B is a planar view of FIG. 9A, and FIG. 9C is a view of a removed state of an upper cover 344 in FIG. 9A.

Referring to FIG. 9A, a casing 341 is provided with a base part 342 and an upper cover 344. The base part 342 is provided with an accommodation space therein formed in a shape of a box such that an electromagnet part 346, an operation part 349 and a compression part 353 are accommodated therein.

The upper cover 344 is configured to cover an upper portion of the base part 342 and an edge portion of the base part 142 and an edge portion of the upper cover 344 may be coupled by coupling elements such as bolts.

A lower portion of the base part 342 is supported by vibration-preventing mounts 345a to absorb vibration of the air pump 340 so as to reduce vibration transferred to the outside.

The compression part 353 illustrated in FIG. 9A includes a first compression unit 353a and a second compression unit 353b that are located at an opposite side of the electromagnet part 346 with respect to the operation part 349 and spaced apart from each other in a moving direction of the operation part 349 in a manner of facing each other. A connecting rod 365 extends from the operation part 349 in a direction intersecting with a direction facing the permanent magnet 351 of the electromagnet part 346 or in a moving direction of the permanent magnet 351. An end of the connecting rod 365 is branched toward compression part main bodies 354 of the first compression unit 353a and the second compression unit 353b so as to be connected to diaphragms 357 of the first and second compression units 353a and 353b, respectively.

Both ends of the operation part 349 may be connected to connecting portions 348b that extends from the compression part main bodies 354 of the first compression unit 353a and the second compression unit 353b toward the operation part 149. Bearings 366 may be inserted into the connecting portions 348b. The bearings 366 may support the operation part 349 such that both ends of the operation part 349 can move in a direction across both side surfaces of the base part 342.

A suction port 354a formed in the first compression unit 353a and the second compression unit 353b is connected so as to allow washing water to be introduced into the tub 101 even when the washing water flows backward due to the failure of the check valve 164 installed in the air flow path 142c which connects the air mixer 142c and the air pump 340, thereby preventing spilling of the washing water.

The air pump 340 of FIGS. 9A and 9B can be further simplified in structure compared to the air pump 140 illustrated in FIG. 4A and the like.

In the present invention, the air pump 140, 240, 340 may be installed on the base cover 100a of the cabinet 100 or on the top cover 100b of the cabinet 100. The air pump 140 illustrated in FIG. 1 is installed on the base cover 100a. When the air pump 140 is installed on the base cover 100a, it is disadvantageous when the washing water flows backward but it is advantageous in terms of vibration. Further, when the air pump is installed at the upper portion of the cabinet 100, it may be advantageous when the washing water flows backward but it may be disadvantageous in terms of vibration. Whether the air pump 140 is installed at the upper portion or the lower portion of the cabinet 100 may be selected according to needs of a consumer.

In the present invention, the air pump 140 of the diaphragm 157 type using the electromagnet has been described as a preferred embodiment. However, the present invention may selectively be applied to an air pump 140 of a motor-piston type which can compress air by an action of a piston driven by a motor, or an air pump 140 of a motor-diaphragm type which can compress air by an operation of a diaphragm driven by a motor. However, the diaphragm type air pump 140 using the electromagnet has advantages of low noise and power reduction in consideration of a flow rate, hydraulic pressure, noise, and the like.

Figure 10:
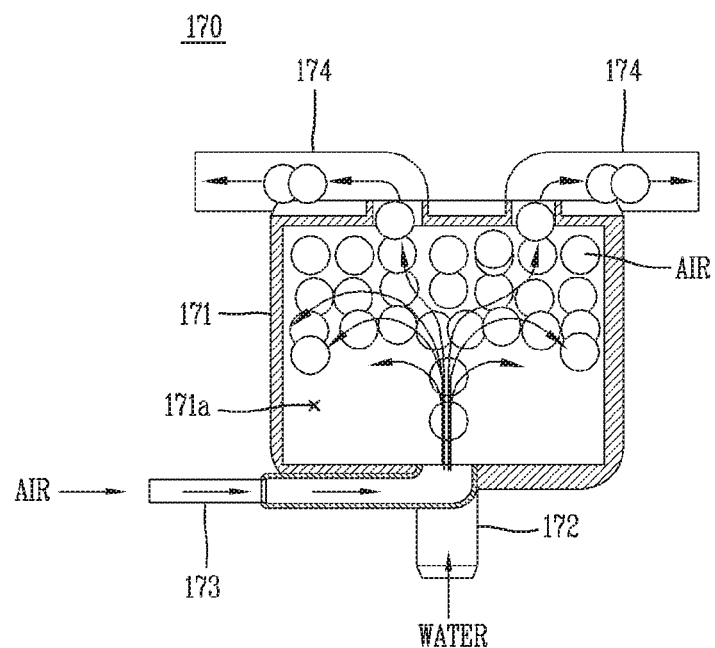
FIG. 10 is a conceptual view illustrating a water hammer effect of an air mixer according to the present invention.
Figure 11A:
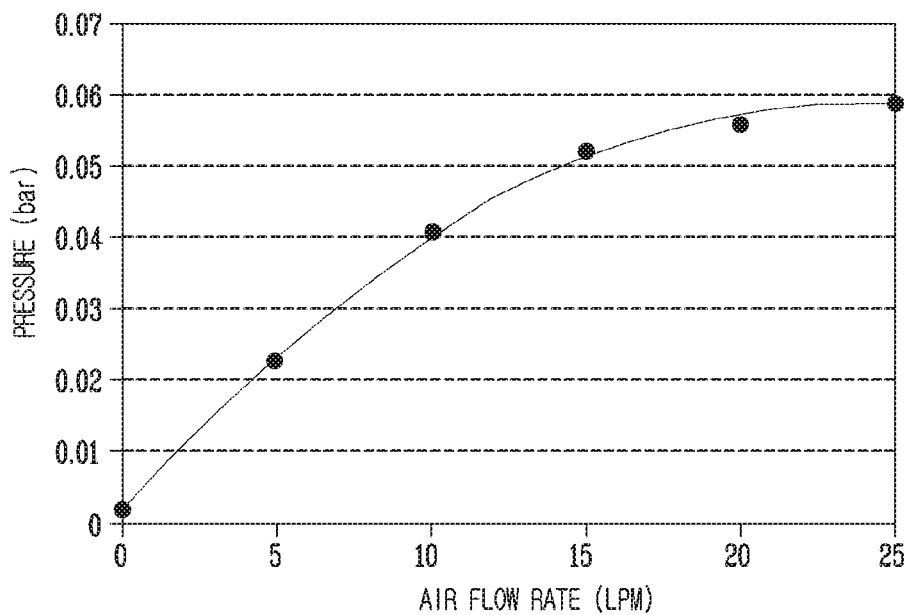
FIG. 11A is a graph showing the relationship between an air flow rate and pressure for explaining an effect of an aeration device according to the present invention.
Figure 11B:
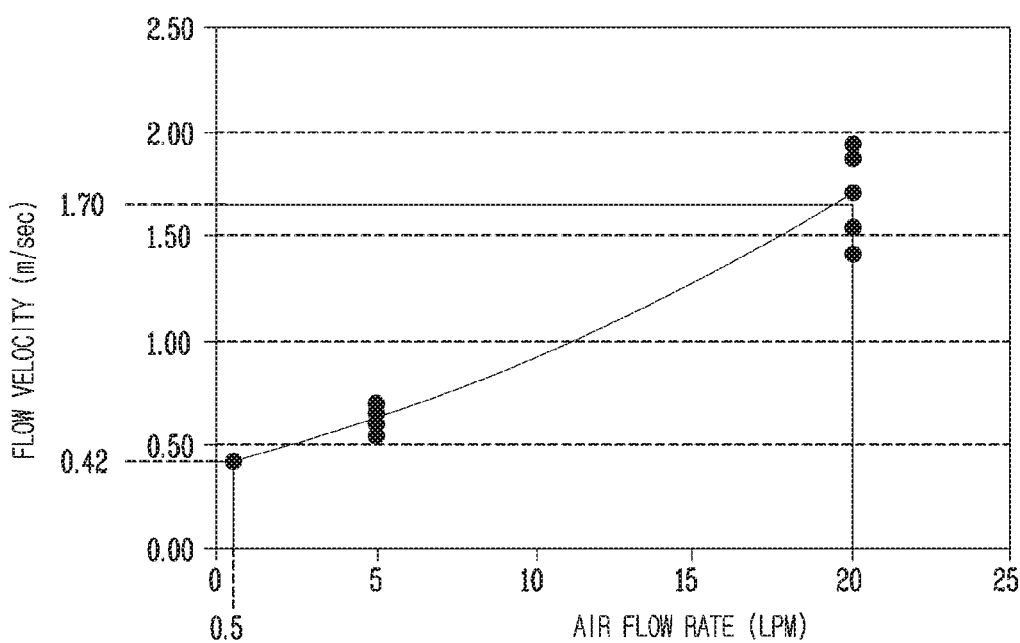
FIG. 11B is a graph showing the relationship between an air flow rate and a flow velocity for explaining an effect of an aeration device according to the present invention.

FIG. 10 is a conceptual view illustrating a water hammer effect of the air mixer 170 according to the present invention, and FIGS. 11A and 11B are graphs for explaining the effect of the air mixer 170.

Referring to FIG. 10, the air mixer 170 includes a housing 171, a plurality of water inlets 172, an air inlet 173, and a plurality of outlets 174.

The housing 171 may have a cylindrical shape. The housing 171 is provided therein with a mixing space 171a in which washing water and compressed air are mixed. The water inlets 172 through which washing water is introduced into the mixing space 171a are formed through a bottom surface of the housing 171. The air inlet 173 through which compressed air is introduced into the mixing space 171a is formed through a lower portion of a side surface intersecting with the bottom surface of the housing 171 in a direction intersecting with the water inlets 172. The air inlet 173 and the water inlets 172 constitute independent flow paths, such that the compressed air flowing through the air inlet 173 and the washing water flowing through the water inlets 172 are mixed with each other in the mixing space 171a. The plurality of outlets 174 is formed through a top of the housing 171 so that the mixed fluid in which the washing water and the compressed air are mixed flows out of the housing 171.

The mixing space 171a may occupy all or a part of an inner volumetric space of the housing 171. The mixing space 171a illustrated in FIG. 10 occupies the entire internal volumetric space of the housing 171.

A diameter of the mixing space 171a is much larger than a flow path diameter of the air inlet 173 and the plurality of water inlets 172. Accordingly, a flow velocity of the compressed air flowing in the air inlet 173 and a flow velocity of the washing water flowing in the water inlets 172 remarkably decrease in the mixing space 171a. Therefore, the mixing space 171a of the housing 171 can provide a residence time and a storage space for allowing the compressed air and the washing water to be sufficiently mixed with each other.

Also, the diameter of the mixing space 171a is much larger than the diameter of the plurality of outlets 174. As a result, a flow velocity of the mixed fluid of the compressed air and the washing water mixed in the mixing space 171a increases remarkably when the fluid flows through the housing 171. This increase in the flow velocity can be more remarkable when the mixed fluid of the compressed air and the washing water flows through the housing 171 than when only the washing water flows through the housing 171 without the compressed air.

Also, pressure of the fluid can increase much more when the mixed fluid of the compressed air and the washing water flows through the housing 171 than when only the washing water flows through the housing 171.

Referring to the graph of FIG. 11A, it is shown that the pressure of the fluid increases in an upward direction as a flow rate (LPM) of air increases to the right.

FIG. 11B shows that the flow velocity increases in the upward direction as the flow rate (LPM) of air increases to the right. For example, when a flow rate of mixed air increases from 0.5 LPM to 20 LPM, the flow velocity of the mixed fluid increases by about 4 times from 0.42 m/sec to 1.70 m/sec.

The plurality of outlets 174 is formed in a shape of a pipe bent at a right angle at the top surface of the housing 171. The plurality of outlets 174 is formed to be bent in a direction intersecting with the water inlets 172 to provide a water hammer effect. That is, a remarkable change of the flow velocity (the increase in the flow velocity), which is caused when a direction of a pipe in which a fluid flows is suddenly bent or a diameter of the pipe is changed from a large diameter to a small diameter, is converted into pressure energy, thereby increasing a spraying force of the mixed fluid. This phenomenon is also called 'water hammer phenomenon'.

The present invention provides an aeration device, which is capable of mixing compressed air with washing water circulating to the drum 103 and spraying a mixed fluid of high pressure into the drum 103 even by a low flow rate, by using the water hammer phenomenon of the air mixer 170.

The aeration device generates a high-pressure spraying force by applying the air pump 140 and the air mixer 170 to the washing machine which circulates washing water using the circulation pump 134.

Figure 12A:
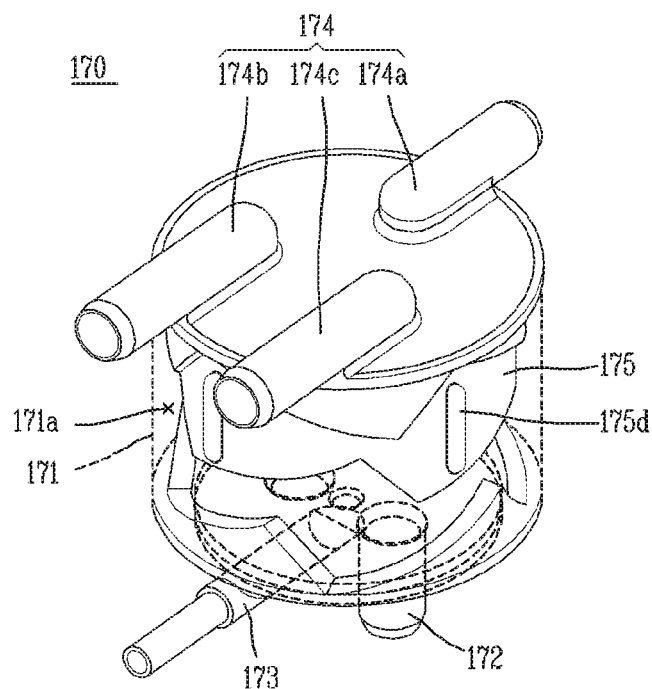
FIG. 12A is a perspective view illustrating one embodiment of an air mixer according to the present invention.
Figure 12B:
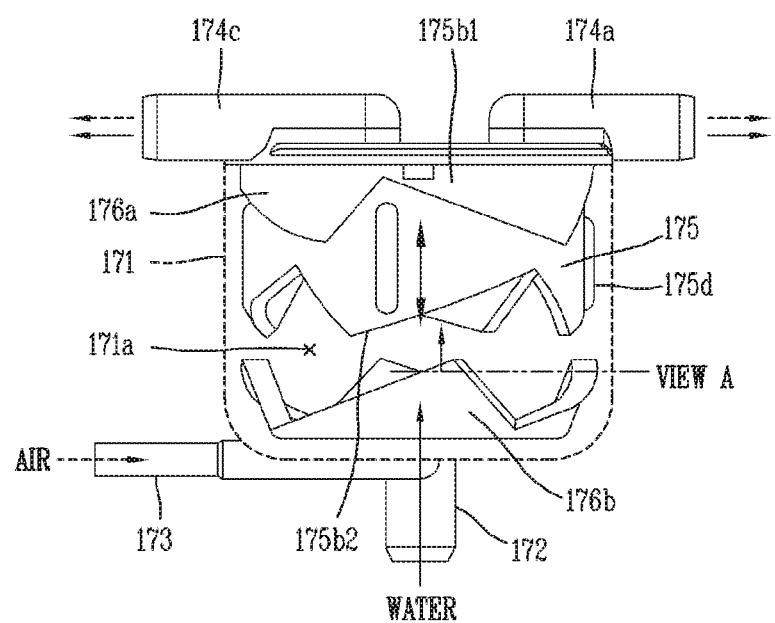
FIG. 12B is a lateral view of FIG. 12A.

FIG. 12A is a perspective view illustrating an embodiment of an air mixer 170 according to the present invention, and FIG. 12B is a lateral view of FIG. 12A.

The air mixer 170 illustrated in FIG. 12A may include a housing 171, water inlets 172, an air inlet 173, and outlets 174.

The housing 171 is cylindrical and has a mixing space 171a therein. The plurality of water inlets 172 is formed in a lower portion of the housing 171 in a perpendicular direction. The water inlets 172 are connected to a circulation hose connecting pipe 135 formed in a pump chamber of a circulation pump 134. Washing water pumped by the circulation pump 134 flows along the circulation hose via the circulation hose connecting pipe 135 and flows into the housing 171 through the plurality of water inlets 172.

The air inlet 173 is formed in the lower portion of the housing 171 in a direction intersecting with the water inlets 172. The air inlet 173 is connected to the exhaust port 142b of the air pump 140. The air compressed by the air pump 140 flows into the housing 171 through the air inlet 173.

The plurality of outlets 174 is formed in an upper portion of the housing 171 in a direction intersecting with the water inlets 172. Washing water moved through the outlets 174 is discharged in an intersecting direction with an upward direction of washing water moving within the mixing space 171a. That is, the mixing fluid is discharged by being bent at a right angle when flowing out of the housing 171. The plurality of outlets 174 may be formed by being divided into three branches. Two branches of the outlets 174 may be formed in parallel to the left side, and the other outlet 174 may be formed in an opposite side. The outlets 174 may be connected to the gasket 102 of the tub 101 through a plurality of distribution flow paths 136a, 136b, and 136c. The gasket 102 is provided with a plurality of nozzles 177 installed thereon with being spaced apart along a circumferential direction. The plurality of nozzles 177 is connected to communicate with the plurality of distribution flow paths 136a, 136b, 136c, such that the mixed fluid can flow along the distribution flow paths 136a, 136b, 136c to be sprayed into the drum 103 through the nozzles 177.

The housing 171 is provided therein with a flow path changing portion 175 for selectively or simultaneously opening or closing a flow path of at least one of the plurality of outlets 174.

The flow path changing portion 175 is provided with a rotating plate 175a disposed to face one side of the plurality of outlets 174 (a portion connected to the inside of the housing 171), and first and second protrusions 175b1 and 175b2 protruding upward and downward from a rim of the rotating plate 175a in a circumferential direction.

The rotating plate 175a is provided with a plurality of communication holes 175c communicating with at least one of the plurality of outlets 174. The plurality of communication holes 175c rotates together with the rotating plate 175a so that any one of the plurality of communication holes 175c is arranged to overlap at least one of the plurality of outlets 174 in a thickness direction of the rotating plate 175a. The number of the plurality of communication holes 175c may be two or n (three or more) in some cases. FIGS. 14A to 14D illustrate two communication holes 175c. When the two communication holes are provided, one of the communication holes 175c may have a shape different from that of the other, and may be formed in an arc shape longer along the circumferential direction.

The first protrusion 175b1 protrudes upward from a rim of the rotating plate 175a to face the inner circumferential surface of the housing 171 and may have a sawtooth shape. The first protrusion 175b1 having the sawtooth shape forms a circular ring shape in a manner that two adjacent inclined surfaces having different tilts and lengths alternately form a protruding portion pointed upward and a valley portion recessed downward along the circumferential direction.

The second protrusion 175b2 protrudes downward from the rim of the rotating plate 175a in a direction opposite to the first protrusion 175b1 so as to form a sawtooth shape. The second protrusion 175b2 having the sawtooth shape also forms a circular ring shape in a manner that two adjacent inclined surfaces having different tilts and lengths alternately form a downwardly-pointed portion and an upwardly-recessed portion along the circumferential direction.

The first and second protrusions 175b1 and 175b2 may be formed integrally in the same circular ring shape in the upward and downward directions with the inner rotating plate 175a as a boundary.

However, each inclined surface of the first protrusion 175b1 and the second protrusion 175b2 have a different phase difference so that the flow path changing portion 175 can be rotated while being moved up and down.

The housing 171 is provided therein with a first rotation guide 176a and a second rotation guide 176b.

The first rotation guide 176a is fixed to the upper portion of the housing 171. The first rotation guide 176a has two inclined surfaces which have different tilts and lengths and are formed alternately along the circumferential direction, so as to be engaged with the first protrusion 175b1 while facing each other in a height direction of the housing 171. The inclined surfaces of the first rotation guide 176a may be engaged with the first protrusion 175b1 which is raised. At this time, the inclined surfaces of the first protrusion 175b1 are guided to be slidably rotated along the inclined surfaces of the first rotation guide 176a.

The second rotation guide 176b is fixed to the lower portion of the housing 171. The second rotation guide 176b has two inclined surfaces which have different tilts and lengths and are formed alternately along the circumferential direction, so as to be engaged with the second protrusion 175b2 while facing each other in a height direction of the housing 171. The inclined surfaces of the second rotation guide 176b may be engaged with the second protrusion 175b2 which is lowered. At this time, the inclined surfaces of the second protrusion 175b2 are guided to be slidably rotated along the inclined surfaces of the second rotation guide 176b.

Here, each inclined surface of the first rotation guide 176a and the second rotation guide 176b has a different phase difference so that the flow path changing portion 175 can be rotated while being raised and lowered.

The flow path changing portion 175 includes a plurality of guide protrusions formed on outer surfaces of the first and second protrusions 175b1 and 175b2 with being spaced apart from each other in a circumferential direction. A plurality of guide ribs 175d extends in the direction that the flow path changing portion 175 is raised and lowered to facilitate the flow path changing portion 175 to be raised and lowered by pressure of the compressed air and the washing water. When the first protrusion 175b1 and the second protrusion 175b2 are formed to be in close contact with the inner circumferential surface of the housing 171 without the plurality of guide ribs 175d, a clearance may be generated between the flow path changing portion 175 and the housing 171 due to a dimensional tolerance. This clearance may bring about shocks on the housing 171 due to the pressure of the mixed fluid when the flow path changing portion 175 is moved up or down and rotated. The plurality of guide ribs 175d can minimize a contact area between the first and second protrusions 175b1 and 175b2 and the housing 171, thereby mitigating the shocks when the flow path changing portion 175 is moved up or down and rotated.

Here, the pressure generated when the compressed air and the washing water are introduced into the housing 171 may be applied to the rotating plate 175a of the flow path changing portion 175, thereby raising the flow path changing portion 175.

A controller may control the circulation pump 134 and the air pump 140 to be driven always at the same time, and also control the circulation pump 134 and the air pump 140 to perform operations or stop operations. Accordingly, when the circulation pump 134 or the air pump 140 stops operating, the compressed air and the washing water may not be introduced into the housing 171 and thereby the flow path changing portion 175 can be lowered by gravity.

Figure 13A:
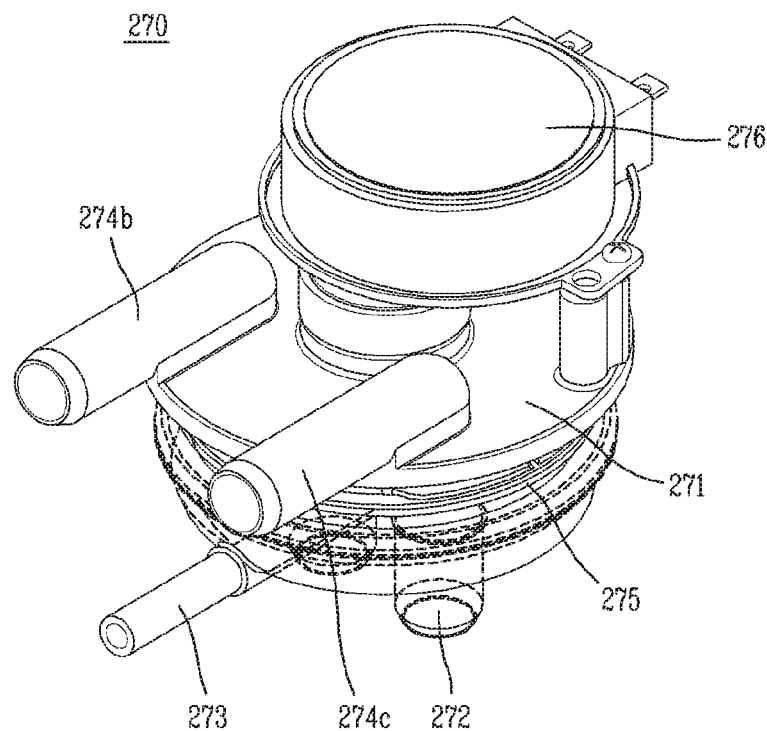
FIG. 13A is a perspective view illustrating another embodiment of an air pump according to the present invention.
Figure 13B:
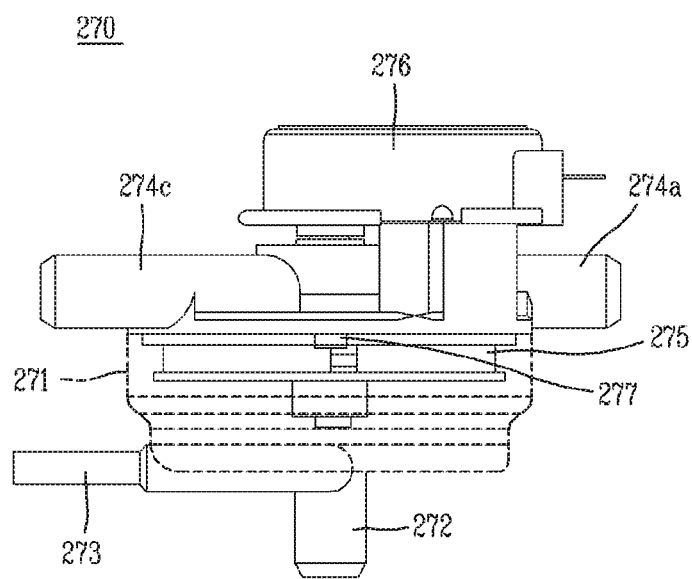
FIG. 13B is a lateral view of FIG. 13A.

FIG. 13A is a perspective view illustrating another embodiment of an air mixer 270 according to the present invention, and FIG. 13B is a lateral view of FIG. 13A.

The air mixer 270 illustrated in FIGS. 13A and 13B includes a housing 171, a plurality of water inlets 272, an air inlet 273, a plurality of outlets 274, a flow path changing portion 275, and a flow path changing motor 276.

The air mixer 170 of FIGS. 12A and 12B is a passive type. That is, the passive type is moved by pressure of a fluid.

However, the air mixer 270 of FIGS. 13A and 13B is an active type. That is, the active air mixer 270 may not operate the flow path changing portion 275 by the pressure of the fluid, as made in the passive type, but rotate the flow path changing portion 275 using a driving force or power of a motor.

To this end, the active air mixer 270 is provided with a flow path changing motor 276 installed on an upper portion of the housing 271, and the flow path changing motor 276 may be located higher than the plurality of the outlets 274. The flow path changing motor 276 may be coupled to the flow path changing portion 175 through a rotating shaft 277. The flow path changing motor 276 may include a rotor and a stator for generating a rotational force by electrical interaction. One side of the rotating shaft is coupled with the rotor of the flow path changing motor 276 and another side of the rotating shaft is connected to a center portion of the flow path changing portion 275. Accordingly, a plurality of communication holes 275c formed in the flow path changing portion 275 may be rotated to communicate with at least one of the plurality of outlets 274.

FIGS. 14A to 14D are cross-sectional views illustrating various operating states of a flow path changing portion viewed from a direction A in FIG. 12B.

The flow path changing portion 175 of FIGS. 14A to 14D is applicable to the passive air mixer 170 or the active air mixer 270.

Figure 14A:
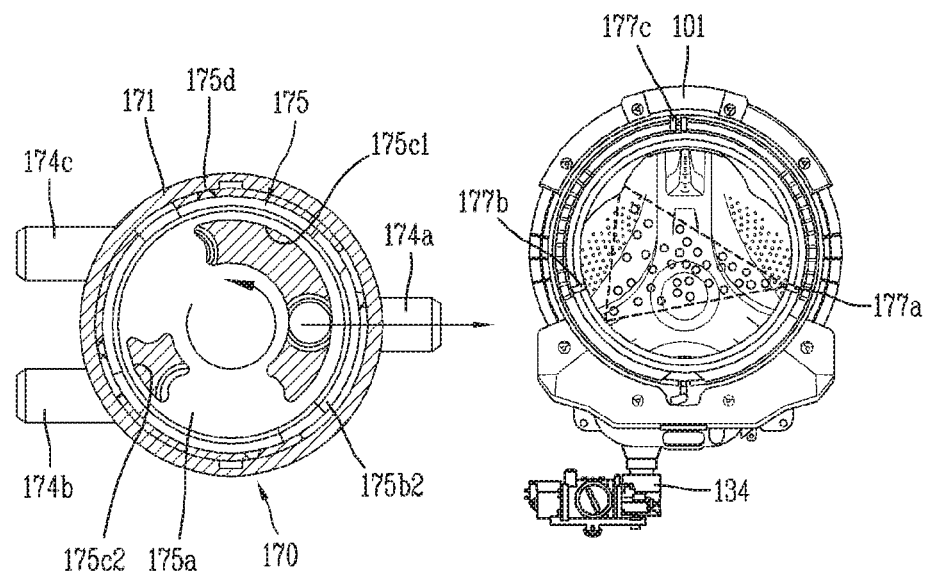
FIGS. 14A to 14D are cross-sectional views illustrating various operating states of a flow path changing portion viewed from a direction A in FIG. 12B.

Referring to FIG. 14A, a first communication hole 175c1 in an arcuate shape communicates with a first outlet 174a formed in a right direction, and the other second and third outlets 174b and 174c are blocked by a rotating plate 175a. A second communication hole 175c2 which is smaller in size than the first communication hole 175c1 may be blocked by the housing 171 without communicating with the other second and third outlets 174b and 174c. Accordingly, the mixed fluid can be injected toward the left side surface of the tub 101 through the first nozzle 177a provided on the right side surface of the gasket 102 of the tub 101. Here, the terms 'first, second, and third' attached to the front of the communication hole 175c and the nozzle 177 are arbitrarily given for convenience of explanation, and thus the present invention is not limited thereto. The communication hole 175c may have various shapes and alternatively may have a different shape from that illustrated in the drawings.

Figure 14B:
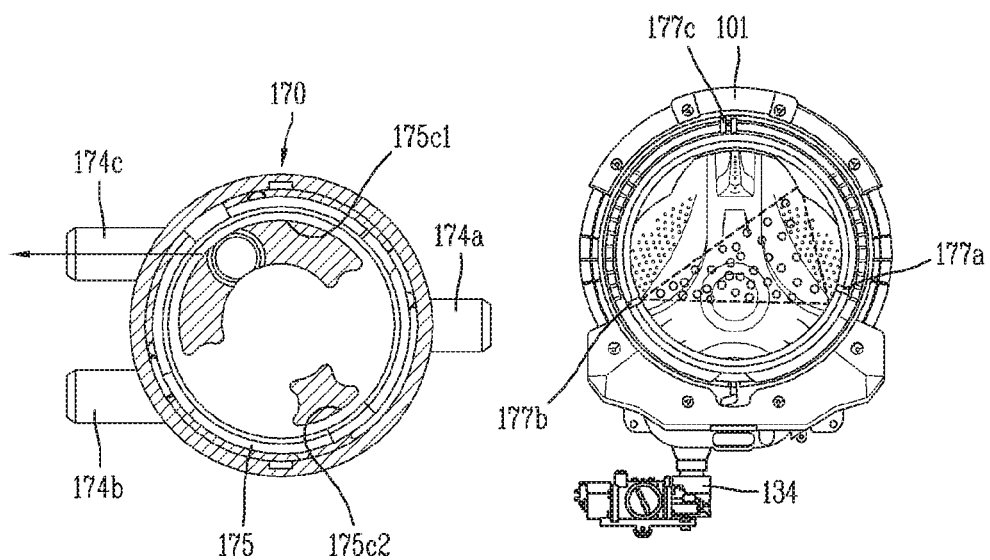

Referring to FIG. 14B, as the flow path changing portion 175 rotates counterclockwise, the first communication hole 175c1 and the second outlet 174b communicate with each other and the other first and third outlets 174a and 174c are blocked by the rotating plate 175a. Accordingly, the mixed fluid can be injected toward the right side surface of the tub 101 through the second nozzle 177b provided on the left side surface of the gasket 102 of the tub 101.

Figure 14C:
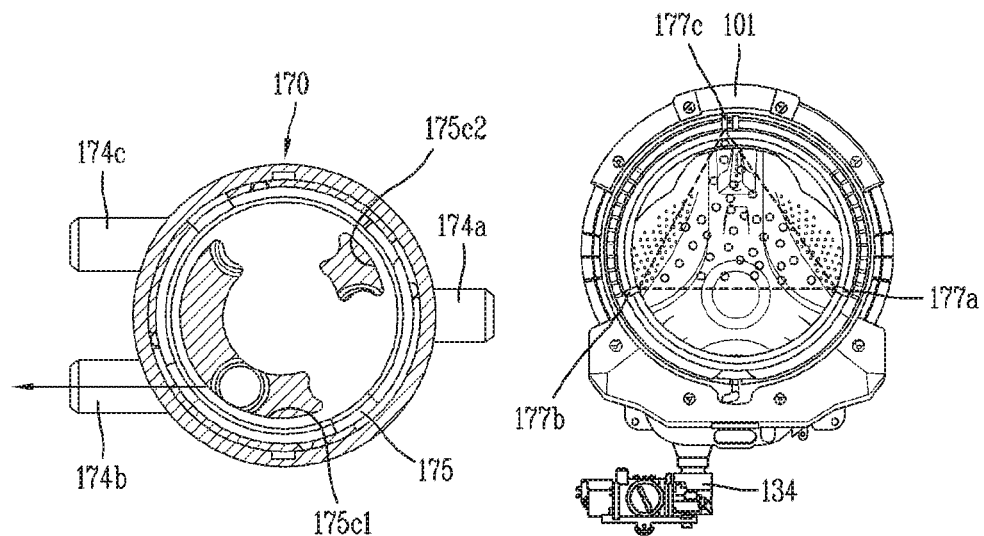

Referring to FIG. 14C, as the flow path changing portion 175 further rotates counterclockwise, the first communication hole 175c1 and the third outlet 174c communicate with each other and the other first and second outlets 174a and 174b are blocked by the rotating plate 175a. Accordingly, the mixed fluid can be injected toward the lower side surface of the tub 101 through the third nozzle 177c provided on the upper side surface of the gasket 102 of the tub 101.

Figure 14D:
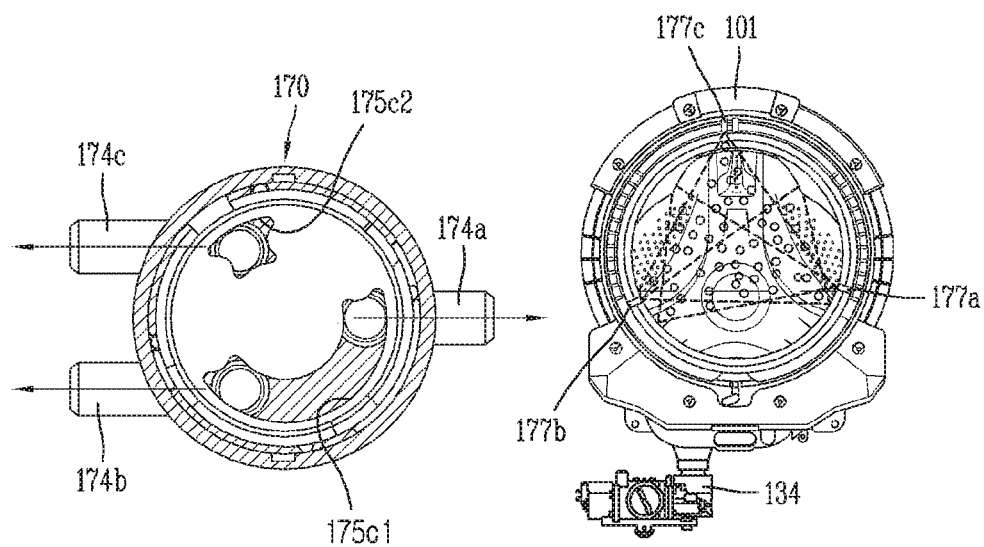

Referring to FIG. 14D, as the flow path changing portion 175 further rotates counterclockwise and thus the first and second communication holes 175c2 and the first to third outlets 174a, 174b, and 174c communicate with each other, the mixed fluid is injected into the drum 103 in three directions through the first to third nozzles 177a, 177b, and 177c provided on the gasket 102 of the tub 101. Accordingly, clothes can be uniformly wetted even when the clothes is fully filled in the drum 103.

FIGS. 15A to 15G are cross-sectional views illustrating operating states of the flow path changing portion 275 according to another embodiment of the present invention.

The flow path changing portion 275 illustrated in FIGS. 15A to 15G has four communication holes 275c. As the flow path changing portion 275 rotates in the counterclockwise direction, at least one outlet 274 of the first to fourth outlets 374a to 374c may be opened.

The plurality of communication holes 275c is all circular and spaced along the circumferential direction. Three of the four communication holes 275c1 to 275c3 may be close to each other and only one communication hole 275c4 may be further apart from the three holes.

Figure 15A:
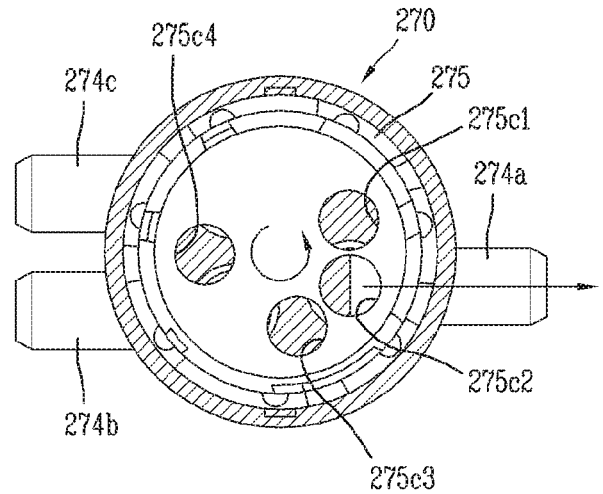
FIGS. 15A to 15G are cross-sectional views illustrating operating states of a flow path changing portion according to another embodiment of the present invention.

Referring to FIG. 15A, among the first to fourth communication holes 275c4 (the terms 'first' to 'fourth' are given in the clockwise direction) adjacent to one another from top to bottom, the second communication hole 275c2 and the first outlet 174a communicate with each other so that the mixed fluid can be injected through the first nozzle 177a from the right side of the tub 101 toward the left side (hereinafter, referred to as a first direction).

Figure 15B:
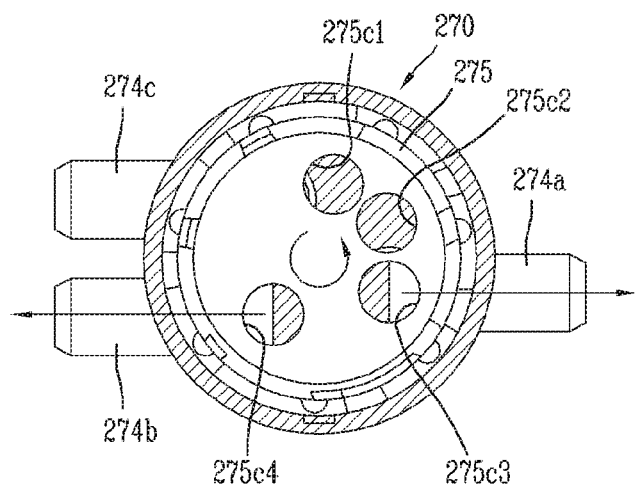

Referring to FIG. 15B, the second communication hole 275c2 and the first outlet 174a and the farther-arranged fourth communication hole 275c4 and the third outlet 174c (a lower left in the drawing) communicate with each other so that the mixed fluid can be injected through the third nozzle 177c in the first direction and through the third nozzle 177c from top to bottom of the tub 101 (hereinafter, referred to as a third direction).

Figure 15C:
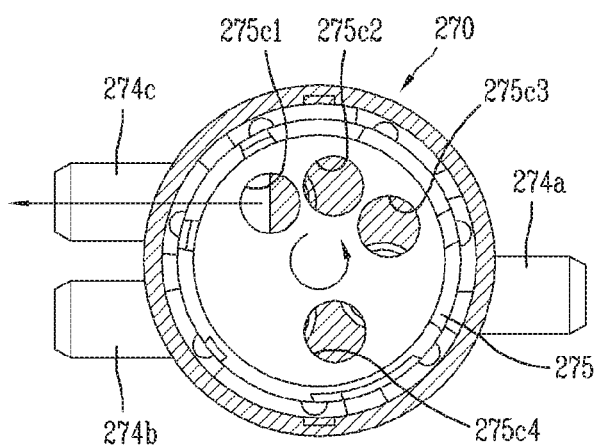

Referring to FIG. 15C, the first communication hole 275c and the second outlet 174b communicate with each other so that the mixed fluid can be injected through the second nozzle 177b from the left to right side of the tub 101 (hereinafter, referred to as a second direction).

Figure 15D:
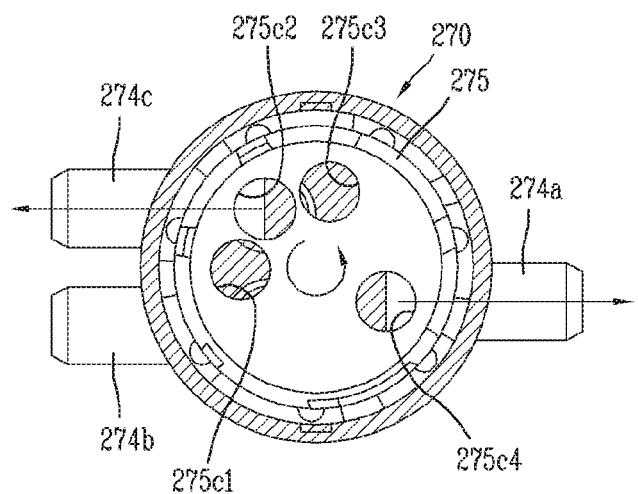

Referring to FIG. 15D, the fourth communication hole 275c and the first outlet 174a communicate with each other and the first communication hole 275c2 and the second outlet 174b communicate with each other so that the mixed fluid can be injected in the first and second directions.

Figure 15E:
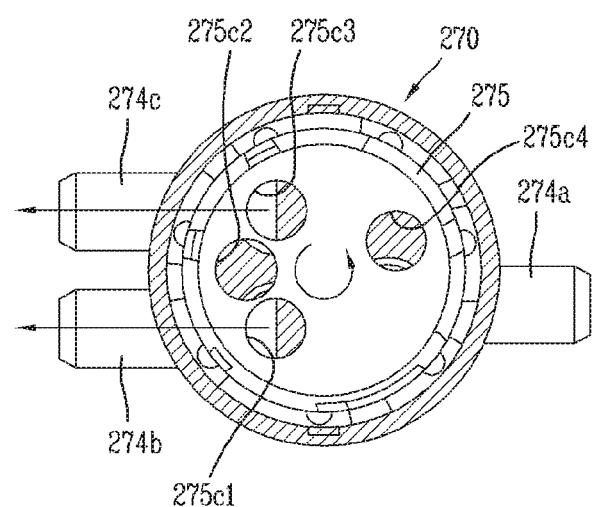

Referring to FIG. 15E, the first communication hole 275c1 communicates with the third outlet 174c and the third communication hole 275c3 communicates with the second outlet 174b, so that the mixed fluid can be injected in the second direction and the third direction.

Figure 15F:
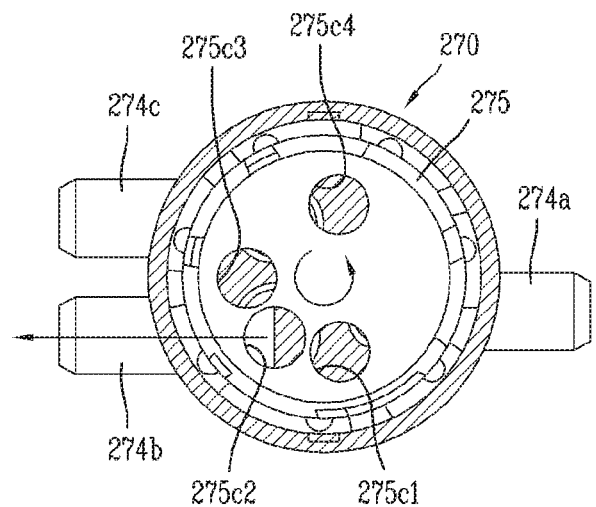

Referring to FIG. 15F, the second communication hole 275c2 communicates with the third outlet 174c so that the mixed fluid can be injected in the third direction.

Figure 15G:
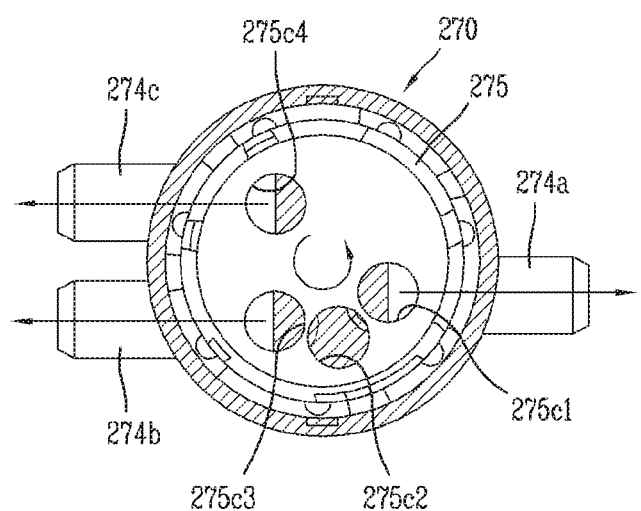

Referring to FIG. 15G, the fourth communication hole 175c communicates with the second outlet 174b and the third communication hole 275c3 communicates with the third outlet 174c, so that the mixed fluid can be injected in the second direction and the third direction.

According to the flow path changing portion 275 of FIGS. 15A to 15G, the washing water can be injected in more various manners than the flow path changing portion 175 of FIGS. 14A to 14D.

The flow path changing portion 275 illustrated in FIGS. 15A to 15G can be applied to both the active air mixer 270 and the passive air mixer 170.

Figure 16A:
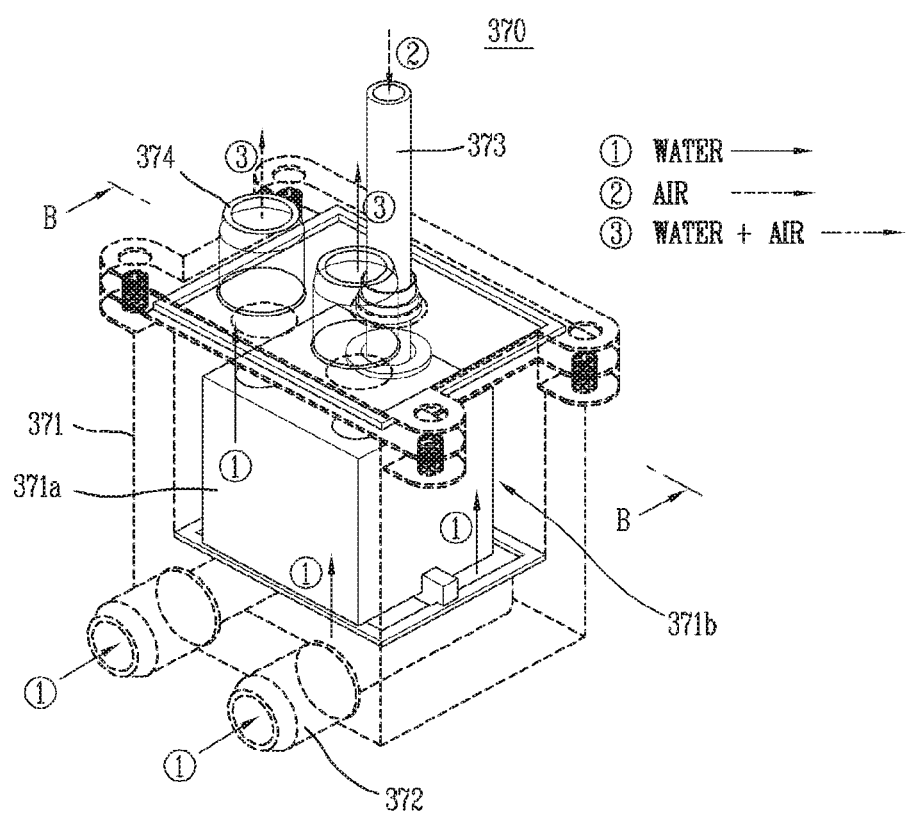
FIG. 16A is a perspective view illustrating another embodiment of an air pump according to the present invention.
Figure 16B:
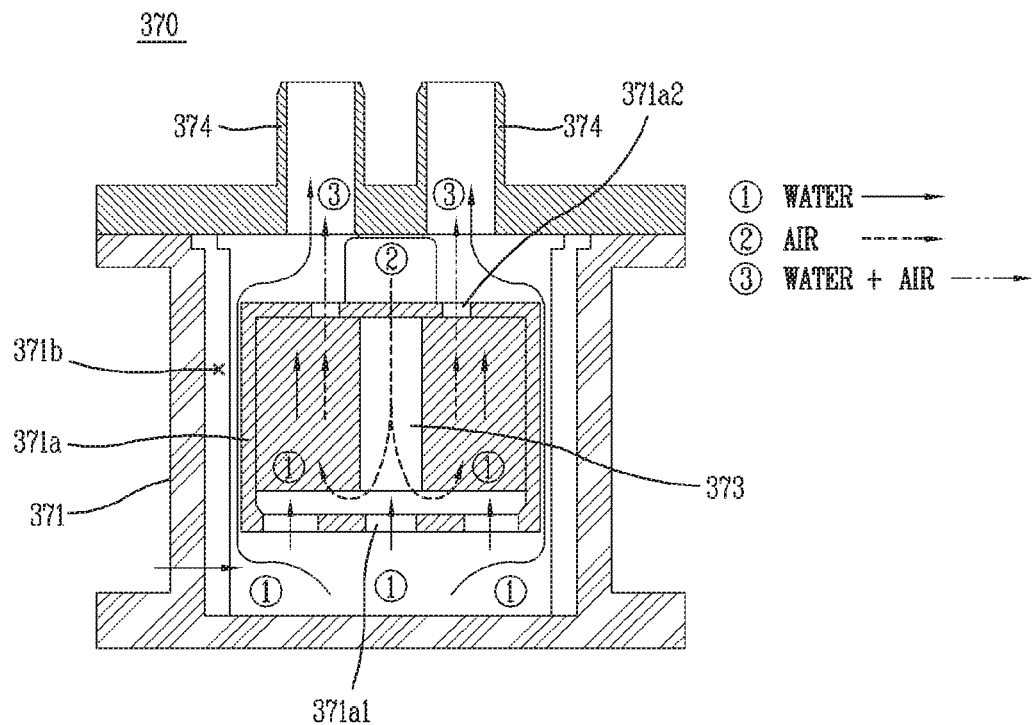
FIG. 16B is a sectional view taken along the line B-B of FIG. 16A.
Figure 16C:
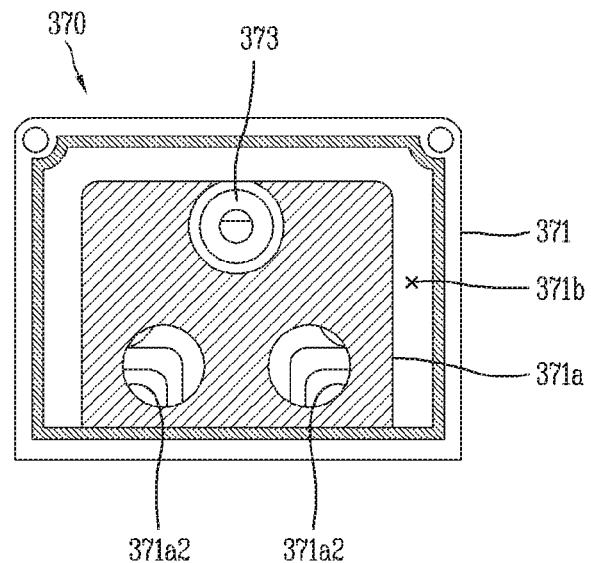
FIG. 16C is a planar view of FIG. 16A.

FIG. 16A is a perspective view illustrating another embodiment of an air mixer 370 according to the present invention, FIG. 16B is a cross-sectional view taken along the line B-B of FIG. 16A, and FIG. 16C is a planar view of FIG. 16A.

Referring to FIGS. 16A to 16C, the air mixer 370 includes a housing 371, a plurality of water inlets 372, an air inlet 373, and a plurality of outlets 174.

The housing 371 has a separate mixing chamber 371a in an inner space thereof. The mixing chamber 371a is spaced apart from an inner surface of the housing 371 and is provided with a mixing space, which is independent of the inner space of the housing 371. In the mixing chamber 371a, compressed air and washing water may be mixed. A bypass flow path 371b is formed in the housing 371. The bypass flow path 371b is formed between the inner surface of the housing 371 and an outer surface of the mixing chamber 371a so as to bypass washing water to the mixing chamber 371a. Top and bottom surfaces of the mixing chamber 371a may be spaced apart from the inner surface of the housing 371. In addition, one side surface of the mixing chamber 371a, that is, a side surface facing a direction in which the washing water is introduced, may be spaced apart from the inner surface of the housing 371. A segment area of the mixing chamber 371a and the bypass flow path 371b may be 70% to 30% of a total area of the housing 371.

The plurality of water inlets 372 may be formed in parallel in the same direction on a surface intersecting with one side (a bottom surface in the drawing) of the housing 371. The plurality of water inlets 372 may be formed in a lower portion of the housing 371. The plurality of water inlets 372 may be formed in a direction intersecting with a flowing direction of the mixed fluid.

The plurality of outlets 374 may be formed in another side (a top surface) of the housing 371 facing the one side of the housing 371 in the same direction as the flowing direction of the mixed fluid.

The air inlet 373 penetrates through the housing 371 and the mixing chamber 371a from the upper portion of the housing 371 and protrudes into the mixing space 371a, so that compressed air can be introduced into the mixing chamber 371a from the outside of the housing 171. The air inlet 373 may be in the form of a pipe. A lower end portion of the air inlet 373 may be spaced upwardly apart from the bottom surface of the mixing chamber 371a.

The mixing chamber 371a may include a plurality of water inlet holes 371a1, a plurality of water outlet holes 371a2, and a communication hole.

The plurality of water inlet holes 371a1 may be formed on a surface facing the bottom surface of the housing 371 so that the washing water may flow into the mixing space 171a.

The plurality of water outlet holes may be formed in a surface facing the top surface of the housing 371 and compressed air.

The communication hole is a hole formed in the top surface of the mixing chamber 371a so that the air inlet 173 is penetrated.

The mixing chamber 371a may be spaced apart from the inner surface of the housing 171 in a first direction facing the water inlets 372 and in a second direction intersecting with the first direction.

The bypass flow path 371b may be formed to surround the mixing chamber 371a.

The bypass flow path 371b may be branched from the water inlets 372 of the housing 371 by the mixing chamber 371a and may be joined with the outlets 374 of the housing 371.

According to the air mixer 370 having the mixing chamber 371a and the bypass flow path 371b inside the housing 371, some of washing water introduced into the housing 371 through the water inlets 372 may be bypassed by the bypass flow path 371b, so as to lower pressure of the washing water introduced into the mixing chamber 371a, thereby increasing an amount of compressed air introduced through the air inlet 373. In this manner, a mixing effect of the compressed air and the washing water can be enhanced by increasing an amount of compressed air injected, thereby increasing a water hammer phenomenon. Also, the bypass flow path 371b of the washing water can have a sufficiently large area, which may allow the compressed air to be maintained as much as possible even without injecting the compressed air.

Therefore, according to the aeration device of the present invention, the washing water discharged from the drum 103 and the compressed air can be mixed through the air mixer 170 and then resupplied to the drum 103, so as to generate the water hammer phenomenon, thereby increasing the spraying force of the washing water and enhancing a washing performance.

Also, since the washing water is atomized by being mixed with the compressed air, washing water containing a high concentration of detergent is uniformly sprayed even using a small amount of water, thereby further improving the washing performance.

Also, since the washing water is atomized, an effect of increasing a spraying duration can be obtained.

Figure 17:
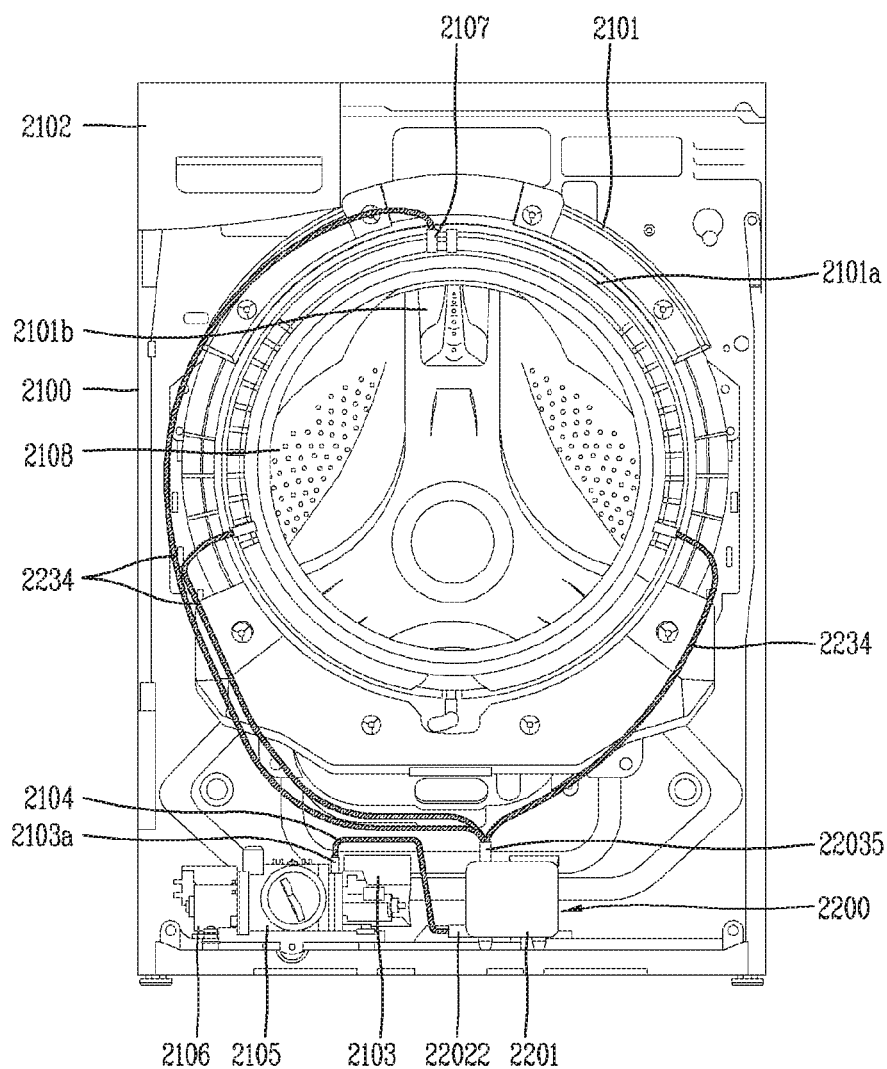
FIG. 17 is a front view of a washing machine to which an aeration module according to the present invention is applied.
Figure 18:
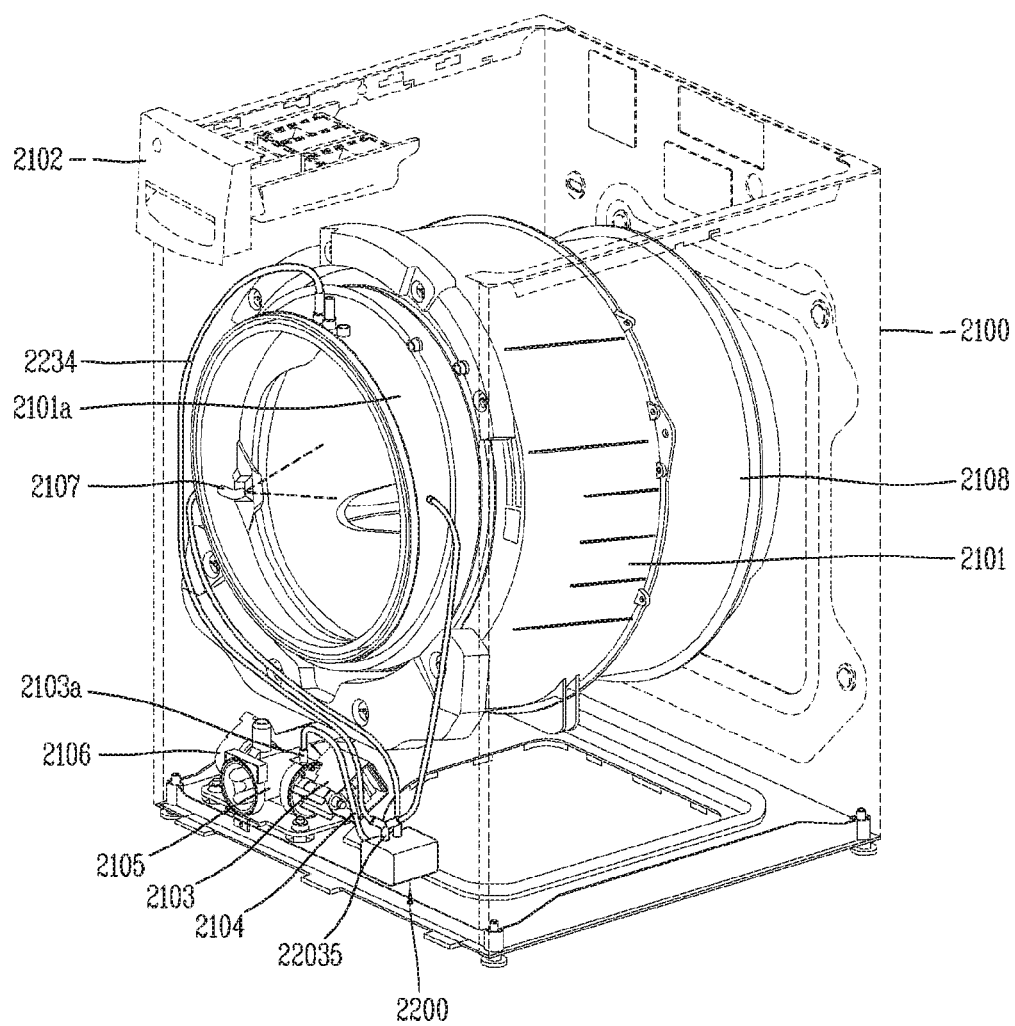
FIG. 18 is a perspective view of FIG. 17.

FIG. 17 is a front view of a washing machine to which an aeration module 200 according to the present invention is applied, and FIG. 18 is a perspective view of FIG. 17.

The washing machine includes a cabinet 2100, a tub 2101, a circulation pump 2103, and an aeration module 2200.

The cabinet 2100 forms an outer appearance and an outer shape of the washing machine. The cabinet 2100 may have a rectangular parallelepiped shape. The cabinet 2100 may include a front cover forming a front surface of the washing machine, side covers forming both side surfaces of the washing machine, a back cover forming a rear surface of the washing machine, a top cover forming a top surface of the washing machine, and a base cover for forming a bottom surface of the washing machine. At this time, for rigidity of the washing machine, the side covers and the back cover may form three surfaces as one piece, and may have a shape like '⊏' when viewed from the top cover.

The tub 2101 is provided inside the cabinet 2100. The tub 2101 stores washing water. The tub 2101 may be cylindrical. The tub 2101 may be disposed inside the cabinet 2100 in a manner that a center line of the tub 2101 in a lengthwise direction faces front and rear surfaces of the cabinet 2100. The center line of the tub 2101 in the lengthwise direction may be inclined with respect to a horizontal plane within a range of 2 to 10°. An inlet port may be formed at a front surface of the tub 2101, and a rear surface of the tub 2101 may be closed. The inlet port of the tub 2101 may be inclined so as to be positioned higher than the rear surface.

A drum 2108 is provided inside the tub 2101. The drum 2108 is rotatable by a driving unit such as a motor or the like. The driving unit may be installed on a rear surface of the tub 2101. The motor may include a rotor having a rotating shaft therein and rotating the rotating shaft, and a stator generating a rotational force by an electromagnetic interaction with the rotor.

A lifter 2101b may be provided inside the drum 2108. The lifter 2101b serves to lift the clothes (laundry or an object to be washed) introduced into the drum 2108 so that the clothes can fall by gravity while rotating (spinning) together with an inner circumferential surface of the drum 108 in a circumferential direction.

A plurality of through holes may be formed through the circumferential surface of the drum 2108, so that washing water containing detergent inside the tub 2101 can be introduced into the drum 2108 through the through holes. The washing water introduced into the drum 2108 can get the clothes wet.

A detergent input unit 2102 may be installed in an upper portion of the tub 2101 and an upper portion of the front cover to be drawable like a drawer. A detergent stored in a laundry box may be mixed with washing water introduced through a water supply pipe and then introduced into the tub 2101. A detergent flow path may connect the detergent input unit 2102 and the tub 2101.

The circulation pump 2103 is provided inside the cabinet 2100 to efficiently wet the clothes. The circulation pump 2103 circulates washing water discharged from the tub 2101 back into the tub 2101. The circulated washing water is sprayed on the clothes introduced into the tub 2101 through a plurality of nozzles 2107 to wet the clothes. The nozzles 2107 are installed in a gasket 2101a of the tub 2101 at intervals in the circumferential direction.

The circulation pump 2103 may be integrally formed with a drain pump 2106 in a pump casing 2105.

A drain port is formed in a lower portion of the tub 2101 and a drain pipe connecting the drain port and the pump casing 2105 is provided. A rear surface of the pump casing 2105 communicates with one side of the drain pipe. Washing water discharged from the tub 2101 flows into the pump casing 2105 through the drain pipe.

A filter is provided inside the pump casing 2105 so that foreign substances such as debris contained in the washing water can be collected.

The drain pump 2106 is provided in one side of the pump casing 2105. The drain pump 2106 may discharge the washing water to the outside through a drain hose extending to the outside of the washing machine after washing is completed.

The circulation pump 2103 is provided in another side of the pump casing 2105 and a circulation pump chamber is provided between the circulation pump 2103 and the pump casing 2105. An impeller is provided inside the circulation pump chamber. The impeller is connected to a circulation motor mounted in the circulation pump casing so as to be rotated by receiving power. As the impeller operates, the washing water discharged from the tub 2101 can be circulated back to the tub 2101.

In the present invention, the aeration module 2200 is provided to enhancing detergent solubility using a small amount of water by improving spraying power and spraying washing water in an atomized state by atomizing the washing water.

Figure 19:
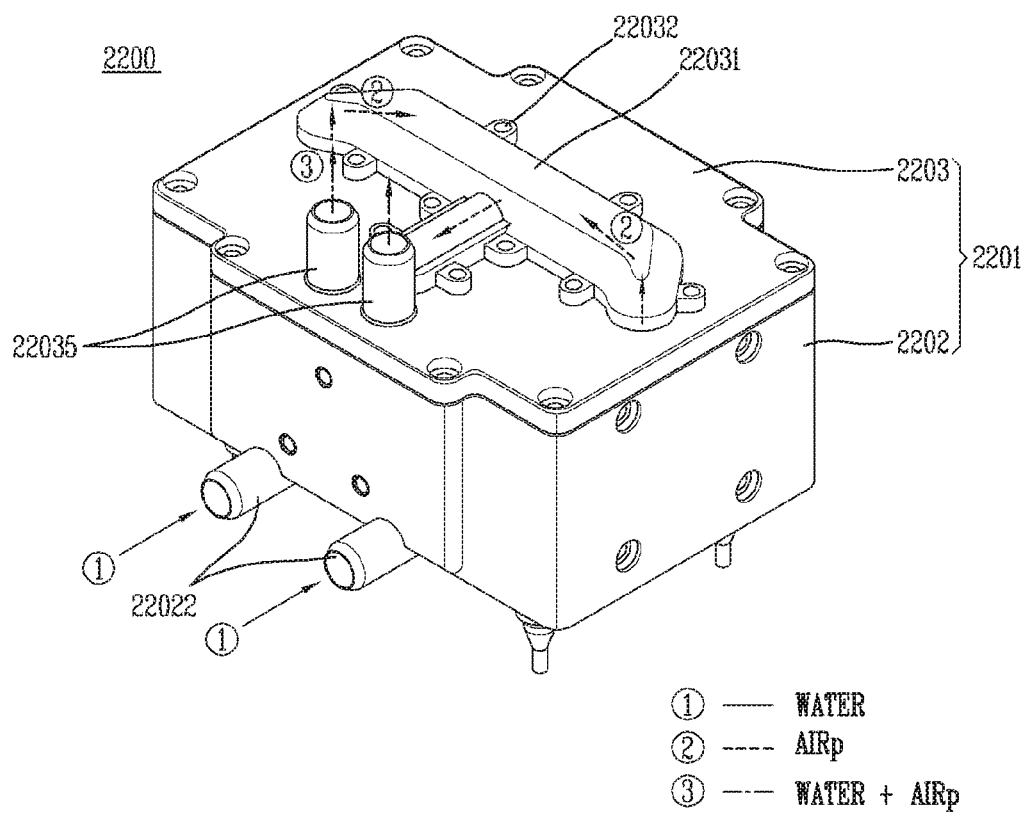
FIG. 19 is a perspective view illustrating the aeration module of FIG. 18.
Figure 20A:
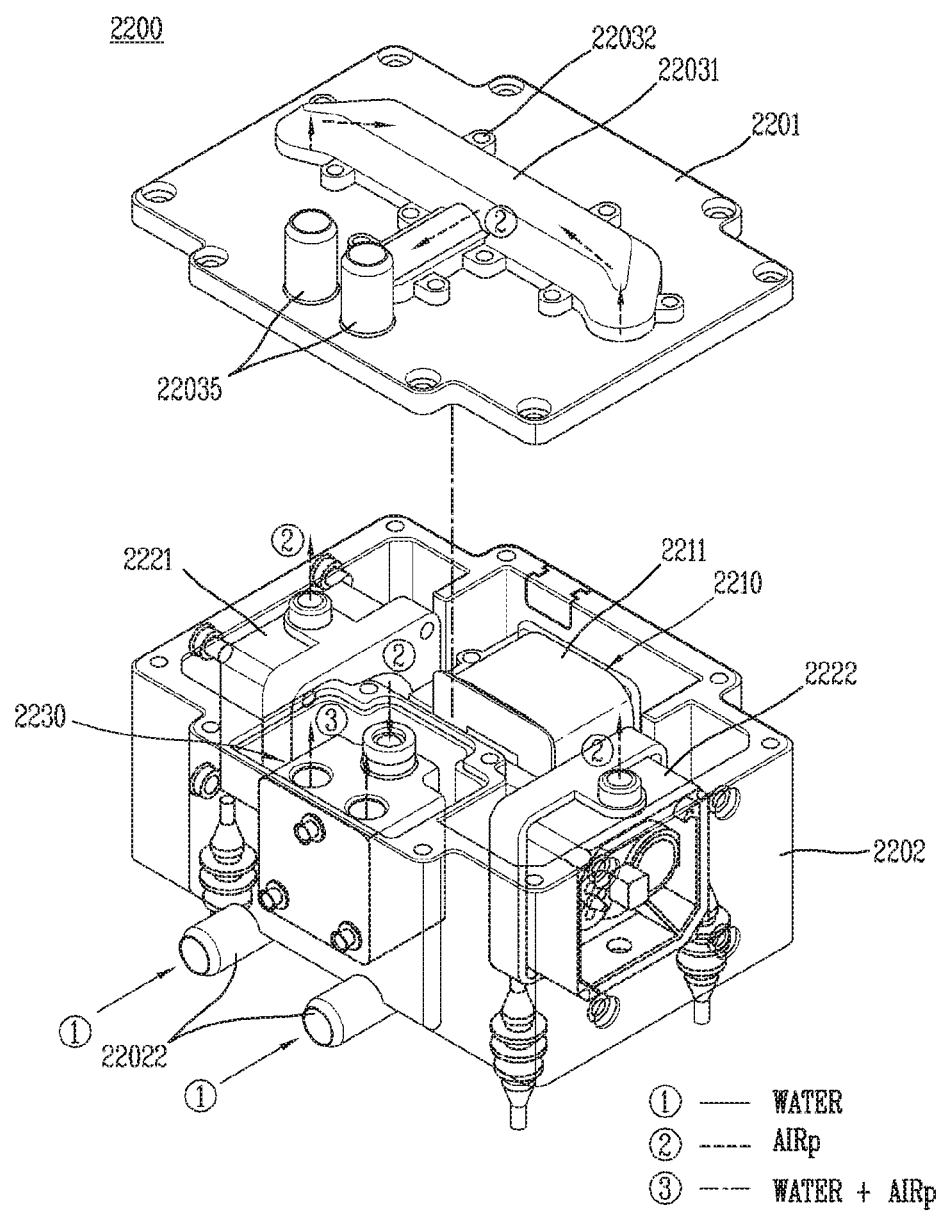
FIG. 20A is an exploded perspective view illustrating an internal configuration of the aeration module of FIG. 19.
Figure 20B:
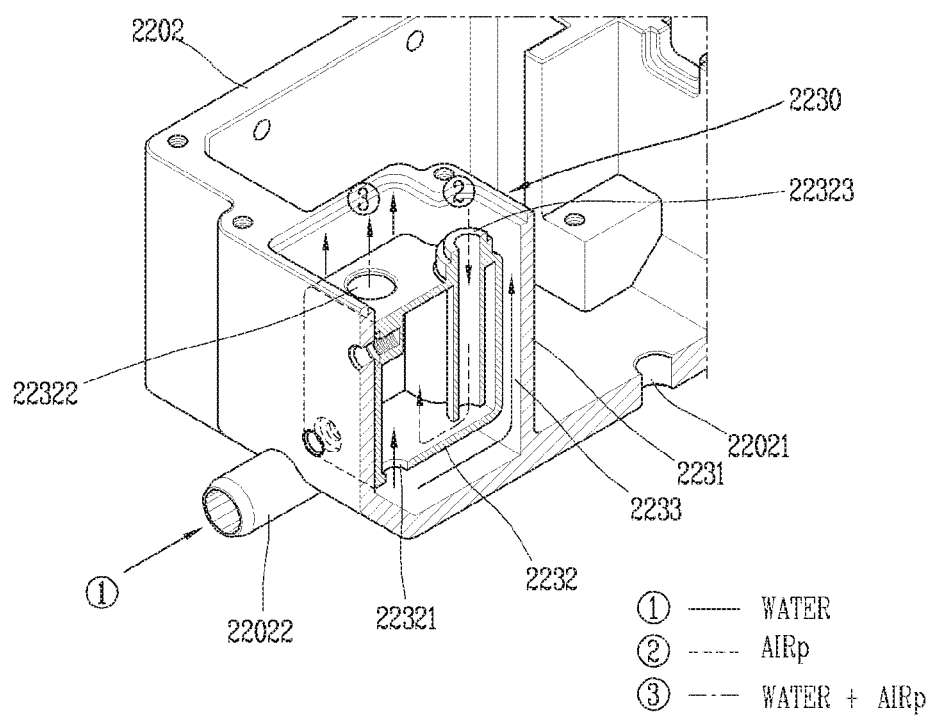
FIG. 20B is a cut perspective view illustrating an inner structure of an air mixer unit in FIG. 20A.
Figure 21:
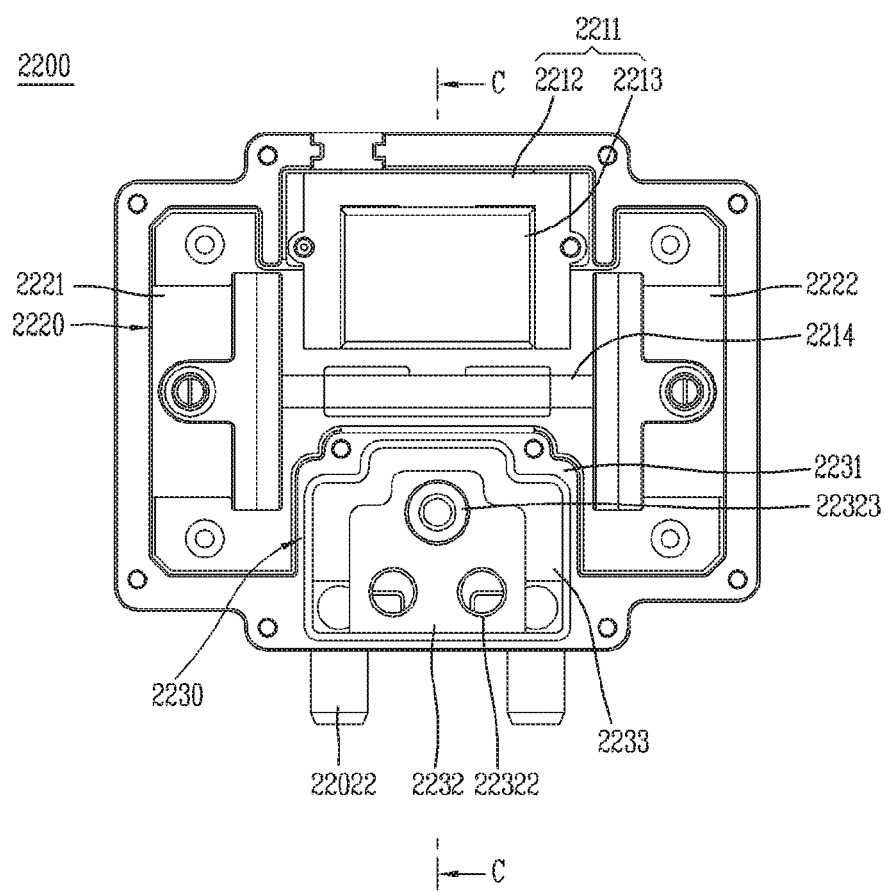
FIG. 21 is a planar view illustrating an internal structure of a lower main body in FIG. 20.
Figure 22:
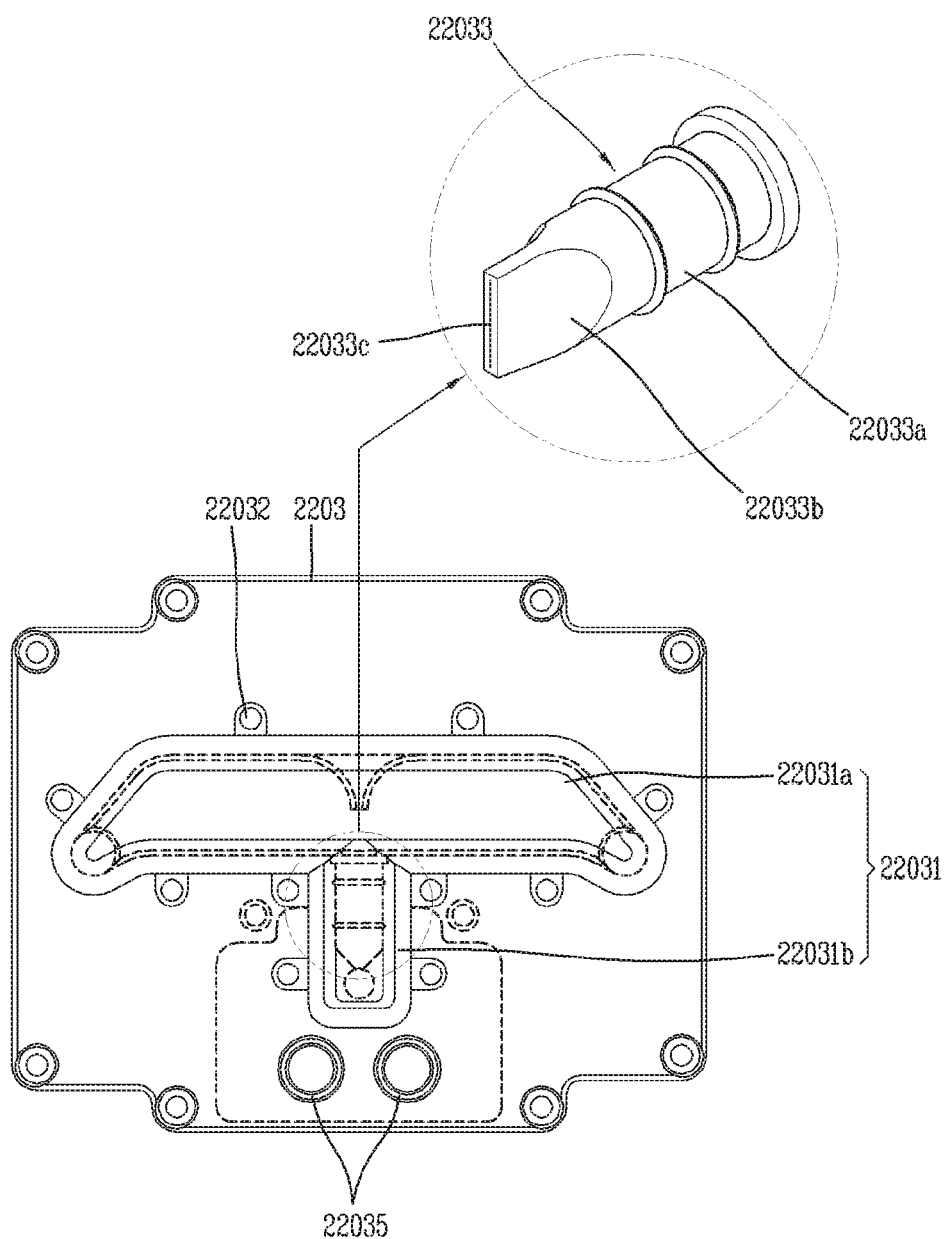
FIG. 22 is a planar view of an upper cover in FIG. 20.

FIG. 19 is a perspective view illustrating the aeration module 2200 of FIG. 19, FIG. 20A is an exploded perspective view illustrating an internal configuration of the aeration module 2200 of FIG. 19, and FIG. 20B is a cut perspective view illustrating an internal structure of an air mixer unit 2230 in FIG. 20A. FIG. 21 is a planar view illustrating an internal structure of a lower main body 2202 in FIG. 20A, and FIG. 22 is a planar view of an upper cover 2203 in FIG. 20A.

The aeration module 2200 may include an air pump unit 2210 and an air mixer unit 2230.

The washing water discharged from the tub 2101 is circulated by power of the circulation pump 2103. A circulation hose communication port 2103a is formed on an upper portion of the circulation pump chamber. The circulation hose communication port 2103a is connected to an air mixer unit 2230 through the circulation hose 2104. One side of the circulation hose 2104 is connected to the circulation hose communication port 2103a and another side of the circulation hose 2104 is connected to a water inlet 22022 of the air mixer unit 2230.

The air pump unit 2210 compresses external air such as atmospheric pressure, that is, air outside the washing machine, and internal air of the cabinet 2100 to generate compressed air. The generated compressed air is supplied to an air inlet 22323 of the air mixer unit 2230.

The air mixer unit 230 mixes the compressed air supplied from the air pump unit 2210 with the wash water supplied from the circulation pump 2103 and transfers the mixed fluid into the tub 2101.

The air pump unit 2210 and the air mixer unit 2230 may be modularized by being provided in a single housing 2201.

The housing 2201 may include a lower main body 2202 and an upper cover 2203.

The lower main body 2202 is provided with an external air inlet 22021 and a water inlet 22022. The lower main body 2202 is provided therein with the air pump unit 2210 and the air mixer unit 2230.

The upper cover 2203 is configured to cover a top of the lower main body 2202 and an outlet 22035 on a top surface of the upper cover 2203.

The external air, such as the atmospheric pressure, is introduced into the housing 2201 through the external air inlet 22021. The external air inlet 22021 is formed through a bottom surface of the housing 2201 so that the outside of the housing 2201 and the inside of the cabinet 2100 can communicate with each other. The external air inlet 22021 is formed in a shape of a hole so that the outside of the housing 2201 can communicate with the inside thereof.

The water inlets 22022 may be formed on one side of the lower portion of the housing 2201. The water inlet 22022 is preferably formed on the lower portion of the housing 2201 such that a water introducing direction of washing water is perpendicularly upward from the lower portion of the housing 2201. This is because the compressed air has a much lower specific gravity than water and thus has a property of rising in water due to buoyancy, and the washing water is affected by the buoyancy of the compressed air so as to increase a propulsion force when a flowing direction of the washing water is controlled to be the same direction as a direction that the buoyancy of the compressed air is applied. At this time, the water inlet 22022 may protrude from one side surface of the housing 2201 toward the circulation pump 2103. The water inlet 22022 may be provided in plurality formed in parallel on one side surface of the housing 2201. The introduction direction of the washing water may be a direction intersecting with a direction of gravity.

The outlet 22035 may be formed on one side of the upper portion of the housing 2201. The mixed fluid mixed in the air mixer unit 2230 flows out of the housing 2201 through the outlet 22035. The outlet 22035 is formed on the upper surface of the housing 2201 in an upward direction, such as the buoyancy direction of the compressed air. The outlet 22035 may be provided in plural. For example, two or three outlets 22035 may be provided. The plurality of outlets 22035 is connected to a plurality of nozzles 2107 through a plurality of distribution flow paths 2234.

One side of each of the distribution flow paths 2234 is connected to the outlet 22035 and another side of each of the distribution flow paths 2234 are connected to the nozzles 2107. Accordingly, the mixed fluid flowing out through the outlets 22035 can be guided to the nozzles 2107.

The plurality of nozzles 2107 may be disposed on the gasket 2101*a* provided on the front of the tub 2101 with being spaced apart at predetermined intervals along a circumferential direction. The nozzles 2107 are configured to spray the mixed fluid into the tub 2101, namely, toward the clothes introduced in the tub 2101. A hole size of an end of the nozzle 2107 may be adjusted such that the mixed fluid can be sprayed while spreading at a wide angle.

The air pump unit 2210 is formed at one side inside the housing 2201. The air pump unit 2210 includes a compression part 220 provided to compress external air introduced through the external air inlet 22021, and an electromagnet part 2211 and an operation part 2214 generating power and transmitting the generated power to the compression part 2220.

The electromagnet part 2211 may be provided with a coil winding portion 2212 and a core portion 2213.

The coil winding portion 2212 is formed by winding a coil 2212*a* around a bobbin 2212*b*. When power or current is applied to the coil 2212*a*, a magnetic field is generated around the coil 2212*a*. When the current is interrupted, the coil winding portion 2212 returns to its original state.

The core portion 2213 is provided to greatly increase the magnetic field generated in the coil winding portion 2212. The core portion 2213 is provided with a plurality of protrusions 2213*a* arranged in parallel to each other in a spaced manner, and a connecting portion 2213*b* connecting one side of each of the plurality of protrusions 2213*a*. The plurality of protrusions 2213*a* and the one connecting portion 2213*b* may have a shape similar to an English capital letter 'E'.

A center protrusion 2213*a* of the plurality of protrusions 2213*a* is inserted into the bobbin 2212*b* or the coil winding portion 2212 and the core portion 2213 and the coil winding portion 2212 are formed into one assembly.

The core portion 2213 is magnetized by a magnetic field generated by the coil winding portion 2212. That is, the plurality of protrusions 2213*a* have magnetic properties such as an N pole or an S pole. The protrusions 2213*a* of the core portion 2213 are magnetized to the N pole or S pole when a current is applied to the coil 2212*a*, and returns to its original state when the current is interrupted. Further, an AC current may be applied to the coil 2212*a*. Accordingly, the protrusions 2213*a* of the core portion 2213 can be switched from the N pole to the S pole or from the S pole to the N pole depending on a frequency.

The operation part 214 may linearly reciprocate by electromagnetic interaction with the electromagnet part 2211. For this purpose, the operation part 2214 is provided with permanent magnets 2216. The operation part 2214 may include a magnet mounting portion 2215 to which the plurality of permanent magnets 2216 is mounted, and a moving portion 2217 that moves in conjunction with the magnet mounting portions 2215.

The plurality of permanent magnets 2216 is arranged to face the core portion 2213. Two of the permanent magnets 2216 may be arranged to face a part of the coil 2212*a* wound between the protrusions 2213*a*. The permanent magnet 2216 may be provided with an S pole formed on a surface thereof facing the protrusion 2213*a* and an N pole formed on a surface opposite to an end of the protrusion 2213*a*. According to this, when the plurality of protrusions 2213*a* is magnetized to the N pole, the S pole, and the N pole, the S pole of the permanent magnet 2216 located between the N pole and the S pole moves in one direction by receiving mutual magnetic forces. The magnet mounting portion 2215 and the moving portion 2217 may move in one direction by interaction between the permanent magnet 2216 and the core portion 2213. Or, when the AC current is applied to the coil 2212*a*, the polarities of the protrusions 2213*a* of the core portion 2213 may be changed repeatedly. Thereby, the permanent magnets 2216 can periodically reciprocate in one direction or in an opposite direction.

The magnet mounting portion 2215 supports the permanent magnets 2216 and the moving portion 2217 may transmit power generated by the magnetic force generated from the permanent magnets 2216 to the compression part 2220.

The compression part 2220 may include a first compression unit 2221 and a second compression unit 2222 which are spaced apart from each other with the operation part 2214 therebetween in a direction facing each other. The first compression unit 2221 may be disposed at one side of the operation part 2214 in the moving direction of the operation part 2214 and the second compression unit 2222 may be disposed at another side of the operation part 2214. The first compression unit 2221 and the second compression unit 2222 may be spaced apart from each other in a direction intersecting with a direction in which the wash water is introduced. The first compression unit 2221 and the second compression unit 2222 may also be disposed on both side surfaces inside the housing 2201 facing each other and may be coupled and supported by coupling elements such as bolts.

The first compression unit 2221 is disposed on the left side surface inside the housing 2201 and the second compression unit 2222 is disposed on the right side surface inside the housing 2201 with respect to the direction in which the washing water is introduced. A first accommodating portion may be provided for accommodating the first compression unit 2221 and a second accommodating portion may be provided for accommodating the second compression unit 2222. The first accommodating portion is formed inside the housing 2201 by a first partition protruding in the housing 2201 in a direction opposite to the water-introducing direction and the second accommodating portion is formed in the housing 2201 by a second partition protruding in the housing 2201 in a direction opposite to the water-introducing direction. The first accommodating portion and the second accommodating portion may not be closed spaces, but may be opened to communicate with a third accommodating portion between the first accommodating portion and the second accommodating portion for connection with the operation part 2214. The electromagnet part 2211 and the operation part 2214 are provided in the third accommodating portion.

The air mixer unit 2230 is provided inside the housing 2201. The air mixer unit 2230 has a separate inner space from a space for accommodating the air pump unit 2210. The air mixer unit 2230 is separated from the air pump unit 210 by a boundary wall 2231. The boundary wall 2231 forms a boundary with respect to the air pump unit 2210 inside the housing 2201, and one side surface of the housing 2201 forms a boundary with respect to the outside of the housing 2201 while forming one surface of the air mixer unit 2230. The boundary wall 2231 may divide the inner space of the housing 2201 into two spaces, namely, an air pump unit accommodating portion and an air mixer unit accommodating portion. The first accommodating portion, the second accommodating portion, and the third accommodating portion described above constitute the air pump unit accommodating portion.

The air mixer unit 2230 includes a mixing chamber 2232 inside the boundary wall 2231. The mixing chamber 2232 is provided therein with a mixing space for mixing washing water and compressed air. The mixing chamber 2232 is disposed with being spaced apart from the boundary wall 2231. The mixing chamber 2232 is positioned higher than the water inlet 22022 to avoid impacts due to pressure of the washing water introduced through the water inlet 22022. The mixing chamber 2232 includes a water inlet hole 22321, a water outlet hole 22322, and an air inlet 22323. The water inlet hole 22321 communicates with the water inlet 22022 such that some of the washing water introduced through the water inlet 22022 flows into the mixing chamber 2232. The water inlet hole 22321 is provided in plurality through a bottom surface of the mixing chamber 2232. The direction in which the washing water flows into the water inlet 22022 is a horizontal direction crossing from one side surface of the housing 2201 to the inner space toward the boundary wall 2231 or the operation part 2214. The water inlet hole 22321 is a hole penetrated in a direction intersecting with the water inlet 22022, that is, in a buoyancy direction, a gravity direction or an up and down direction. This is to induce the flow of the washing water introduced through the water inlet 22022 into the mixing chamber 2232, that is, in a perpendicularly upward direction or a buoyancy direction.

The water outlet hole 22322 is formed through the top surface of the mixing chamber 2232 in a direction facing the water inlet hole 22321 such that the mixed fluid of the compressed air and the washing water is discharged in the buoyancy direction.

The air inlet 22323 penetrates through the top surface of the mixing chamber 2232 into the mixing chamber 2232 in a shape of a pipe. The air inlet 22323 extends to a lower portion inside the mixing chamber 2232. A lower end portion of the air inlet 22323 is disposed with a slight gap from the bottom surface of the mixing chamber such that the compressed air is discharged to the bottom surface in the mixing chamber 2232. For example, the gap may be about 5 mm, but is not limited thereto. The purpose of extending the air inlet 22323 to be close to the bottom surface of the mixing chamber 2232 is to inject the compressed air to the lower end portion in the mixing chamber 2232 so that the compressed air and the washing water are sufficiently mixed with each other.

A bypass flow path 2233 is formed between the boundary wall 2231 and the mixing chamber 2232 in the air mixer unit 22230. The bypass flow path 2233 is configured so that some of the washing water introduced through the water inlet 22022 bypasses the mixing chamber 2232. The washing water introduced through the water inlet 22022 may be partially introduced into the mixing chamber 2232 and may partially bypass the mixing chamber through the bypass flow path at the lower portion of the mixing chamber 2232 so as to be discharged through the outlet 22035. The bypass flow path 2233 bypasses some of the washing water flowing into the air mixer unit 2230 through the water inlet 22022 without passing it into the mixing chamber 2232, thereby reducing an amount of washing water introduced into the mixing chamber 2232. This may increase an amount of compressed air injected and an effect by the mixing of the compressed air, thereby increasing the water hammer phenomenon.

Here, a volume ratio of the mixing chamber 2232 and the bypass flow path 2233 in the boundary wall 2231 may be 70% to 30%. To form the bypass flow path 2233, the mixing chamber 2232 may be mounted on one side surface of the housing 2201. One side surface of the mixing chamber 2232 (a side surface facing the water inlet 22022) may be coupled to the one side surface of the housing 2201 by coupling elements such as bolts. The mixing chamber 2232 may be disposed such that the rear surface thereof is spaced apart from an inner surface of the boundary wall 2231 with respect to the direction in which the washing water is introduced through the water inlet 22022. Further, both side surfaces of the mixing chamber 2232 may be spaced apart from the boundary wall 2231 in a direction intersecting with the water-introducing direction. The bottom surface and the top surface of the mixing chamber 2232 may also be spaced apart from the housing 2201 and the top cover 2203. Accordingly, the washing water introduced through the water inlet 22022 is branched from the outer bottom surface of the mixing chamber 2232 to the bypass flow path 2233 and merged at the upper portion outside the mixing chamber 2232 so as to be discharged out of the housing 2201 through the outlet 22035.

The upper cover 2203 is provided with an exhaust flow path portion 22031 for supplying the compressed air from the air pump unit 2210 to the air mixer unit 2230.

The exhaust flow path portion 22031 connects the air pump unit 2210 and the air mixer unit 2230 so that the compressed air flows into the air mixer unit 2230.

The exhaust flow path portion 22031 may include a first flow path 22031*a* formed in a first direction crossing both side surfaces of the upper cover 2203 facing each other, and a second flow path 22031b extending from the first flow path 22031a in a second direction intersecting with the first direction. The first direction is a direction intersecting with the direction in which the washing water is introduced through the water inlet 22022. The second direction is opposite to the water-introducing direction.

Both end portions of the first flow path 22031a communicate with a discharge port 22236 of the compression part 2220 so that the compressed air discharged from the compression part 2220 can be supplied. At this time, one end portion of the first flow path 22031a is connected to the first compression unit 2221 and another end of the first flow path 22031a is connected to the second compression unit 2222.

One side of the second flow path 22031b communicates with the first flow path 22031a and another side of the second flow path 22031b communicates with the air inlet 22323 of the air mixer unit 2230. Accordingly, the compressed air in the compression part 2220 can move along the first and second flow paths 22031a and 22031b and flow into the mixing chamber 2232 of the air mixer unit 2230.

The exhaust flow path portion 22031 may protrude from a top surface of the upper cover 2203 along a shape of the flow path. The exhaust flow path portion 22031 may include an inner flow path portion formed concavely to include the first flow path 22031a and the second flow path 22031b, and a flow path cover portion protruding from the top surface of the upper cover 2203 to cover an upper portion of the inner flow path portion. The flow path cover portion may be provided with a plurality of coupling ribs 22032 to be coupled to the top surface of the upper cover 2203. The coupling ribs 22032 may be coupled to the upper cover 2203 by coupling elements such as bolts.

A check valve 22033 is provided in the second flow path 22031b to limit a flowing direction of the compressed air to one direction. The check valve 22033 may include a rubber valve body 22033a inserted into the second flow path 22031b, and a holder 22034 inserted into the valve body 22033a to fix the valve body 22033a to an inside of the second flow path 22031b.

The valve body 22033a may have a hollow portion therein in a shape of a pipe, such that the fluid can flow through the hollow portion. A rear end portion of the valve body 22033a is opened with respect to a flow direction of the fluid and a tapered portion 22033b is formed at a front end portion of the valve body 22033a so as to be narrowed in cross section. The tapered portion 22033b may be formed symmetrically with respect to a center line of the valve body 22033a in a lengthwise direction. The tapered portion 22033b is configured to be opened when the fluid flows forward and closed when the fluid flows reversely. To this end, a cutout portion 22033c is formed at a front end of the tapered portion 22033b.

Figure 23:
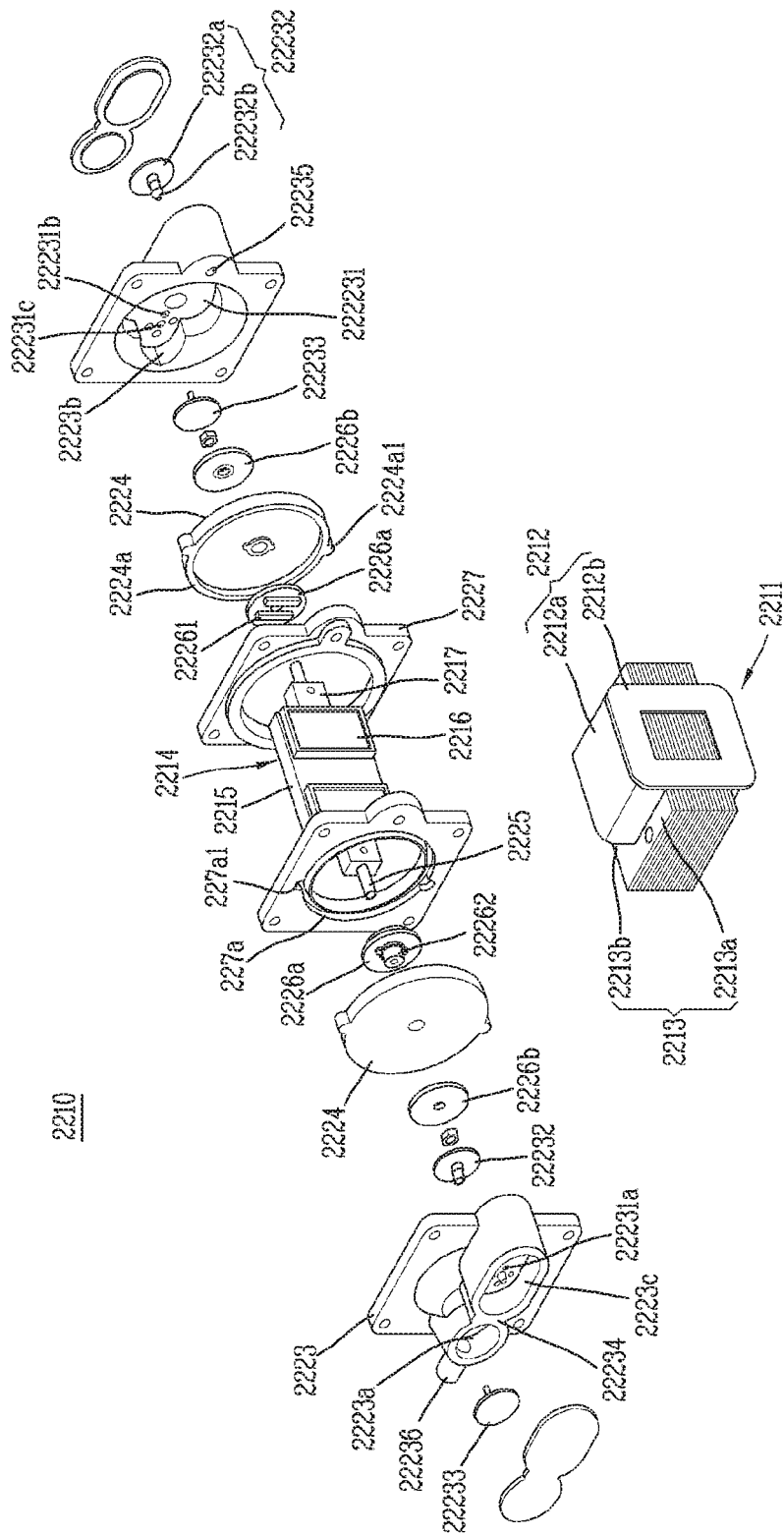
FIG. 23 is an exploded perspective view illustrating a configuration of an air pump unit in FIG. 21.
Figure 24A:
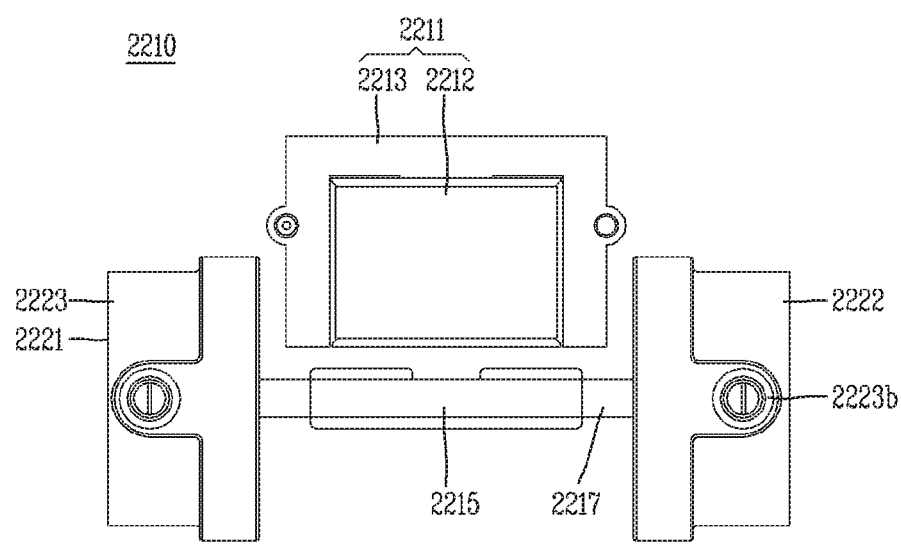
FIG. 24A is a coupled planar view of the air pump unit of FIG. 23.
Figure 24B:
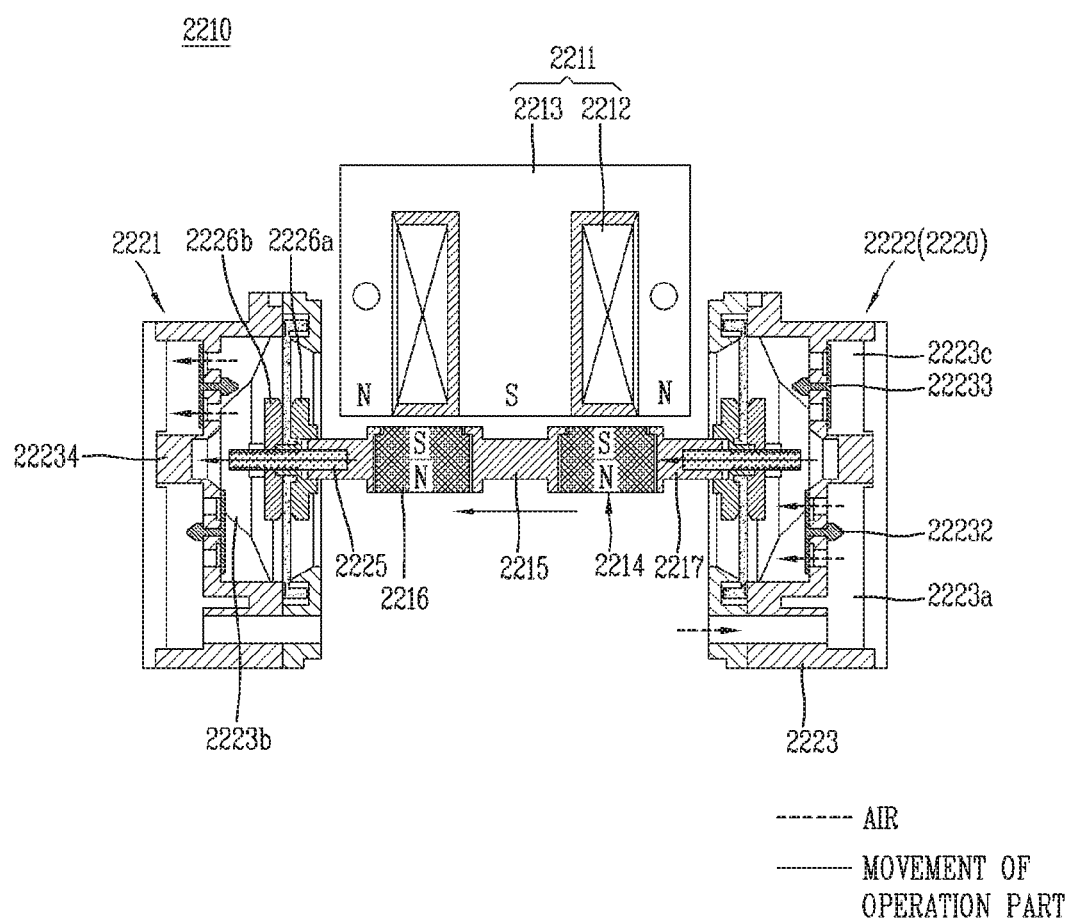
FIGS. 24B and 24C are cross-sectional views illustrating an operation of the air pump unit.
Figure 24C:
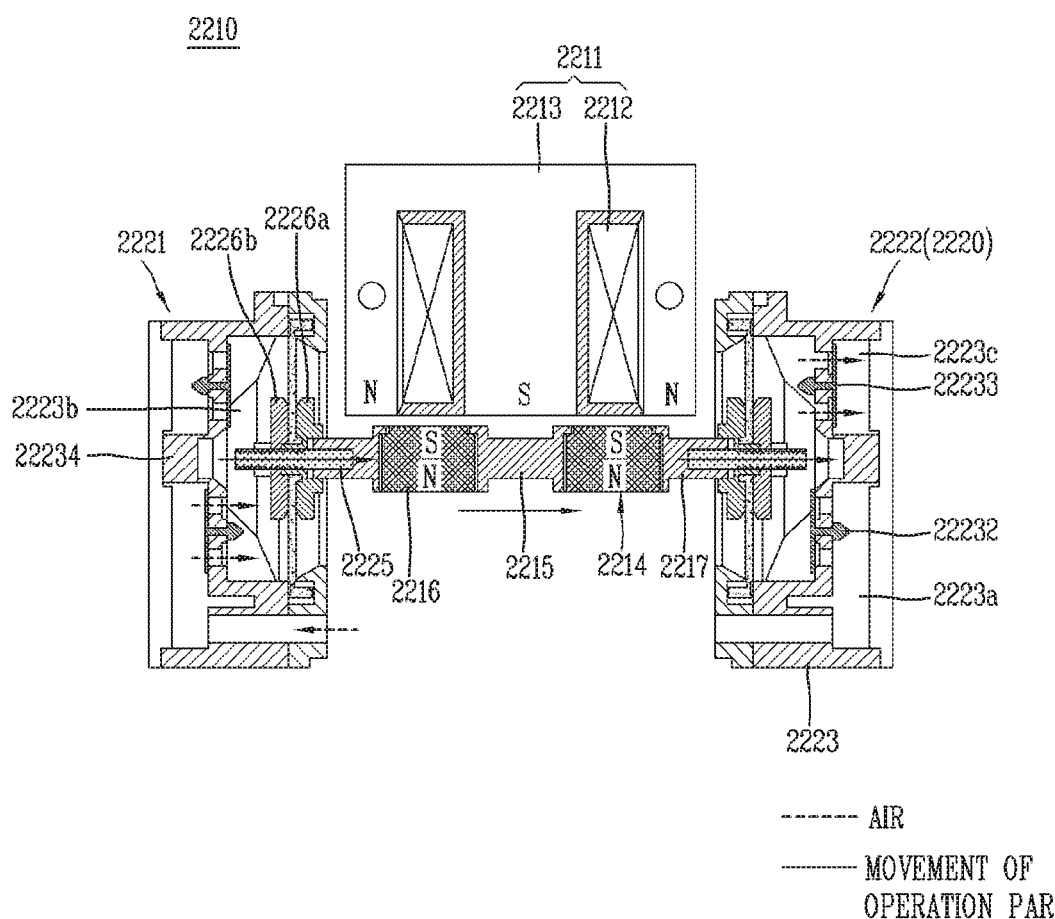

FIG. 23 is an exploded perspective view illustrating the structure of the air pump unit 2210 in FIG. 21, FIG. 24A is a coupled planar view of the air pump unit 2210 of FIG. 23, and FIGS. 24B and 24C are cross-sectional views illustrating an operation of the air pump unit 2210.

The air pump unit 2210 mainly includes an electromagnet part 2211, an operation part 2214, and a compression part 2220.

The description of the electromagnet part 2211 and the operation part 2214 will be omitted in order to avoid redundant description.

However, the internal configuration of the compression part 2220 and the connection relationship between the operation part 2214 and the compression part 2220 will be described with reference to FIG. 23. Since the first compression unit 2221 and the second compression unit 2222 have the same components as each other, a detailed description of the internal configuration of the first and second compression units 2221 and 2222 will be omitted.

The compression part 2220 includes a compression part main body 2223, a diaphragm 2224, and a support portion 2227.

The compression part main body 2223 is disposed at one side of the operation part 2214. The compression part main body 2223 includes therein a suction chamber 2223a, a compression chamber 2223b, and a discharge chamber 2223c. The compression part main body 2223 includes a suction port 22235 and a discharge port 22236. External air flows into the housing 2201 through the external air inlet 22021 and the suction port 22235 is formed through one side surface of the compression part main body 2223 (a surface facing the operation part 2214). The suction port 22235 is formed to communicate with the inside of the housing 2201 such that external air can be introduced into the compression part main body 2223 through the suction port 22235. The discharge port 22236 is provided to discharge the compressed air to the outside of the compression part main body 2223 or the air mixer unit 2230 or discharged to the air mixer unit 2230 through the exhaust flow path portion 22031. The discharge port 22236 may be formed through a side surface of the compression part main body 2223 in a direction intersecting with an external air introduction direction. The discharge port 22236 may alternatively be formed through a top surface of the compression part main body 2223 (a surface facing the upper cover 2203).

The compression chamber 2223b is partitioned by a first partition wall 22231 inside the compression part main body 2223. The compression chamber 223b is disposed in the compression part main body 2223 in a direction facing the operation part 2214 with reference to the first partition wall 22231.

The diaphragm 2224 are made of a material having elasticity such that a part thereof can be deformed by an external force or return to its original state when the external force is not applied. The diaphragm 2224 is provided inside the compression chamber 2223b for compressing air filled in the compression chamber 2223b or sucking external air into the compression chamber 2223b by power transmitted from the operation part 2214. The diaphragm 2224 may have a circular shape and may be mounted in a manner of covering one side surface of the compression chamber 2223b to seal the compression chamber 2223b.

The diaphragm 2224 is connected to a moving portion 2217 to receive power from the operation part 2214. The moving portion 2217 extends from a magnet mounting portion 2215 toward the compression part 2220. The diaphragm 2224 is engaged with the moving portion 2217 by a connection shaft 2225. The connection shaft 225 is provided with a thread so that one side of the connecting shaft 2225 is coupled to the moving portion 2217. A through hole is formed through a center of the diaphragm 2224 and another side of the connection shaft 2225 may be inserted into the diaphragm 2224 through the through hole.

First pressing plate 2226a and second pressing plate 2226b each formed in a circular shape are disposed to apply pressure to one side surface and another side surface of the diaphragm 2224. The connection shaft 2225 is inserted through holes formed through center portions of the first pressing plate 2226a, the diaphragm 2224, and the second pressing plate 2226b. Coupling elements such as nuts are coupled to end portions of the connection shaft 2225 so that the first and second pressing plates 2226a and 2226b are brought into close contact with both side surfaces of the diaphragm 2224. When the moving portion 2217 moves, the center portion of the diaphragm 2224 moves in a lengthwise direction of the connection shaft 2225 or an axial direction.

The first or second pressing plate 2226a or 2226b may be provided with a rotation-restricting rib 22261 or a rotation-restricting groove 22262 to restrict rotation thereof relative to the diaphragm 2224.

An outer circumferential portion of the diaphragm 2224 may be configured to be fixed.

To this end, an outer circumferential inserting portion 2224a protrudes from the outer circumferential portion of the diaphragm 2224 in a circumferential direction.

Further, a support portion 2227 is provided on one side surface of the compression part main body 2223 to fix the outer circumferential portion of the diaphragm 2224. The support portion 2227 is disposed in a direction facing the one side surface of the compression part main body 2223. The support portion 2227 may have a rectangular plate shape with a circular hole formed therethrough. The moving portion 2217 may linearly reciprocate through the circular hole of the support portion 2227 toward the compression part 2220 or away from the compression part 2220. In order to support the outer circumferential inserting portion 2224a of the diaphragm 2224, an outer circumferential accommodating portion 2227a is formed concavely in one side surface of the support portion 2227 (a surface facing the compression part main body 2223) in the circumferential direction. The outer circumferential inserting portion 22224a of the diaphragm 2224 can be inserted into the outer circumferential accommodating portion 2227a so as to be supported thereby. The outer circumferential portion of the diaphragm 2224 can be fixed by coupling edge portions of the compression part main body 2223 and the support portion 2227 to each other by coupling elements such as bolts.

In order to restrict the diaphragm 2224 from rotating in the circumferential direction, rotation-preventing protrusions 2224a1 are provided on the outer circumferential inserting portion 2224a of the diaphragm 2224, and rotation-preventing grooves 2227a1 are formed on the outer circumferential accommodating portion 2227a of the support portion 2227. As the rotation-preventing protrusions 2224a1 are inserted into the rotation-preventing grooves 2227a1, the diaphragm 2224 can be prevented from rotating in the circumferential direction.

The suction chamber 2223a is separated from the compression chamber 2223b by the first partition wall 22231 and communicates with the suction port 22235. External air introduced through the suction port 22235 may be temporarily stored in the suction chamber 2223a.

A plurality of suction holes 22231a is formed at one side of the first partition wall 22231 so as to communicate with the compression chamber 2223b. The plurality of suction holes 22231a is opened and closed by a first check valve 22232. The first check valve 22232 is opened and closed by a pressure difference between the suction chamber 2223a and the compression chamber 2223b. The first check valve 22232 may be provided with a cover plate 22232a to cover the plurality of suction holes 22231a and a center support portion 22232b protruding axially from the center of the cover plate 22232a. The cover plate 22232a has elasticity. The center support portion 22232b is inserted and coupled through a support hole 22231c formed on one side of the first partition wall 22231. The center support portion 2232b of the first check valve 22232 is inserted from the compression chamber 2223b to the suction chamber 2223a, and the cover plate 22232a is disposed in the compression chamber 2223b. Accordingly, when suction pressure is generated in the compression chamber 2223b by the diaphragm 2224, the cover plate 22232a in the compression chamber 2223b may be opened and external air of the suction chamber 2223a may be introduced into the compression chamber 2223b. However, when the external air sucked into the compression chamber 2223b flows backward, the suction holes 22231a are closed by the cover plate 22232a, so that the backward flow of the external air can be prevented.

The discharge chamber 2223c is separated from the compression chamber 2223b by the first partition wall 22231 and is also separated from the suction chamber 2223a by a second partition wall 22234. A plurality of discharge holes 22231b is formed on another side of the first partition wall 22231 to communicate with the compression chamber 2223b, and the compressed air discharged from the compression chamber 2223b through the discharge holes 22231b is temporarily stored. The plurality of discharge holes 22231b is opened and closed by a second check valve 22233. The second check valve 22233 is opened and closed by a pressure difference between the discharge chamber 2223c and the compression chamber 2223b. The second check valve 22233 may be provided with a cover plate 22232a to cover the plurality of discharge holes 22231b, and a center support portion 22232b protruded axially from a center of the cover plate 22232a. The center support portion 22232b of the second check valve 22233 is inserted and coupled through the support hole 22231c formed on the another side of the first partition 22231. The center support portion 22232b of the second check valve 22233 is inserted from the discharge chamber 2223c to the compression chamber 2223b, and the cover plate 222232a is disposed inside the discharge chamber 2223c. Accordingly, when compression pressure of the compression chamber 2223b is generated by the diaphragm 2224, the cover plate 22232a of the discharge chamber 2223c may be opened by pressure of the compressed air and the compressed air of the compression chamber may be discharged to the discharge chamber 2223c. However, when the compressed air discharged to the discharge chamber 2223c flows backward, the discharge holes 22231b are closed by the cover plate 22232a, so that the backward flow of the compressed air can be prevented. The discharge chamber 2223c communicates with the discharge port 22236. The compressed air can be discharged to the outside through the discharge port 22236.

Referring to FIG. 24A, the first compression unit 2221 and the second compression unit 2222 are spaced apart from each other in a direction facing each other, that is, in a direction intersecting with a direction in which the washing water is introduced through the water inlet 22022. The first compression unit 2221 is connected to one side of the moving portion 2217 and the second compression unit 2222 is connected to another side of the moving portion 2217 to transmit power transmitted through the moving portion 2217. The first compression unit 2221 and the second compression unit 2222 may alternately repeat compression, discharge, and suction strokes of air.

Explaining the compression and discharge strokes of the first compression unit 2221 with reference to FIG. 24B, when the moving portion 2217 moves in one direction (a left direction in the drawing), the diaphragm 2224 of the first compression unit 2221 compresses the air filled in the compression chamber 2223b. Pressure of the compressed air is applied to the cover plate 22232a of the first check valve 22232 to overcome the elastic force of the cover plate 22232a, thereby opening the cover plate 22232a. The compressed air can be discharged to the outside of the compression part main body 2223 through the discharge port 22236 via the discharge holes 22231b.

Explaining the suction stroke of the second compression unit 2222 with reference to FIG. 24B, when the moving portion 2217 moves in one direction, the diaphragm 2224 of the second compression unit 2222 expands the compression chamber 2223b, thereby generating suction pressure. The cover plate 22232a of the second check valve 22233 is opened by the suction pressure and the external air is sucked into the compression chamber 2223b through the suction holes 22231a.

According to FIG. 24C, as an AC current is applied to the coil 2212a of the electromagnet part 2211 and the polarities of the protrusions 2213a of the core portion 2213 change from the S pole to the N pole or from the N pole to the S pole, the moving direction of the moving portion 2217 changes. Thereby, the suction stroke can be performed in the first compression unit 2221 and the compression and discharge strokes can be performed in the second compression unit 2222.

Figure 25:
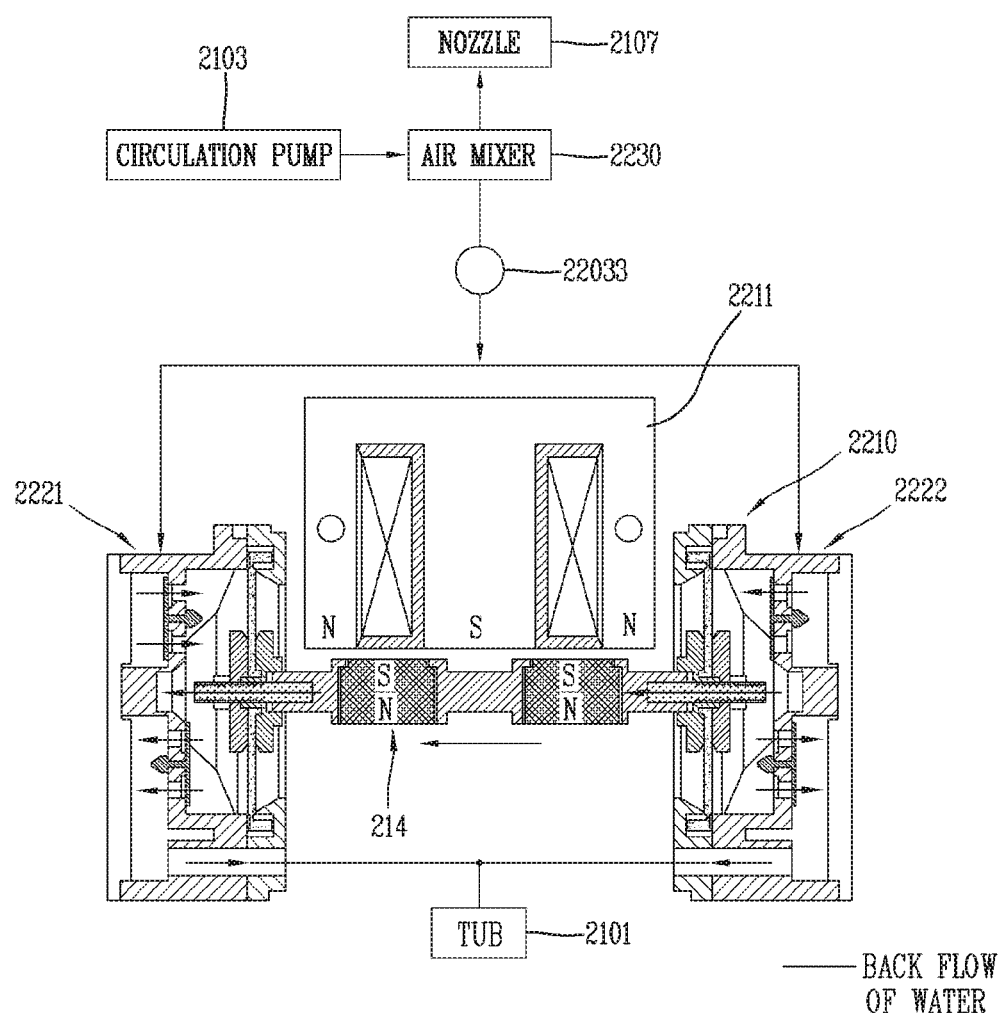
FIG. 25 is a conceptual view illustrating that washing water flows backward in an air mixer in a failure state of a check valve according to the present invention.

FIG. 25 is a conceptual view illustrating that the washing water flows backward in an air mixer 2300 during a failure of a check valve 22033 according to the present invention.

A check valve 22033 installed in the second flow path 22031b of the exhaust flow path portion 22031 allows the compressed air to flow from the air pump unit 2210 to the air mixer unit 2230 and restricts a reverse flow of the compressed air.

However, when the check valve 22033 fails, the washing water may flow back to the air pump unit 2210 from the air mixer 2300.

In this case, the suction port 22235 of the compression part 2220 may be connected to communicate with the tub 2101 to prevent the washing water from leaking into the cabinet 2100.

Figure 26:
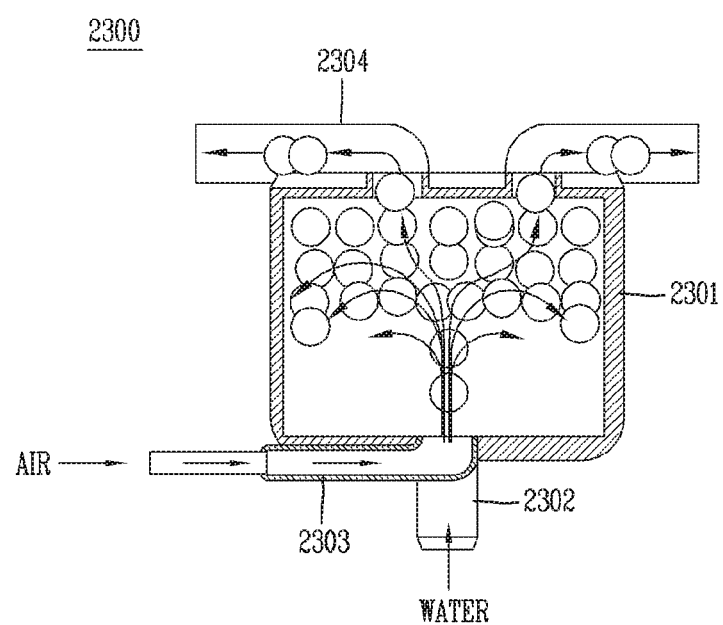
FIG. 26 is a conceptual view illustrating a water hammer effect of an air mixer according to the present invention.
Figure 27A:
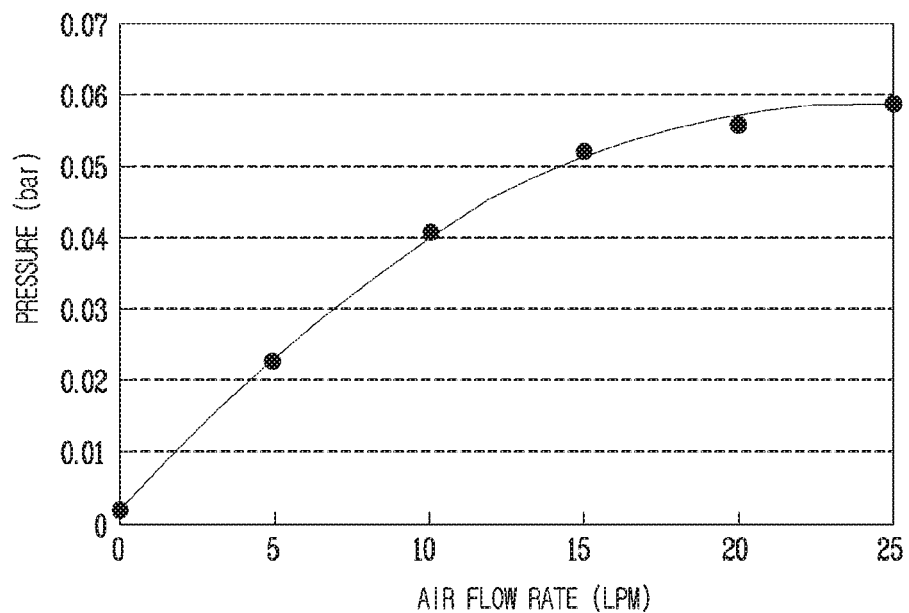
FIG. 27A is a graph showing a pressure change according to an air flow rate to explain an air mixing effect of the present invention.
Figure 27B:
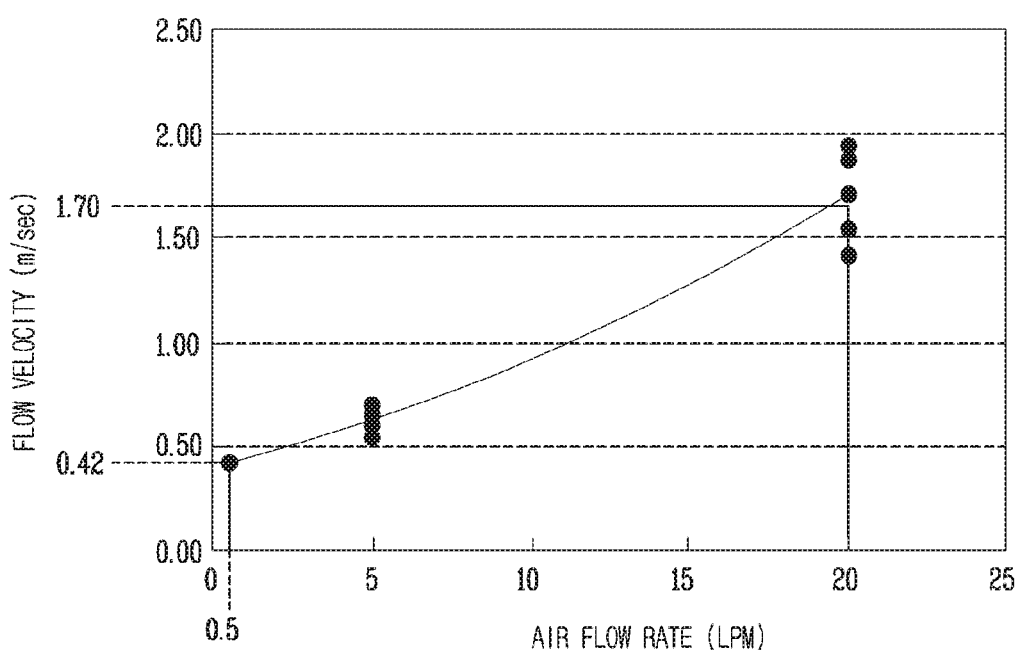
FIG. 27B is a graph showing a flow velocity change according to an air flow rate to explain an air mixing effect of the present invention.

FIG. 26 is a conceptual view illustrating a water hammer effect of the air mixer 2300 according to the present invention. FIG. 27A is a graph showing changes in pressure according to an air flow rate for explaining an air mixing effect of the present invention, and FIG. 27b is a graph showing changes in flow velocity according to the air flow rate for explaining the air mixing effect of the present invention.

Referring to FIG. 26, the air mixer 2300 includes a housing 2301, a plurality of water inlets 2302, an air inlet 2303, and a plurality of outlets 2304.

The housing 2301 may have a cylindrical shape. The housing 2301 is provided therein with a mixing space for mixing the washing water and the compressed air. The water inlets 2302 are formed through a bottom surface of the housing 2301 to allow washing water to flow into the mixing space. The air inlet 2303 is formed through a lower portion of a side surface intersecting with the bottom surface of the housing 2301 in a direction intersecting with the water inlet 2302, such that compressed air flows into the mixing space. The air inlet 2303 and the water inlets 2302 constitute independent flow paths of each other so that the compressed air introduced through the air inlet 2303 and the washing water introduced through the water inlet 2302 are joined in the mixing space and mixed with each other. The plurality of outlets 2304 is formed through the top of the housing 2301 so that the mixed fluid in which the washing water and the compressed air are mixed flows out of the housing 2301.

The mixing space may occupy all or a part of an inner volumetric space of the housing 2301. The mixing space illustrated in FIG. 26 occupies the entire volumetric space inside the housing 2301.

A diameter of the mixing space is much larger than a flow path diameter of the air inlet 2303 and the plurality of water inlets 2302. Accordingly, a flow velocity of the compressed air flowing in the air inlet 2303 and a flow velocity of the washing water flowing in the water inlet 2302 are remarkably reduced in the mixing space. Therefore, the mixing space of the housing 2301 can provide a residence time and a storage space such that the compressed air and the washing water can be sufficiently mixed with each other.

Further, the diameter of the mixing space is much larger than a flow path diameter of the plurality of outlets 2304. As a result, a flow velocity of the mixed fluid of the compressed air and the washing water mixed in the mixing space increases remarkably when it flows out of the housing 2301. This increase in the flow velocity can be more remarkable when the mixed fluid of the compressed air and the washing water flows through the housing 2301 than when only the washing water flows through the housing 2301 without the compressed air.

Also, pressure of the fluid can increase much more when the mixed fluid of the compressed air and the washing water flows through the housing 2301 than when only the washing water flows through the housing 2301.

Referring to the graph of FIG. 27A, the pressure of the fluid increases upward when the air flow rate (LPM) increases to the right.

FIG. 27B shows that the flow velocity increases upward as the air flow rate (LPM) increases to the right. For example, when a flow rate of mixed air increases from 0.5 LPM to 20 LPM, the flow velocity of the mixed fluid increases by about 4 times from 0.42 m/sec to 1.70 m/sec.

Also, the plurality of outlets 2304 has a pipe-like shape bent at a right angle at the top surface of the housing. The plurality of outlets 2304 is formed to be bent in a direction intersecting with the water inlet 302.

As described herein, the spraying force of the mixed fluid can increase using the water hammer phenomenon that a sudden change of the flow velocity (the increase in the flow velocity) changes to pressure energy when the compressed air is mixed with the washing water, when the diameter of the flow path changes from a large diameter to a small diameter, or when the direction of the pipe is drastically bent.

Figure 28:
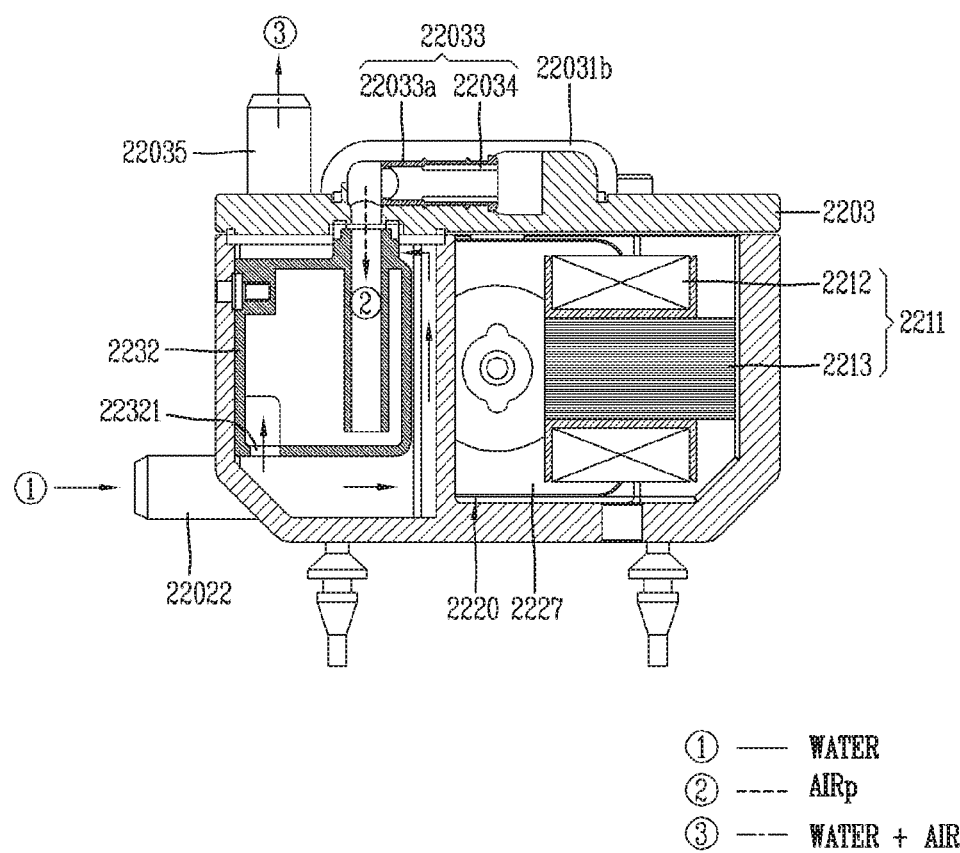
FIG. 28 is a cross-sectional view taken along the line A-A illustrating a flow of a fluid in an aeration module of FIG. 21.

FIG. 28 is a cross-sectional view taken along the line A-A illustrating a flow of the fluid in the aeration module 2200 of FIG. 21.

The washing water discharged from the tub 101 is supplied to the air mixer unit 2230 of the aeration module 200 through the water inlets 2302 of the housing 22201 by the circulation pump 2103. Some of the washing water introduced through the water inlets 22022 are introduced into the mixing chamber 2232 through the water inlet holes 22321 of the mixing chamber 2232 and then flow upward. Further, some of the washing water introduced through the water inlets 22022 are branched at the lower portion of the mixing chamber 2232, bypass the mixing chamber 2232, and flow upward along the bypass flow path 2233.

The compressed air discharged from the discharge port 22236 of the compression part 2220 flows along the first flow path 22031a and the second flow path 22031b of the exhaust flow path portion 22031, passes through the check valve 22033 installed in the second flow path 22031b, and then is introduced into the mixing chamber 2232 through the air inlet 223234 of the air mixer unit 2230, thereby flowing upward by buoyancy.

Then, the washing water flowing up along the bypass flow path 2233 and the mixed fluid flowing out through the plurality of outlet holes are discharged to the outside of the housing 2201 through the plurality of outlets 22035.

Here, the air mixer unit 2230 aerates the compressed air generated from the air pump unit 2210 with the washing water introduced into the mixing chamber 2232, so as to cause the following effects. The aeration may cause the compressed air injected into the mixing chamber 232 to be mixed with the washing water and simultaneously be affected by buoyancy in the washing water so as to further accelerate the upward flow of the washing water. Accordingly, the flow velocities of the compressed air and the washing water rapidly increase. The rapid change in the flow velocity is changed to large pressure to generate large energy. This phenomenon is called the water hammer phenomenon. As described above, the compressed air is injected into the washing water in the mixing chamber 2232 and mixed with the washing water so as to obtain the water hammer effect by the aeration.

That is, as the compressed air is mixed with the washing water, such large energy can be generated to increase the spraying power of the washing water. In addition, the compressed air can atomize the washing water. Further, as the compressed air is mixed with the washing water, the spraying duration of the washing water can extend with a small amount of water.

The mixed fluid flowing out of the aeration module 2200 travels along the distribution flow paths 2234 and is injected into the tub 2101 through the plurality of nozzles 2107. The mixed fluid injected can be atomized by the increased spraying force, thereby uniformly wetting the clothes.

The washing machine described above is not limited to the configurations and the methods of the embodiments described above, but the embodiments may be configured by selectively combining all or part of the embodiments so that various modifications or changes can be made.

What is claimed is:

1. A washing machine, comprising:
   a tub provided inside a cabinet;
   a circulation pump to circulate washing water discharged from the tub back into the tub; and
   an aeration module to mix compressed air with the washing water supplied from the circulation pump and transfer a mixed fluid of the compressed air and the washing water into the tub,
   wherein the aeration module comprises:
   a housing having an external air inlet, a water inlet and an outlet;
   an air mixer unit provided at one side in the housing, to mix the washing water introduced through the water inlet with the compressed air and discharge a mixed fluid of the washing water and the compressed air to the outside through the outlet; and
   an air pump unit provided at another side in the housing, to compress external air introduced through the external air inlet and transfer the compressed air to the air mixer unit,
   wherein the air mixer unit comprises:
   a boundary wall partitioning an inside of the housing to make an inner space in the housing, separate from a space for accommodating the air pump unit; and
   a mixing chamber provided with a water inlet hole, a water outlet hole and an air inlet to mix the washing water introduced through the water inlet and the water inlet hole with compressed air introduced through the air inlet.

2. The washing machine of claim 1, wherein the air pump unit comprises:
   an electromagnet part;
   an operation part disposed to face the electromagnet part, having a permanent magnet, and reciprocating by an electromagnetic force generated by interaction with the electromagnet part; and
   a compression part to compress external air in cooperation with the operation part.

3. The washing machine of claim 1, wherein the mixing chamber is provided with a mixing space for mixing the washing water and the compressed air, separate from an inner space of the boundary wall, and
   wherein the air mixer unit further comprises a bypass flow path formed between the boundary wall and the mixing chamber so that some of the washing water introduced through the water inlet bypass the mixing chamber.

4. The washing machine of claim 3, wherein the mixing chamber is disposed in a manner that a rear surface is spaced apart from the boundary wall in a water-introducing direction in which the washing water is introduced through the water inlet, and both side surfaces are spaced apart from the boundary wall in a direction intersecting with the water-introducing direction.

5. The washing machine of claim 1, wherein the housing comprises:
   a lower main body having the external air inlet and the water inlet; and
   an upper cover having the outlet and covering an upper portion of the lower main body.

6. The washing machine of claim 5, wherein the upper cover is provided with an exhaust flow path portion, and
   wherein the exhaust flow path portion has one side communicating with the air pump unit and another side communicating with the air mixer unit, so that the compressed air is introduced into the air mixer unit.

7. The washing machine of claim 6, wherein the exhaust flow path portion comprises:
   a first flow path formed in a first direction crossing both side surfaces of the upper cover facing each other; and
   a second flow path extending from the first flow path in a second direction intersecting with the first direction, and
   wherein two branches of the compressed air sent out from the air pump unit flow into both end portions of the first flow path and are joined in the second flow path so as to be transferred to the air inlet of the air mixer unit at both end portions in the lower main body facing each other.

8. The washing machine of claim 1, further comprising:
   a plurality of nozzles to inject the mixed fluid discharged from the aeration module into the tub; and
   distribution flow paths to guide the mixed fluid discharged from the aeration module into the plurality of nozzles, respectively.

* * * * *